United States Patent
Rahman et al.

(10) Patent No.: US 9,654,195 B2
(45) Date of Patent: May 16, 2017

(54) METHODS TO CALCULATE LINEAR COMBINATION PRE-CODERS FOR MIMO WIRELESS COMMUNICATION SYSTEMS

(71) Applicant: Samsung Electronics Co., Ltd., Suwon-si, Gyeonggi-do (KR)

(72) Inventors: Md. Saifur Rahman, Richardson, TX (US); Young-Han Nam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/941,361

(22) Filed: Nov. 13, 2015

(65) Prior Publication Data

US 2016/0142117 A1   May 19, 2016

Related U.S. Application Data

(60) Provisional application No. 62/080,871, filed on Nov. 17, 2014, provisional application No. 62/110,134, (Continued)

(51) Int. Cl.
*H04B 7/04* (2006.01)
*H04B 7/06* (2006.01)

(52) U.S. Cl.
CPC ......... *H04B 7/0469* (2013.01); *H04B 7/0486* (2013.01); *H04B 7/0695* (2013.01); *H04B 7/0626* (2013.01)

(58) Field of Classification Search
CPC .. H04B 7/0469; H04B 7/0486; H04B 7/0695; H04B 7/0626
(Continued)

(56) References Cited

U.S. PATENT DOCUMENTS

2013/0003788 A1\* 1/2013 Marinier ................ H04B 7/024
375/219
2013/0322376 A1\* 12/2013 Marinier ............... H04W 72/06
370/329

(Continued)

OTHER PUBLICATIONS

International Search Report and Written Opinion issued for PCT/KR2015/012365 dated Feb. 29, 2016, 8 pgs.

*Primary Examiner* — Siu Lee

(57) ABSTRACT

In a wireless communication system having an antenna array selectively configured to transmit channel state information reference signals (CSI-RS) using a plurality of antenna ports and basis beam vectors selected from a master beam set or retrieved from memory, a codebook enables selection of a linear combination of at least a subset of the beams and co-phases and coefficients for each selected beam, where the co-phases determine the co-phasing weights for the selected beams for a cross-polarized antenna array, and the coefficients determine the linear combination of the selected beams. Feedback contains an indication of channel state information (CSI) for the set of selected or retrieved basis beam vectors, the selected beams, co-phases, and coefficients. The CSI includes at least precoding matrix information (PMI) corresponding to a precoding vector based on a set of the basis beam vectors for the selected beams, corresponding co-phases, and corresponding coefficients.

26 Claims, 10 Drawing Sheets

Related U.S. Application Data filed on Jan. 30, 2015, provisional application No. 62/112,541, filed on Feb. 5, 2015, provisional application No. 62/115,419, filed on Feb. 12, 2015, provisional application No. 62/127,655, filed on Mar. 3, 2015, provisional application No. 62/152,463, filed on Apr. 24, 2015, provisional application No. 62/165,649, filed on May 22, 2015, provisional application No. 62/169,319, filed on Jun. 1, 2015.

(58) Field of Classification Search
USPC .......................... 375/259, 260, 267, 295, 299
See application file for complete search history.

(56) References Cited

U.S. PATENT DOCUMENTS

| | | |
|---|---|---|
| 2014/0098689 A1 | 4/2014 | Lee et al. |
| 2014/0177745 A1 | 6/2014 | Krishnamurthy et al. |
| 2014/0226702 A1 | 8/2014 | Onggosanusi et al. |
| 2014/0301492 A1 | 10/2014 | Xin et al. |
| 2014/0301496 A1 | 10/2014 | Ko et al. |

\* cited by examiner

METHODS TO CALCULATE LINEAR COMBINATION PRE-CODERS FOR MIMO WIRELESS COMMUNICATION SYSTEMS

This application claims priority to U.S. Provisional Patent Application No. 62/110,134 filed Jan. 30, 2015 and entitled "METHODS TO CALCULATE LINEAR COMBINATION PRE-CODERS FOR MIMO WIRELESS COMMUNICATION SYSTEMS," U.S. Provisional Patent Application No. 62/112,541 filed Feb. 5, 2015 and entitled "METHODS TO CALCULATE LINEAR COMBINATION PRE-CODERS FOR MIMO WIRELESS COMMUNICATION SYSTEMS," U.S. Provisional Patent Application No. 62/080,871 filed Nov. 17, 2014 and entitled "CHANNEL AMPLITUDE FEEDBACK FOR ADVANCED MIMO WIRELESS COMMUNICATION SYSTEMS," U.S. Provisional Patent Application No. 62/115,419 filed Feb. 12, 2015 and entitled "LINEAR COMBINATION PMI CODEBOOKS FOR MIMO WIRELESS COMMUNICATION SYSTEMS," U.S. Provisional Patent Application No. 62/127,655 filed Mar. 3, 2015 and entitled "LINEAR COMBINATION PMI CODEBOOKS FOR MIMO WIRELESS COMMUNICATION SYSTEMS," U.S. Provisional Patent Application No. 62/152,463 filed Apr. 24, 2015 and entitled "LINEAR COMBINATION PMI CODEBOOKS FOR MIMO WIRELESS COMMUNICATION SYSTEMS," and U.S. Provisional Patent Application No. 62/165,649 filed May 22, 2015 and entitled "LINEAR COMBINATION PMI CODEBOOKS FOR MIMO WIRELESS COMMUNICATION SYSTEMS." The above-identified patent documents are incorporated herein by reference.

TECHNICAL FIELD

The present disclosure relates generally to pre-coding in wireless communications systems, and more specifically to linear combination of pre-coders for a multi-element antenna array.

BACKGROUND

To support the use of large two-dimensional antenna arrays in wireless communications systems, a channel state information feedback framework that is high-performance, scalable with respect to the number and geometry of transmit antennas, and flexible is required. To achieve the desired high performance, greater accuracy in terms of the quantized channel is needed within channel state information at the base station, especially for frequency division duplex scenarios.

SUMMARY

In a wireless communication system having an antenna array selectively configured to transmit channel state information reference signals (CSI-RS) using a plurality of antenna ports using basis beam vectors selected from a master beam set or retrieved from memory, a codebook enables selection of a linear combination of at least a subset of the beams using the basis beam vectors, as well as co-phases and coefficients for each selected beam, where the co-phases determine the co-phasing weights for each of the selected beams in case of a cross-polarized antenna array, and the coefficients determine the linear combination of the selected beams according to the basis beam vectors. Feedback contains an indication of channel state information (CSI) for the set of selected or retrieved basis beam vectors, the selected beams, co-phases, and coefficients. The CSI includes at least pre-coding matrix information (PMI) corresponding to a pre-coding vector based on a set of the basis beam vectors for the selected beams, a corresponding set of co-phases, and a corresponding set of the coefficients. The selected basis beam vectors may correspond to wideband (WB) measurements for the CSI, while the selected beams, the co-phases and coefficients may correspond to subband (SB) measurements. Bits for the feedback based upon at least one of the co-phases and the coefficients may be selected from double structure co-phase and coefficient codebooks each having a WB component and an SB component. When dynamic selection of the beams is configured, the CSI may correspond to one of the same number of the selected L beams from the basis beam vectors for all of the subbands (SB) or any number of the selected L beams from the basis beam vectors for any of the subbands. The selected beams may correspond to a restricted search over all or some of the master set of beams, the co-phase codebook, and the coefficient codebook. The basis beam vectors, the selected L beams, the co-phases, and the coefficients may be jointly selected or at least one of the selected L beams, the co-phases or the coefficients may be selected separately from selection of the basis beam vectors. At least one of the co-phases or the coefficients may be selected by first obtaining unquantized or analog co-phases and coefficients, quantizing or mapping the obtained, unquantized or analog co-phases and coefficients using a subset of codebooks for the co-phases and coefficients. The subset of codebooks for the co-phases and coefficients may comprise boundary points of a Euclidean partition in which the unquantized or analog co-phases and coefficients belong.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
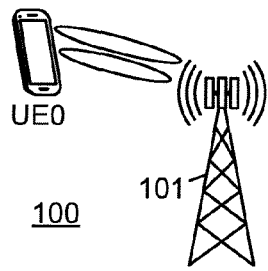
FIG. 1 illustrates an exemplary wireless communication system that may employ calculation of linear combination pre-coders according to some embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

A description of exemplary embodiments of the present disclosure is provided below. The text and figures of that description are provided solely as examples to aid the reader in understanding the disclosure, and are not intended and are not to be construed as limiting the scope of this disclosure in any manner. Although certain embodiments and examples have been provided, it will be apparent to those skilled in the art based on the description and figures herein that changes in the embodiments and examples shown may be made without departing from the scope of this disclosure. Aspects, features, and advantages of the scheme of the present disclosure are readily apparent from the following detailed description, simply by illustrating a number of particular embodiments and implementations. The scheme of the present disclosure is also capable of other and different embodiments, and its several details can be modified in various obvious respects, all without departing from the spirit and scope of the disclosure. Accordingly, the drawings and description are to be regarded as illustrative in nature, and not as restrictive. The scheme of the present disclosure is illustrated by way of example, and not by way of limitation, in the figures of the accompanying drawings. Therefore, this disclosure covers not only the specific embodiments disclosed in the description herein, but also any other variation and/or combination of any subset of the methods and structures described that is conceivable by those familiar with the art.

The following standards are incorporated herein by reference: 3GPP TS36.211; 3GPP TS36.212; and 3GPP TS36.213.

List of Acronyms
2D: two-dimensional
MIMO: multiple-input-multiple-output
SU-MIMO: single-user MIMO
MU-MIMO: multi-user MIMO
3GPP: 3$^{rd}$ Generation Partnership Project
LTE: long-term evolution
UE: user equipment
eNB: evolved Node B or eNodeB
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identifier
MCS: modulation and coding scheme
RE: resource element
CQI: channel quality information
PMI: pre-coding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PDSCH: physical uplink shared channel
PUCCH: physical uplink control channel
PRB: physical resource block
RRC: radio resource control
AoA: angle of arrival
AoD: angle of departure
SINR: signal-to-interference-plus-noise ratio
CW: codeword
RRC: remote radio control
D-BCH: dynamic broadcast channel
FDD: frequency division duplex
FD-MIMO: frequency division, multiple input, multiple output
C-RNTI: cell radio network temporary identifier
WB: wideband
SB: subband The need exists for a high-performance, scalable (with respect to the number and geometry of transmit antennas), and flexible CSI feedback framework and structure for LTE enhancements when FD-MIMO (the use of large two-dimensional antenna arrays). To achieve high performance, more accurate CSI (in terms of a quantized MIMO channel) is needed at the eNodeB, especially for frequency division duplex (FDD) scenarios. The previous LTE (e.g., Rel.12) pre-coding framework (a PMI-based feedback approach) may need to be replaced. However feeding back the quantized channel coefficients may be excessive in terms of feedback requirements. Accordingly, in this disclosure, the following properties of FD-MIMO are factored in for the schemes proposed:

Closely spaced, large 2D antenna arrays (primarily geared toward high beamforming gain rather than spatial multiplexing) are used, along with relatively small angular spread for each UE. This allows "compression" or "dimensionality reduction" of the quantized channel feedback based on a fixed set of basis functions/vectors.

The target scenario for FD-MIMO is low mobility. This allows for the possibility to update channel quantization parameters (such as the channel angular spreads) at a low rate, e.g., using UE-specific higher-layer signaling. In addition, CSI feedback can also be performed cumulatively.

The present disclosure proposes feeding back PMI which indicates a linear combination of a subset of pre-coding vectors or matrices in a given pre-coding codebook. In the case of LTE, the PMI corresponds to a quantized version of a plurality of weighting coefficients for the aforementioned subset of pre-coding vectors or matrices. This facilitates each UE to report MIMO channel coefficients in terms of a linear combination of a subset of pre-coding vectors or matrices.

FIG. 1 illustrates an exemplary wireless communication system that may employ calculation of linear combination pre-coders according to some embodiments of the present disclosure. In the exemplary communications system 100 depicted, user equipment (UE) UE0 receives streams from evolved Node B (eNB) 101. eNB 101 multiplexes data streams intended for multiple UEs. The communication system thus consists of a downlink (DL), where signals are transmitted from eNB, base station (BS), NodeBs or transmission point (TP) to user equipment, and an uplink (UL), where signals are transmitted from UE to BS or NodeB. A UE, also commonly referred to as a terminal or a mobile station, may be fixed or mobile and may be a cellular phone, a personal computer device, etc. An eNB, which is generally a fixed station, may also be referred to as an access point or other equivalent terminology. DL signals include data signals conveying information content, control signals conveying DL Control Information (DCI), and Reference Signals (RS), which are also known as pilot signals. The eNB transmits data information or DCI through respective Physical Downlink Shared CHannels (PDSCHs) or Physical Downlink Control CHannels (PDCCHs). The eNB may transmit one or more of multiple types of RS including a UE-Common RS (CRS), a Channel State Information RS (CSI-RS), and a DeModulation RS (DMRS).

Figure 1A:
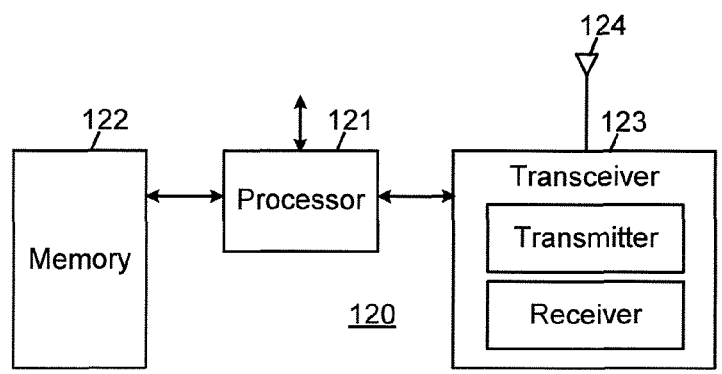
FIG. 1A depicts further details regarding the exemplary system of FIG. 1.

As shown in further detail in FIG. 1A, each system 120 for the UE (UE0) depicted in FIG. 1 and other, similar UEs (not shown) and for the eNB 101 depicted in FIG. 1 and other, similar eNBs (not shown) include: a processor 121, a memory 122, a transceiver 123 including a transmitter and a receiver, and an antenna array 124. The receiver and the transmitter (or transceiver 123) are each coupled to the antenna array for receiving or transmitting wireless signals, including reference signals such as CSI-RS. The controller or processor 121 is coupled to the receiver and the transmitter and performs one or more of the various computations or determinations described in further detail below, such as estimating one or more channels between the respective UE and the base station, deriving channel quality information for the channels using the reference signals and one or more of the processes described below, reporting at least the CQI and one or more indicators of pre-coding matrix selection(s) or antenna array subsampling parameters as described in further detail below, transmitting feedback including the CQI and/or PMI report as discussed in further detail below.

Figure 1B:
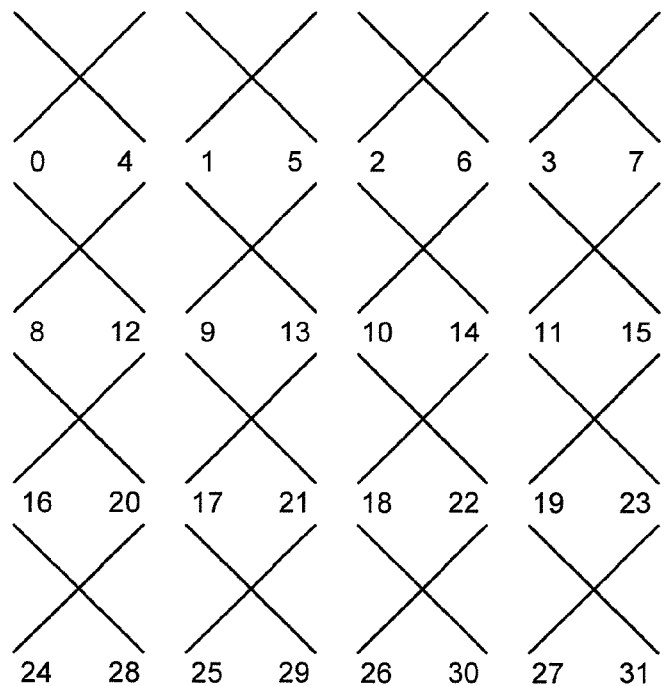
FIGS. 1B and 1C each depict details of an antenna system for the exemplary system of FIG. 1, with different antenna port indexing.
Figure 1C:
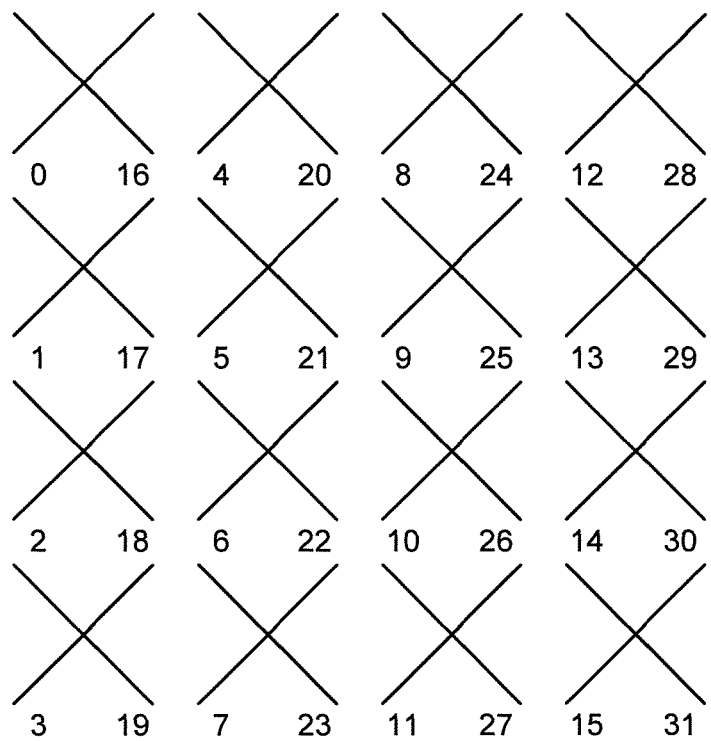

FIG. 1B depicts an exemplary 2D antenna array which is constructed from 16 dual-polarized antenna elements arranged in a 4×4 rectangular format, with a first antenna port (AP) indexing. In this example, each labelled antenna element is logically mapped onto a single antenna port. In general, one antenna port may correspond to multiple antenna elements (physical antennas) combined via a virtualization. This 4×4 dual polarized array can then be viewed as 16×2=32-element array of elements. The vertical dimension (consisting of 4 rows) facilitates elevation beamforming while the horizontal dimension (consisting of 4 columns of dual polarized antennas) facilitates azimuthal beamforming. FIG. 1C depicts a similar array as FIG. 1B, with a second AP indexing.

MIMO pre-coding in Rel.12 LTE standardization (per TS36.211 section 6.3.4.2, 6.3.4.4, and TS36.213 section 7.2.4) was largely designed to offer pre-coding gain for one-dimensional antenna array. While fixed beamforming (i.e., antenna virtualization) can be implemented across the elevation dimension, it is unable to reap the potential gain offered by the spatial and frequency selective nature of the channel.

Figure 2:
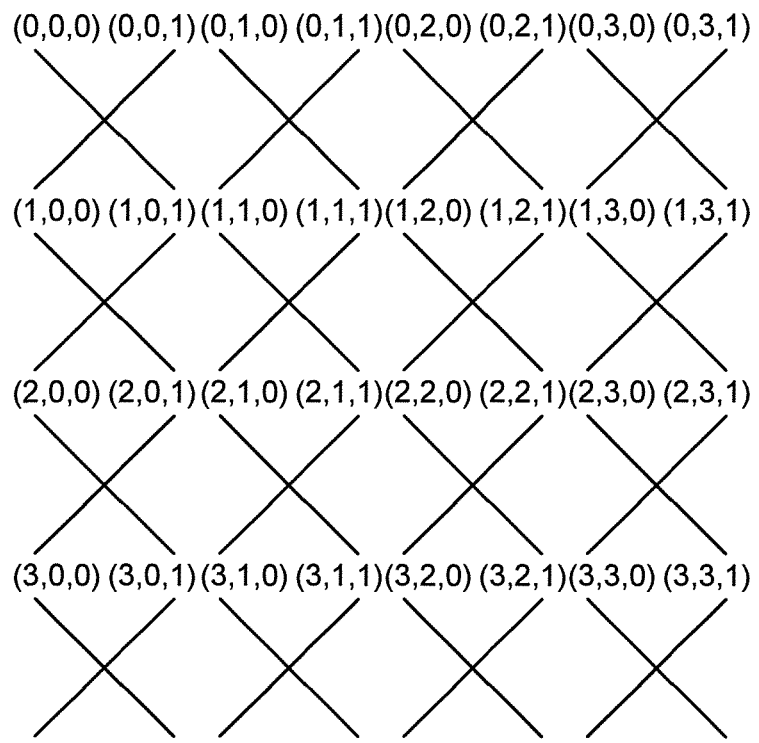
FIG. 2 illustrates antenna element numbering for the antenna system of FIGS. 1B and 1C.

In some embodiments, the eNB is equipped with 2D rectangular antenna array of transceiver units (TXRUs), comprising M rows and N columns with P=2 polarizations. Each element (or TXRU) is indexed by (m,n,p), and m=0, ..., M−1, n=0, ..., N−1, p=0, ..., P−1, as illustrated in the antenna element (or TXRU) numbering scheme of FIG. 2 for M=N=4. When FIG. 2 represents a TXRU array, a TXRU can be associated with multiple antenna elements. In one example (1-dimensional or "1D" subarray partitioning), an antenna array comprising a column with a same polarization of a 2D rectangular array is partitioned into M groups of consecutive elements, and the M groups correspond to the M TXRUs in a column with a same polarization in the TXRU array in FIG. 2.

In conventional LTE, MIMO pre-coding (for spatial multiplexing) can be performed either with CRS (cf. TS36.211 section 6.3.4.2) or UE-RS (cf. TS36.211 section 6.3.4.4). In either case, each UE operating in spatial multiplexing mode(s) is configured to report CSI, which may contain PMI (i.e., a pre-coding codebook index). PMI report is derived from one of the following sets of standardized codebooks:

1. Two antenna ports: {TS36.211 table 6.3.4.2.3-1}
2. Four antenna ports: {TS36.211 table 6.3.4.2.3-2} or {TS36.213 table 7.2.4-0A, B, C, and D}
3. Eight antenna ports: {TS36.213 table 7.2.4-1, 2, 3, 4, 5, 6, 7, and 8}

If the eNB follows the UE's PMI recommendation, the eNB is expected to pre-code its transmitted signal according to the recommended pre-coding vector/matrix (for a given subframe and PRB). Regardless whether the eNB follows the UE's recommendation, the UE is configured to report a PMI according to the above pre-coding codebooks. Here a PMI (which may consist of a single index or a pair of indices) is associated with a pre-coding matrix W of size $N_C \times N_L$, where $N_C$ is the number of antenna ports in one row (=number of columns) and $N_L$ is the number of transmission layers.

Rel.12 LTE 8-Tx Double Codebook

TABLE 1 and TABLE 2 below are codebooks for rank-1 and rank-2 (1-layer and 2-layer) CSI reporting for UEs configured with 8 Tx antenna port transmissions. To determine a CW for each codebook, two indices, i.e., $i_1$ and $i_2$ have to be selected. In these pre-coder expressions, the following two variables are used:

$$\phi_n = e^{j\pi n/2}$$

$$v_m = [1 \; e^{j2\pi m/32} \; e^{j4\pi m/32} \; e^{j6\pi m/32}]^T.$$

TABLE 1

Codebook for 1-layer CSI reporting using antenna ports 15 to 22

| | $i_2$ | | | | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| | $i_2$ | | | | | | | |
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \phi_n v_m \end{bmatrix}$.

If the most recently reported RI=1, m and n are derived with the two indices $i_1$ and $i_2$ according to TABLE 1, resulting in a rank-1 pre-coder:

$$W_{m,n}^{(1)} = \frac{1}{\sqrt{8}} \begin{bmatrix} v_m \\ \phi_n v_m \end{bmatrix}.$$

TABLE 2

Codebook for 2-layer CSI reporting using antenna ports 15 to 22

| | $i_2$ | | | |
|---|---|---|---|---|
| $i_1$ | 0 | 1 | 2 | 3 |
| 0-15 | $W_{2i_1,2i_1,0}^{(2)}$ | $W_{2i_1,2i_1,1}^{(2)}$ | $W_{2i_1,2i_1+1,0}^{(2)}$ | $W_{2i_1,2i_1+1,1}^{(2)}$ |
| | $i_2$ | | | |
| $i_1$ | 8 | 9 | 10 | 11 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| | $i_2$ | | | |
| $i_1$ | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |
| | $i_2$ | | | |
| $i_1$ | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4} \begin{bmatrix} v_m & v_{m'} \\ \phi_n v_m & -\phi_n v_{m'} \end{bmatrix}$.

If the most recently reported RI=2, m, m' and n are derived with the two indices $i_1$ and $i_2$ according to TABLE 2, resulting in a rank-2 pre-coder:

$$W_{m,m',n}^{(2)} = \frac{1}{4} \begin{bmatrix} v_m & v_{m'} \\ \phi_n v_m & -\phi_n v_{m'} \end{bmatrix}.$$

It is noted that $W_{m,m',n}^{(2)}$ is constructed such that it can be used for two different types of channel conditions that facilitate a rank-2 transmission.

One subset of the codebook associated with $i_2=\{0, 1, \ldots, 7\}$ comprises codewords with m=m', or the same beams ($v_m$) are used for constructing the rank-2 pre-coder:

$$W_{m,m,n}^{(2)} = \frac{1}{4} \begin{bmatrix} v_m & v_m \\ \phi_n v_m & -\phi_n v_m \end{bmatrix}.$$

In this case, the two columns in the 2-layer pre-coder are orthogonal (i.e., $[v_m \; \phi_n v_m]^H \cdot [v_m \; -\phi_n v_m]=0$), owing to the different signs applied to $\phi_n$ for the two columns. These rank-2 pre-coders are likely to be used for those UEs that can receive strong signals along two orthogonal channels generated by the two differently polarized antennas.

Rel.12 LTE Alternative 4-Tx Double Codebook

Based on a similar concept to that of 8-Tx, the alternative 4-Tx codebook can be written as follows:

$$\phi_n = e^{j\pi n/2}$$

$$\phi'_n = e^{j2\pi n/32}$$

$$v'_m = [1 \; e^{j2\pi n/32}]^T.$$

TABLE 3

Codebook for 1-layer CSI reporting using antenna ports 0 to 3 or 15 to 18

| | $i_2$ | | | | | | | |
|---|---|---|---|---|---|---|---|---|
| $i_1$ | 0 | 1 | 2 | 3 | 4 | 5 | 6 | 7 |
| 0-15 | $W_{i_1,0}^{(1)}$ | $W_{i_1,8}^{(1)}$ | $W_{i_1,16}^{(1)}$ | $W_{i_1,24}^{(1)}$ | $W_{i_1+8,2}^{(1)}$ | $W_{i_1+8,10}^{(1)}$ | $W_{i_1+8,18}^{(1)}$ | $W_{i_1+8,26}^{(1)}$ |

| | $i_2$ | | | | | | | |
|---|---|---|---|---|---|---|---|---|
| $i_1$ | 8 | 9 | 10 | 11 | 12 | 13 | 14 | 15 |
| 0-15 | $W_{i_1+16,4}^{(1)}$ | $W_{i_1+16,12}^{(1)}$ | $W_{i_1+16,20}^{(1)}$ | $W_{i_1+16,28}^{(1)}$ | $W_{i_1+24,6}^{(1)}$ | $W_{i_1+24,14}^{(1)}$ | $W_{i_1+24,22}^{(1)}$ | $W_{i_1+24,30}^{(1)}$ | where $W_{m,n}^{(1)} = \frac{1}{2}\begin{bmatrix} v'_m \\ \phi'_n v'_m \end{bmatrix}$.

TABLE 4

Codebook for 2-layer CSI reporting using antenna ports 0 to 3 or 15 to 18

| | $i_2$ | | | |
|---|---|---|---|---|
| $i_1$ | 0 | 1 | 2 | 3 |
| 0-15 | $W_{2i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| | $i_2$ | | | |
|---|---|---|---|---|
| $i_1$ | 8 | 9 | 10 | 11 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| | $i_2$ | | | |
|---|---|---|---|---|
| $i_1$ | 8 | 9 | 10 | 11 |
| 0-15 | $W_{i_1,i_1+8,0}^{(2)}$ | $W_{i_1,i_181,1}^{(2)}$ | $W_{i_1+8,i_1+16,0}^{(2)}$ | $W_{i_1+8,i_1+16,1}^{(2)}$ |

| | $i_2$ | | | |
|---|---|---|---|---|
| $i_1$ | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ | where $W_{m,m',n}^{(2)} = \frac{1}{\sqrt{8}}\begin{bmatrix} v'_m & v'_{m'} \\ \phi_n v'_m & -\phi_n v'_{m'} \end{bmatrix}$.

For FD-MIMO that utilizes 2D antenna array (hence 2D pre-coding), the need for high-performance, scalable (with respect to the number and geometry of transmit antennas), and flexible CSI feedback framework and structure is necessary. To achieve high performance, more accurate CSI (preferably in terms of quantized MIMO channel) is needed at the eNB. This is especially the case for FDD scenarios where short-term reciprocity is infeasible. In this case, the previous LTE (e.g. Rel.12) pre-coding framework (PMI-based feedback) may need to be replaced. Yet feeding back the quantized channel coefficients may be excessive in terms of feedback requirements.

In this disclosure, the following properties of FD-MIMO are factored in for the proposed schemes:

1. The use of closely spaced large 2D antenna arrays (primarily geared toward high beamforming gain rather than spatial multiplexing) along with relatively small cluster spread for each UE: This allows "compression" or "dimensionality reduction" of the quantized channel feedback. In this case, a set of basis functions/vectors is used and quantization is basically expressing the MIMO channel in terms of a linear combination of those basis functions/vectors.
2. Low mobility as the target scenario for FD-MIMO: Possibility to update quantization parameters (long-term channel statistics such as channel angular spread) at a low rate, e.g. using UE-specific higher-layer signaling. In addition, CSI feedback can also be performed cumulatively.
3. While time-varying basis functions/vectors can be used (e.g., derived from EVD or SVD and fed back from the UE to the eNB), small channel angular spread warrants the use of a fixed master-set of basis functions/vectors derived primarily from the channel angular spread characteristics. For a given channel angular spread characteristic, a subset of the fixed master-set (pre-known both at the UE and the eNB) is chosen by the eNB and signaled to the UE.

In U.S. Non-Provisional patent application Ser. No. 14/874,252 filed Oct. 2, 2015 and entitled "CODEBOOK DESIGN AND STRUCTURE FOR ADVANCED WIRELESS COMMUNICATION SYSTEMS" (which is incorporated herein by reference), a framework for linear combination based PMI pre-coding vector/matrix calculation was proposed (assuming the use of 2D antenna array at eNB. A summary of the proposed CSI feedback scheme is as follows:

First, the UE receives CSI-RS configuration for $N_P$ antenna ports and corresponding CSI-RS. $N_P$ may be decomposed into $N_P = N_H \cdot N_V$, where $N_H$ is a number of antenna ports in a row and $N_V$ is a number of antenna ports in column of a 2D rectangular antenna array. According to the notation in the embodiments associated with FIG. 2, $N_H = 2N$ and $N_V = M$. In one example, $N_V = 4$ and $N_H = 8$, wherein the cross-polarization (x-pol) dimension is counted towards a row rather than towards a column.

Second, having processed the CSI-RS, the UE derives CQI, PMI, and/or RI, where RI corresponds to a recommended rank (number of transmission layers) and PMI corresponds to a recommended pre-coding matrix, each column of which, say w, is constructed with a linear combination of a number of basis vectors:

$$w = \sum_{l=1}^{L} c_l a_l,$$

where $A = \{a_l\}$ is a set of basis vectors comprising L distinct basis vectors selected out of a mother set comprising a large number (>>L) of basis vectors, and each basis vector $a_l$ is an $N_P \times 1$ vector. For configuration or reporting of the number of basis vectors L: In one method, L is higher-layer configured by the eNB. In one method, a UE reports a recommended value of L to the eNB.

With the antenna port indexing in FIG. 1C, $a_l$ can be further decomposed into $a_l = h_l \otimes v_l$, where $h_l$ and $v_l$ are discrete Fourier transform (DFT) vectors of size $N_H \times 1$ and $N_V \times 1$, respectively representing azimuth and elevation channel responses for a given pair of an azimuth angle and an elevation angle. In this case, the mother set of basis vectors can be a product set: $\{h \otimes v : h \in W_H, v \in W_V\}$. The foregoing Kronecker product formulation needs to be modified when a different antenna port indexing is used than that depicted in FIG. 1C. For instance, if the indexing in FIG. 1B is assumed, the following equations should be used instead: $a_l = v_l \otimes h_l$ and $\{v \otimes h : h \in W_H, v \in W_V\}$. For simplicity, the following mathematical descriptions below assume the antenna port indexing depicted in FIG. 1B. Those skilled in the art should be able to derive the corresponding (conceptually equivalent) equations for other antenna port indexing schemes from the disclosed expressions.

The basis vectors $a_l$ can be further decomposed into:

$$a_l = \begin{bmatrix} h_l \\ e^{j\phi_l} h_l \end{bmatrix} \otimes v_l,$$

where $h_l$ and $v_l$ are DFT vectors of size $N_H \times 1$ and $N_V \times 1$, respectively representing azimuth and elevation channel responses for a given pair of an azimuth angle and an elevation angle, and $$\phi_l = \left\{ \frac{2m\pi}{M} : m \text{ is selected from a set of nonnegative integers} \right\}$$

represents the co-phase of the cross-polarized ("x-pol") array. In this case, the mother set can be a product set:

$$\left\{ \begin{bmatrix} h \\ e^{j\phi} h \end{bmatrix} \otimes v : h \in W_H, v \in W_V, \phi = 0, \frac{2\pi}{M}, \frac{2 \cdot 2\pi}{M}, \ldots, \frac{2(M-1)\pi}{M} \right\}.$$

In one method, an index tuple $(i_1, i_2, i_3)$ indicates a basis vector $a_l$. Indices associated with $$\begin{bmatrix} h_l \\ e^{j\phi_l} h_l \end{bmatrix}$$

are denoted as $i_1$ and $i_2$, the set of which are mapped to specific pre-coders according to TABLE 1. Furthermore, indices related to $v_l$ are denoted as $i_3$, and are one-to-one mapped to $Q_V$ DFT vectors of length $N_V$, where $Q_V$ is a positive integer representing the elevation codebook size, which can be determined as a function of $N_V$.

In one example, L=4. Furthermore, $v_l = v, \forall l$, where $v \in W_V$; and $H = \{h_l\}_{l=1,2,3,4}$ corresponds to four beams corresponding to $i_1$ in LTE Rel-10 8-Tx codebook (TABLES 1 and 2), i.e., $H = \{v_{2i}, v_{2i+1}, v_{2i+2}, v_{2i+3}\}$, where $v_m = [1 \; e^{j2\pi n/32} \; e^{j4\pi n/32} \; e^{j6\pi n/32}]^T$. For example, a DFT vector of size 4×1 is $v_m = [1 \; e^{j2\pi n/D} \; e^{j4\pi n/D} \; e^{j6\pi n/D}]^T$, where D=2n and n is a positive integer. Other size DFT vectors can be similarly constructed.

$C = \{c_l\}$ is a corresponding set of L scaling coefficients, each element of which is a complex number. Some alternatives for $c_l$ quantization are:
1. Real and imaginary components of $c_l$ are separately quantized, with $N_{Re}$ quantization bits for the real dimension and $N_{Im}$ quantization bits for the imaginary dimension. In one method, $N_{Re} = N_{Im}$.
2. Amplitude and phase components of $c_l$ are separately quantized, with $N_A$ quantization bits for amplitude and $N_{Ph}$ quantization bits for phase.

Some details for the quantization methods can be found in U.S. Non-Provisional patent application Ser. No. 14/573,711 filed Jan. 19, 2015 and entitled "CHANNEL STATE INFORMATION REPORTING WITH BASIS EXPANSION FOR ADVANCED WIRELESS COMMUNICATIONS SYSTEMS," which is incorporated herein by reference.

CQI corresponds to a modulation and coding scheme which allows the UE to receive a PDSCH packet with a constant (e.g., 0.1) packet error probability when the selected PMI and the selected RI is used for pre-coding. The UE may select RI and PMI that allows the best (or highest) CQI for the PDSCH transmission with a constant (e.g., 0.1) error probability.

Third, the UE reports PMI/CQI/RI on a single PUSCH, when triggered for an aperiodic (PUSCH) report. In one method, PMI corresponding to a basis vector set A is wideband (i.e., only one set is reported in the aperiodic report), the PMI corresponding to the coefficient set C is subband (i.e., multiple sets, e.g., one per subband are reported in the periodic report). In one method, PMI corresponding to $h_l$ and $v_l$ are wideband (WB), and the PMI corresponding to the coefficient set C and co-phasing factor $\phi$ are subband (SB).

Fourth, the UE may report CQI/PMI on a PUCCH in another subframe with a period P, and RI on a PUCCH in one subframe with a period Q, when configured with a periodic report. In one method, the PMI corresponding to a basis vector set A is less frequently reported (i.e., reported with larger period) than the PMI corresponding to the coefficient set C. In another method, the PMI corresponding to $h_l$ and $v_l$ are less frequently reported than the PMI corresponding to the coefficient set C and co-phasing factor $\phi$. In the foregoing two methods, the PMI that is reported less frequently is reported using the same manner and/or from the same PUCCH resource pool as rank indicator (RI). In another method, the PMI corresponding to a basis vector set A and the PMI corresponding to the coefficient set C are reported together in one self-contained PMI report.

Method to Calculate Linear Combination Pre-Coders for MIMO Wireless Communication Systems In this disclosure, possible UE implementations are described that allow to derivation of the CSI report according to the proposed linear combination based a CSI feedback scheme. For simplicity, the rank-1 RI case is discussed in the rest of the disclosure. However, those skilled in the art will understand that the scope of this disclosure is not limited to the rank-1 case.

The overall UE implementations according to some embodiments of this disclosure are as follows:

First, the UE determines the set of L basis vectors and corresponding coefficients in order to derive the PMI corresponding to the pre-coding vector:

$$w = \sum_{l=1}^{L} c_l a_l.$$

Second, the set of the basis vectors and the coefficient pairs $\{a_l, c_l\}_{l=1}^L$ may be determined in such a manner that: (a) $\{a_l\}_{l=1}^L$ is WB in order to capture long-term channel characteristics, and (b) $\{c_l\}_{l=1}^L$ is SB in order to capture the short-term channel characteristics.

Third, when the basis vector $a_l$ can be decomposed as $a_l = h_l \otimes v_l$ for a co-polarized 2D antenna array, then depending on the configuration, the set of basis vectors may be determined according to one of the following methods:

One Basis: If the UE is configured with one basis set, then it may determine the basis as follows:

Joint Basis: The final pre-coding vector may be expressed as $w = \sum_{l=1}^L c_l (h_l \otimes v_l)$, where $\{h_l \otimes v_l\}_{l=1}^L$ is the WB basis in order to capture long-term channel characteristics of the full channel. In this method, the UE needs to perform an unconstrained search for the basis using the full channel and the set of Kronecker products between all possible pairs of azimuth and elevation pre-coding vectors.

Azimuth Basis: The final pre-coding vector may be expressed as $w = (\sum_{l=1}^L c_l h_l) \otimes v$. $\{h_l\}_{l=1}^L$ is the WB basis in order to capture long-term channel characteristics in azimuth domain. In one method, the UE may perform a search for the azimuth basis using the azimuth domain channel and the set of all possible azimuth pre-coding vectors. The azimuth domain channel may be obtained by averaging the full channel across the elevation domain. In another method, the UE may perform a search for the azimuth basis using the full channel, the set of all possible azimuth pre-coding vectors, and a set of fixed elevation pre-coders to obtain the Kronecker product. v is the SB elevation pre-coder.

Elevation Basis: The final pre-coding vector may be expressed as $w = h \otimes (\sum_{l=1}^L c_l v_l)$. $\{v_l\}_{l=1}^L$ is the WB basis in order to capture long-term channel characteristics in elevation domain. In one method, the UE may perform a search for the elevation basis using the elevation domain channel and the set of all possible elevation pre-coding vectors. The elevation domain channel may be obtained by averaging the full channel across the azimuth domain. In another method, the UE may perform a search for the elevation basis using the full channel, the set of all possible elevation pre-coding vectors, and a set of fixed azimuth pre-coders to obtain the Kronecker product. h is the SB azimuth pre-coder.

Two Bases: If the UE is configured with two basis sets, one for azimuth and the other for elevation, then it may determine the two basis sets as follows. The final pre-coding vector can be expressed as $w = \sum_{l=1}^L c_l a_l = \sum_{l_h=1}^{L_h} \sum_{l_v=1}^{L_v} c_{l_h, l_v} (h_{l_h} \otimes v_{l_v})$, where $1 \le l_h \le L_h$, $1 \le l_v \le L_v$, $1 \le l \le L$, and $L_h = L_v = L$, where l indicates the pair $(l_h, l_v)$.

$$\{h_{l_h}\}_{l_h=1}^{L_h}$$

is the azimuth WB basis in order to capture long-term channel characteristics in azimuth domain.

$$\{v_{l_v}\}_{l_v=1}^{L_v}$$

is the elevation WB basis in order to capture long-term channel characteristics in elevation domain.

$$\{c_l\}_{l=1}^L = \{c_{l_h, l_v}\}_{l_h=1, l_v=1}^{L_h, L_v}$$

is the corresponding SB coefficient vector. In one method, $\{c_l\}_{l=1}^L$ may be reported as one coefficient vector from a coefficient codebook. In another method, $c_{l_h, l_v}$ may be decoupled as $c_{l_h, l_v} = c_{l_h} c_{l_v}$ and the coefficients may be reported as two coefficient vectors $$\{c_{l_h}\}_{l_h=1}^{L_h} \text{ and } \{c_{l_v}\}_{l_v=1}^{L_v}$$

form two coefficient codebooks corresponding to the azimuth and elevation basis sets, respectively. Note that in this case, The final basis vector can be expressed as $w = \sum_{l_h=1}^{L_h} c_{l_h} h_{l_h} \otimes \sum_{l_v=1}^{L_v} c_{l_v} v_{l_v}$.

Fourth, when the basis vector $a_l$ can be further decomposed as $$a_l = \begin{bmatrix} h_l \\ e^{j\phi_l} h_l \end{bmatrix} \otimes v_l$$

for an x-pol 2D antenna array, then depending on the configuration, the set of basis vectors may be determined according to one of the following methods:

One Basis: If the UE is configured with one basis set, then it may determine the basis as follows:

Joint Basis With Co-phasing: The final pre-coding vector may be expressed as $$w = \sum_{l=1}^L c_l \left( \begin{bmatrix} h_l \\ e^{j\phi_l} h_l \end{bmatrix} \otimes v_l \right), \text{ where } \left\{ \begin{bmatrix} h_l \\ e^{j\phi_l} h_l \end{bmatrix} \otimes v_l \right\}_{l=1}^L$$

is the WB basis.

Joint Basis Without Co-phasing: The final pre-coding vector may be expressed as $$w = \begin{bmatrix} \sum_{l=1}^L c_l (h_l \otimes v_l) \\ \sum_{l=1}^L e^{j\phi_l} c_l (h_l \otimes v_l) \end{bmatrix}.$$

$\{h_l \otimes v_l\}_{l=1}^L$ is the WB basis, and $\{\phi_l\}_{l=1}^L$ is the SB co-phasing set. In one method, a common SB co-phasing may be employed for all azimuth basis vectors, i.e., $\phi_l = \phi_k$ for all $l, k \in \{1, 2, \ldots, L\}$. In another method, different SB co-phasing may be employed for different azimuth basis vectors, i.e., $\phi_l = \phi_k$ or $\phi_l \ne \phi_k$ for all $l, k \in \{1, 2, \ldots, L\}$.

Azimuth Basis With Co-phasing: The final pre-coding vector may be expressed as $$w = \sum_{l=1}^{L} c_l \left( \begin{bmatrix} h_l \\ e^{j\phi_l} h_l \end{bmatrix} \right) \otimes v.$$

$$\left\{ \begin{bmatrix} h_l \\ e^{j\phi_l} h_l \end{bmatrix} \right\}_{l=1}^{L}$$

is the WB basis, and v is the SB elevation pre-coder.

Azimuth Basis Without Co-phasing: The final pre-coding vector may be expressed as $$w = \begin{bmatrix} \sum_{l=1}^{L} c_l h_l \\ \sum_{l=1}^{L} e^{j\phi_l} c_l h_l \end{bmatrix} \otimes v.$$

$\{h_l\}_{l=1}^{L}$ is the WB basis, $\{\phi_l\}_{l=1}^{L}$ is the SB co-phasing set, and $\{v_l\}_{l=1}^{L}$ is the SB elevation pre-coder. Again, in one method, the co-phasing may be the same for all azimuth basis vectors. Alternatively, in another method, they may be different.

Elevation Basis: The final pre-coding vector may be expressed as $$w = \begin{bmatrix} h_l \\ e^{j\phi_l} h_l \end{bmatrix} \otimes \left( \sum_{l=1}^{L} c_l v_l \right)$$

$\{v_l\}_{l=1}^{L}$ is the WB basis, and $$\begin{bmatrix} h_l \\ e^{j\phi_l} h_l \end{bmatrix}$$

is the azimuth pre-coder where at least one of $\phi$ and h is SB.

Two Bases: If the UE is configured with two basis sets, one for azimuth and the other for elevation, then it may determine the two basis sets as follows. For $1 \leq l_h \leq L_h$, $1 \leq l_v \leq L_v$, $1 \leq l \leq L$, and $L_h \times L_v = L$, where l indicates the pair $(l_h, l_v)$, the final pre-coding vector may be expressed as either:

$$w = \sum_{l_h=1}^{L_h} \sum_{l_v=1}^{L_v} c_{l_h, l_v} \left( \begin{bmatrix} h_{l_h} \\ e^{j\phi_{l_h}} h_{l_h} \end{bmatrix} \otimes v_{l_v} \right),$$

where $\left\{ \begin{bmatrix} h_{l_h} \\ e^{j\phi_{l_h}} h_{l_h} \end{bmatrix} \right\}_{l_h=1}^{L_h}$ and $\{v_{l_v}\}_{l_v=1}^{L_v}$ respectively are the WB azimuth and elevation basis sets, or $$w = \begin{bmatrix} \sum_{l_h=1}^{L_h} \sum_{l_v=1}^{L_v} c_{l_h, l_v} (h_{l_h} \otimes v_{l_v}) \\ \sum_{l_h=1}^{L_h} \sum_{l_v=1}^{L_v} e^{j\phi_{l_h}} c_{l_h, l_v} (h_{l_h} \otimes v_{l_v}) \end{bmatrix},$$

where $\{h_{l_h}\}_{l_h=1}^{L_h}$ and $\{v_{l_v}\}_{l_v=1}^{L_v}$ respectively are the WB azimuth and elevation basis sets, and $$\{\phi_{l_h}\}_{l_v=1}^{L_v}$$

is the SB co-phasing set. Again, in one method, the co-phasing may be the same for all azimuth basis vectors. Alternatively, in another method, they may be different.

$$\{c_{l_h, l_v}\}_{l_h=1, l_v=1}^{L_h, L_v}$$

is the corresponding SB coefficient vector. In one method, $\{c_l\}_{l=1}^{L}$ may be reported as one coefficient vector. In another method, $c_{l_h, l_v}$ may be decoupled as $c_{l_h, l_v} = c_{l_h} c_{l_v}$ and the coefficients may be reported as two coefficient vectors $$\{c_{l_h}\}_{l_h=1}^{L_h} \text{ and } \{c_{l_v}\}_{l_v=1}^{L_v}.$$

Fifth, when the basis vector $a_l$ can be further decomposed as $$a_l = h_l \otimes \begin{bmatrix} v_l \\ e^{j\phi_l} v_l \end{bmatrix}$$

for a x-pol 2D antenna array, then the set of basis vectors may be determined similar to the above previous case in which $$a_l = \begin{bmatrix} h_l \\ e^{j\phi_l} h_l \end{bmatrix} \otimes v_l.$$

Embodiments of Linear Combination Pre-Coder Calculation Methods:

The codebook search complexity will be very high if all the parameters to comprise a linear combination codebook are jointly considered. For example, suppose that there are 16 candidates for a basis vector set of size L=4; 2-bit quantization is used for each co-phase quantization; and 4-bit quantization is used for the L coefficient quantization. In this case, the number of different combinations resulting in distinct PMI pre-coding vectors is $16 \times 4 \times 4 \times 4 \times 4 \times 16 = 2^{16}$, which is huge complexity and presents challenges to the UE implementation. To cope up with these challenges, this disclosure proposes efficient codebook search methods for the linear combination codebook.

Figure 3:
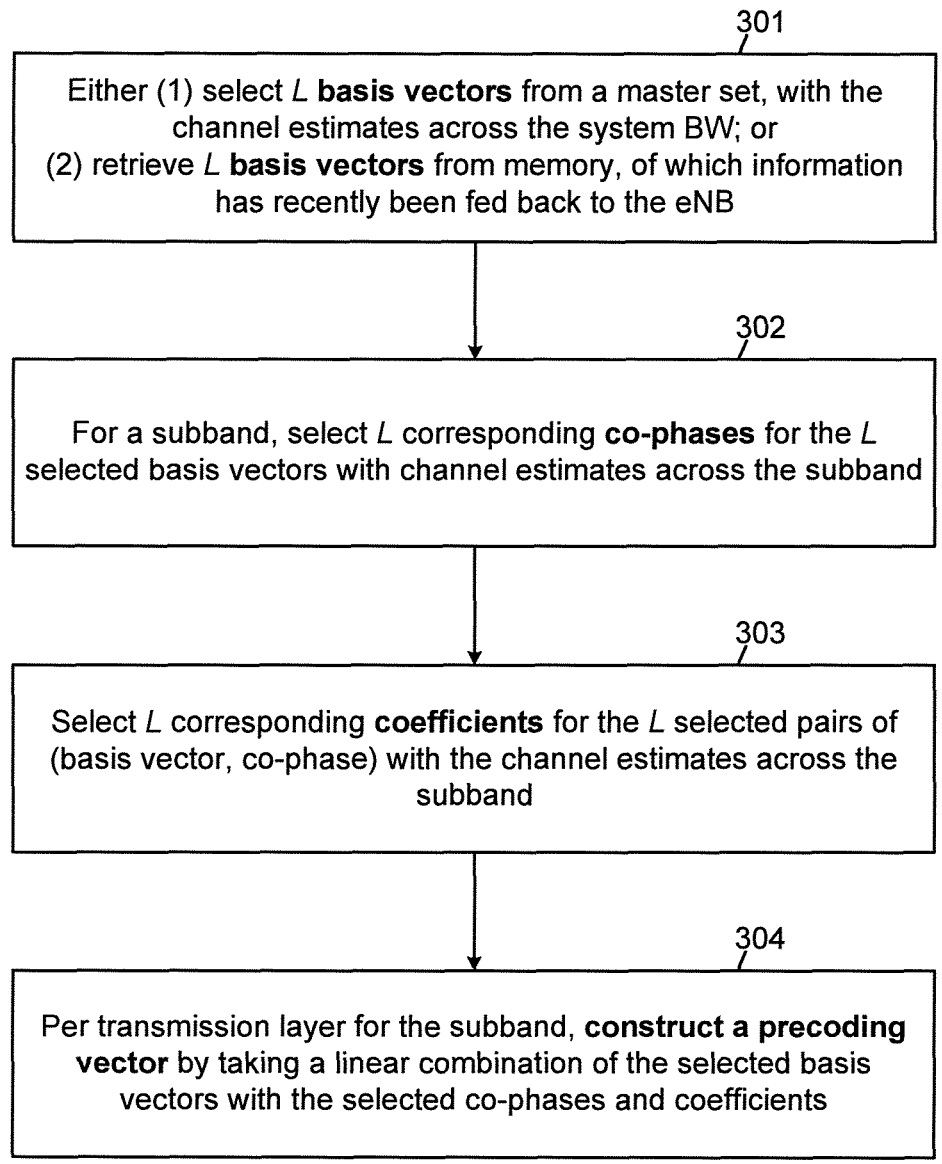
FIGS. 3 and 4 are high level flow diagrams for linear combination pre-coder calculation according to some alternative embodiments of the present disclosure.
Figure 4:
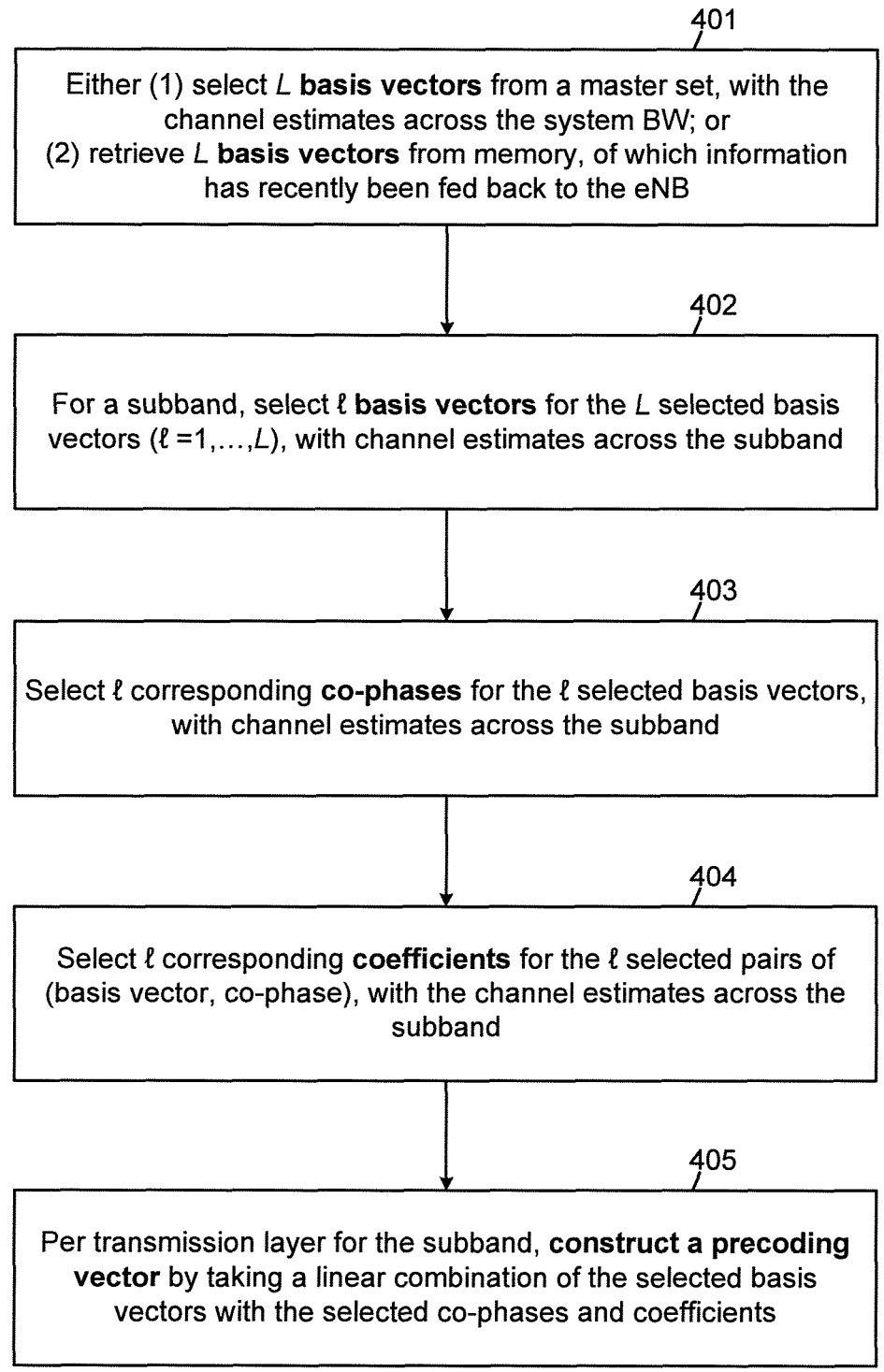

FIGS. 3 and 4 are high level flow diagrams for linear combination pre-coder calculation according to various alternative embodiments of the present disclosure. Some embodiments of this disclosure describe how to efficiently search a PMI pre-coding vector for the linear combination codebook. In some embodiments, as illustrated by the process 300 in FIG. 3, a UE configured with linear combination codebook derives a PMI pre-coder to be reported and to be used for CQI calculation according to the following steps:

Step 301: The UE selects L basis vectors from a master set, with the channel estimates across the system BW. The channel estimates can be obtained with taking into account multiple channel observations obtained with CSI-RS or CRS or a combination of them, across multiple subframes in the past. Alternatively, the UE retrieves L basis vectors from memory, of which information that has recently been fed back to the eNB.

Step 302: Consider a subband for which the UE is configured to report a pair of PMI and CQI. For the subband, the UE selects L corresponding co-phases for the L selected basis vectors with the channel estimates across the subband.

Step 303: The UE selects L corresponding LC coefficients for the L selected pairs of (basis vector, co-phase) with the channel estimates across the subband.

Step 304: Per transmission layer of the subband, the UE constructs a pre-coding vector, by taking a linear combination of the selected basis vectors with the selected co-phases and coefficients according to some embodiments of the current disclosure.

In other embodiments, as illustrated by process 400 in FIG. 4, a UE configured with linear combination codebook derives a PMI pre-coder to be reported and to be used for CQI calculation according to the following steps:

Step 401: The UE selects L basis vectors from a master set, with the channel estimates across the system BW. The channel estimates can be obtained with taking into account multiple channel observations obtained with CSI-RS or CRS or a combination of them, across multiple subframes in the past. Alternatively, the UE retrieves L basis vectors from memory, of which information has recently fed back to the eNB.

Step 402: Consider a subband, for which the UE is configured to report a pair of PMI and CQI. For the subband, the UE selects l basis vectors out of the L selected basis vectors l=(1, . . . , L), with the channel estimates across the subband.

Step 403: The UE selects l corresponding co-phases for the l selected basis vectors with the channel estimates across the subband.

Step 404: The UE selects l corresponding LC coefficients for the l selected pairs of (basis vector, co-phase) with the channel estimates across the subband.

Step 405: Per transmission layer of the subband, the UE constructs a pre-coding vector, by taking a linear combination of the selected basis vectors with the selected co-phases and coefficients according to some embodiments of the current invention.

Figure 5:
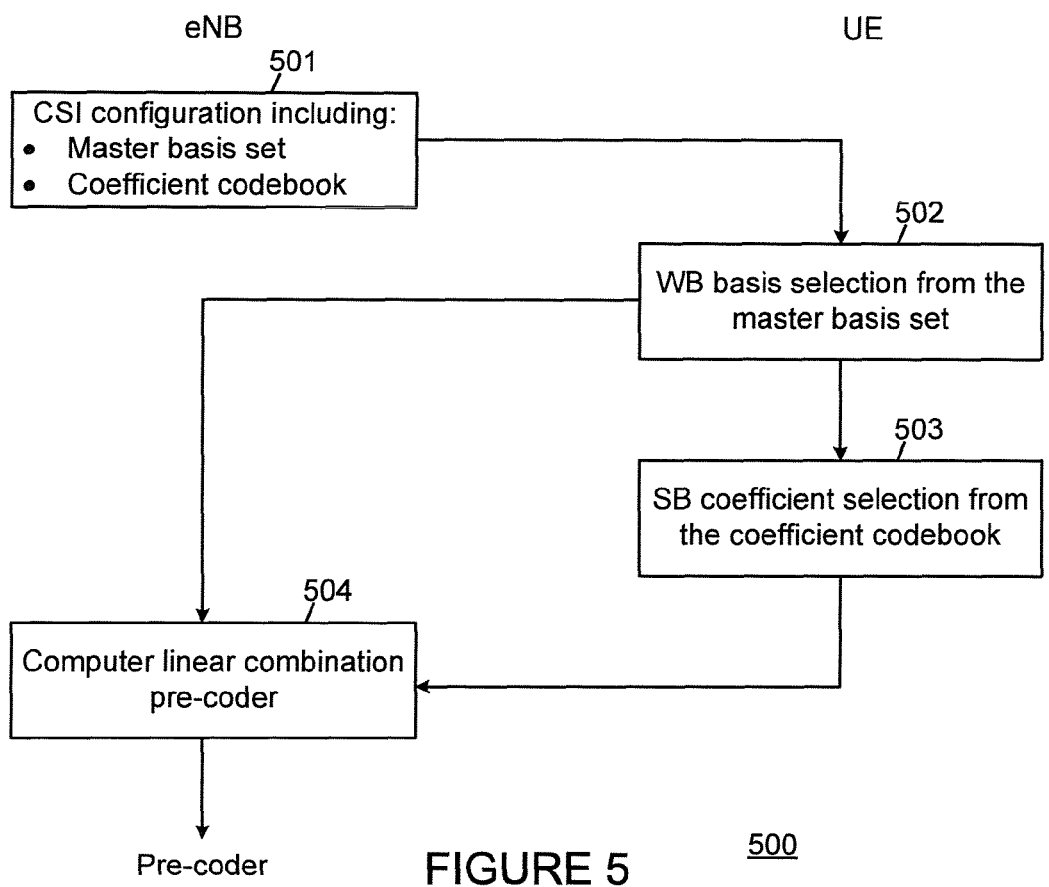
FIG. 5 is a high level flow diagram for linear combination pre-coder calculation according to another alternative embodiment of the present disclosure.

FIG. 5 is a high level flow diagram for linear combination pre-coder calculation according to another alternative embodiment of the present disclosure. FIG. 5 depicts process steps performed at the eNB on the left, and process steps performed at the UE on the right. In some embodiments, as shown by process 500 in FIG. 5, the UE receives the CSI configuration including the master basis set for WB basis selection and the coefficient codebook for SB coefficient selection, as selected by the eNB (step 501). Depending on the configuration, the UE first selects the WB basis from the master basis set according to some embodiments of this disclosure (step 502). Using the selected basis, the UE then selects the SB coefficients from the coefficient codebook according to some embodiments of this disclosure (step 503). The selected WB basis and SB coefficients are then fed back to the eNB according to the configuration. The eNB computes the linear combination to derive the final pre-coder (step 504).

Figure 6:
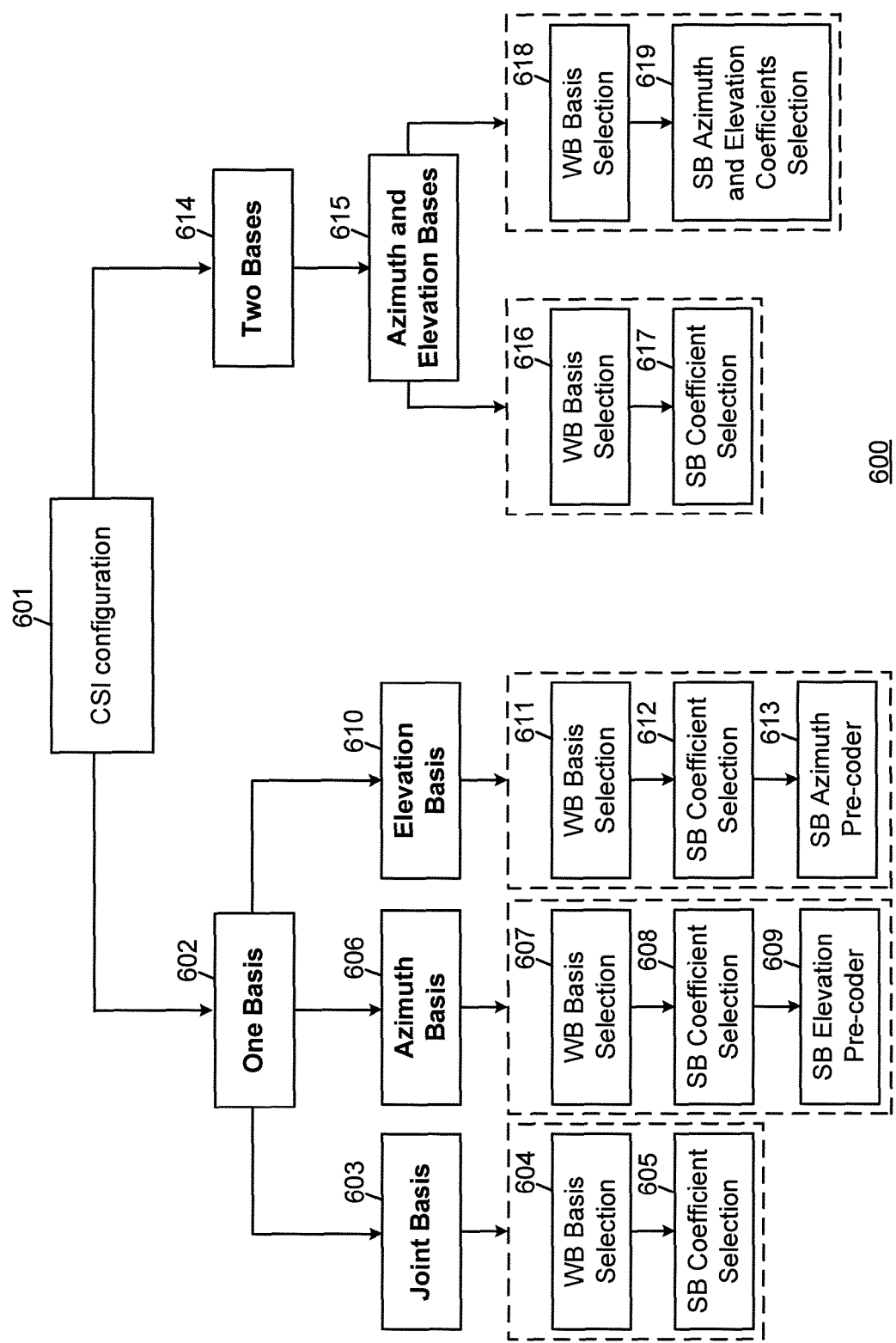
FIG. 6 illustrates some example basis options for linear combination pre-coder calculation according to embodiments of the present disclosure.

In some embodiments, when the basis vector $a_l$ can be decomposed as $a_l = h_l \otimes v_l$ for a co-polarized ("co-pol") 2D antenna array at the eNB, there may be multiple options for the possible basis depending on how we consider the azimuth and elevation dimensions. FIG. 6 illustrates some example basis options of linear combination pre-coder calculation for Kronecker product basis vectors according to embodiments of the present disclosure. In particular, the example of FIG. 6 relates to co-pol 2D antenna arrays. According to the options 600, in one alternative for CSI configuration 601, the UE may be configured with one basis 602, where the basis 602 may be one of a joint basis 603 across the azimuth and elevation dimensions. In this case, the UE selects the basis of configured size by considering Kronecker products of all possible azimuth and elevation pre-coding vectors to determine the WB basis selection 604 and then the SB coefficient selection 605.

In another method, the UE may be configured with one basis 602, where the basis is an azimuth basis 606. In this case, the UE may select the basis of a configured size using the azimuth domain channel and the set of all possible azimuth pre-coding vectors to determine the WB basis selection 607, then the SB coefficient selection 608, and finally the SB elevation pre-coder 609. The azimuth domain channel may be obtained by averaging the full channel across the elevation domain. Alternatively, the UE may perform search for the azimuth basis using the full channel, the set of all possible azimuth pre-coding vectors, and a set of fixed elevation pre-coders to obtain the Kronecker product. In this method, the elevation pre-coder is SB.

In another method, the UE may be configured with one basis 602, where the basis is an elevation basis 610. In this case, the UE may select the basis of a configured size using the elevation domain channel and the set of all possible elevation pre-coding vectors to determine the WB basis selection 611, then the SB coefficient selection 612, and finally the SB azimuth pre-coder 613. The elevation domain channel may be obtained by averaging the full channel across the azimuth domain. Alternatively, the UE may perform search for the elevation basis using the full channel, the set of all possible elevation pre-coding vectors, and a set of fixed azimuth pre-coders to obtain the Kronecker product. In this method, the azimuth pre-coder is SB.

In another method, the UE may be configured with two bases 614, where the two bases 615 include one for the azimuth and the other for the elevation. In this case, the UE selects the two bases 615 of configured sizes by considering Kronecker products between two candidate pre-coding matrices $A_h$ and $A_v$, where $A_h$ and $A_v$ respectively have number of columns equal to the size of the azimuth and elevation bases, and all possible candidates for $A_h$ and $A_v$ are considered in the basis selection. Depending on the configuration, in this method, the SB coefficient may be joint or separate for the two dimensions.

Figure 7A:
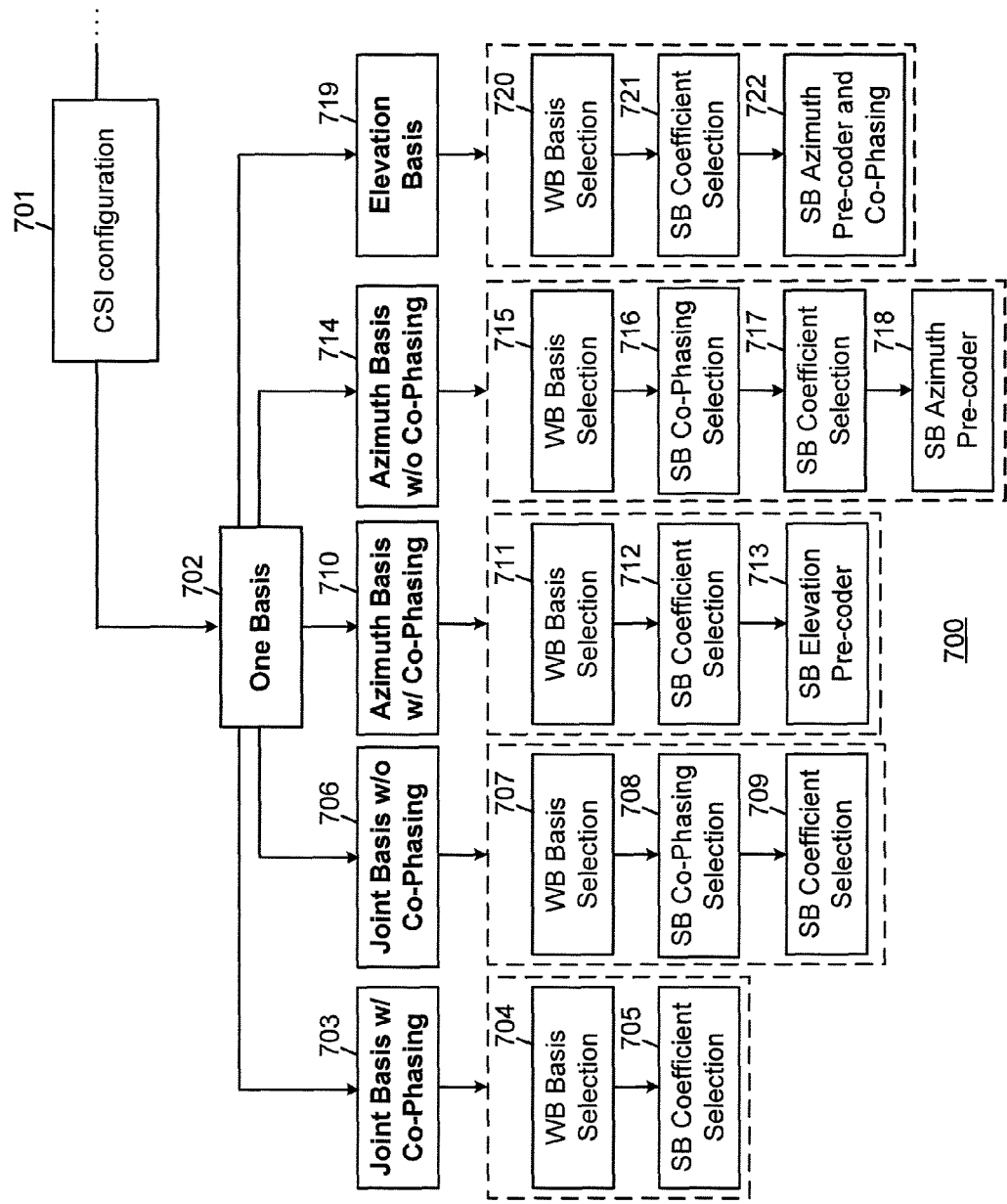
FIGS. 7A and 7B collectively illustrate alternative example basis options for linear combination pre-coder calculation according to embodiments of the present disclosure.
Figure 7B:
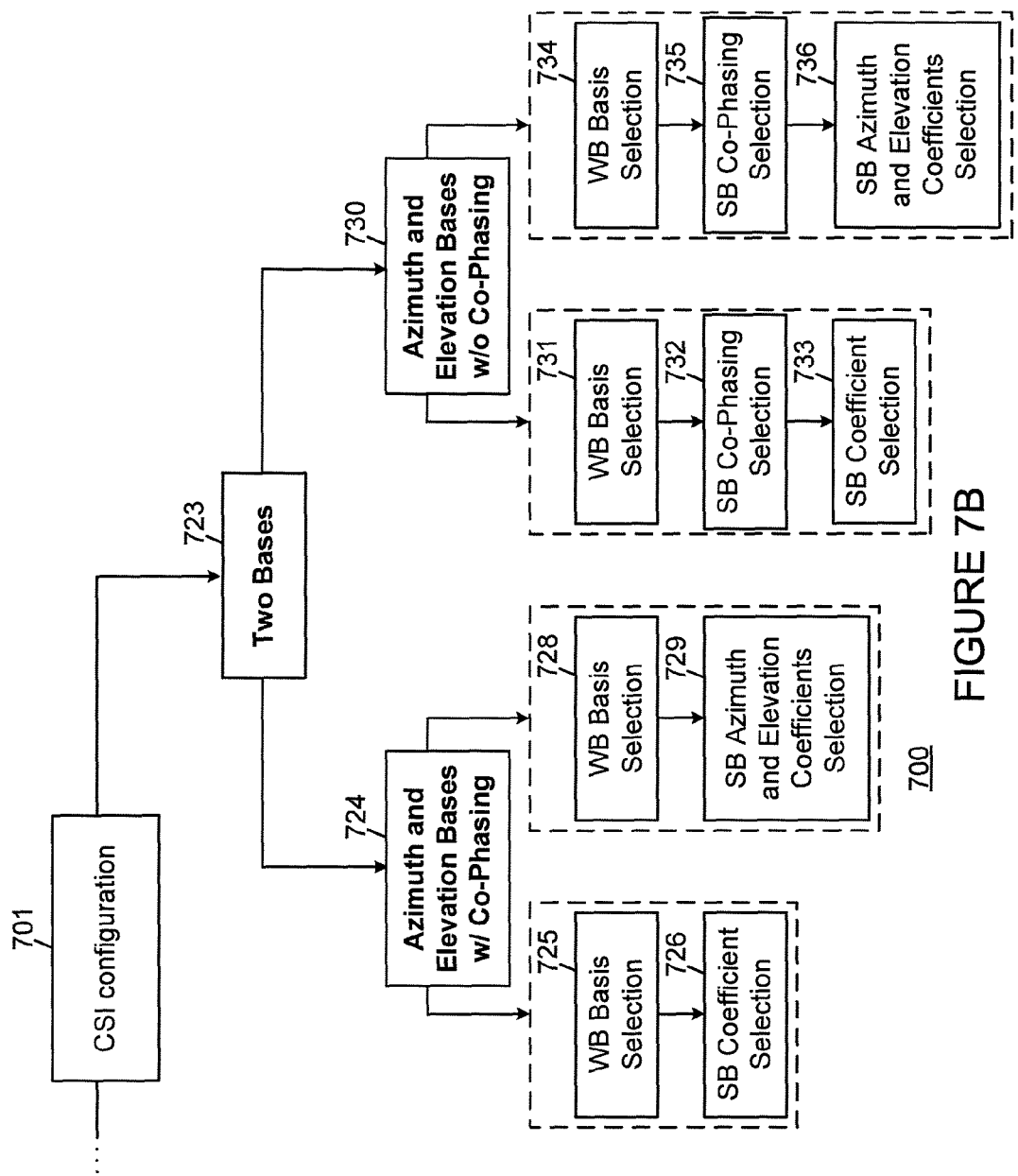

Embodiment when x-Pol is Considered in Azimuth Domain:

In some embodiments, when the basis vector $a_l$ can be decomposed as $$a_l = \begin{bmatrix} h_l \\ e^{j\phi_l} h_l \end{bmatrix} \otimes v_l$$

for a x-pol 2D antenna array at the eNB, there may be multiple options for the possible basis depending on how the azimuth and elevation dimensions are considered, as well as the co-phasing for x-pol in azimuth domain. FIGS. 7A and 7B collectively illustrate some example basis options of linear combination pre-coder calculation for Kronecker product basis vectors according to other embodiments of the present disclosure. In particular, the example of FIGS. 7A and 7B relates to linear combination pre-coder calculation for Kronecker product pre-coder vectors for x-pol 2D antenna arrays where the x-pol is considered in the azimuth domain. According to the options 700, in one method for CSI configuration 701, the UE may be configured with one basis 702, where the basis is a joint basis 703 across the azimuth and elevation dimensions and with azimuth co-phasing for x-pol. In this case, the UE selects the basis of configured size by considering Kronecker products of all possible azimuth and elevation pre-coding vectors with azimuth co-phasing for x-pol to determine the WB basis selection 704 and then the SB coefficient selection 705.

In another method, the UE may be configured with one basis 702, where the basis is a joint basis 706 across the azimuth and elevation dimensions without azimuth co-phasing for x-pol. In this case, the UE selects the basis of configured size by considering Kronecker products of all possible azimuth and elevation pre-coding vectors without azimuth co-phasing for x-pol to determine the WB basis selection 707, then the SB co-phasing selection 709, and then the SB coefficient selection 709. In this method, the azimuth co-phasing for x-pol is SB.

In another method, the UE may be configured with one basis 702, where the basis is an azimuth basis 714 with azimuth co-phasing for x-pol. In this case, the UE may select the basis of configured size using the azimuth domain channel and the set of all possible azimuth pre-coding vectors to determine the WB basis selection 711, then the SB coefficient selection 712, and then the SB elevation pre-coder 713. The azimuth domain channel may be obtained by averaging the full channel across the elevation domain. Alternatively, the UE may perform search for the azimuth basis using the full channel, the set of all possible azimuth pre-coding vectors, and a set of fixed elevation pre-coders to obtain the Kronecker product. In this method, the elevation pre-coder is SB.

In another method, the UE may be configured with one basis 702, where the basis is an azimuth basis 714 without azimuth co-phasing for x-pol. In this case, the UE may select the basis of configured size using the azimuth domain channel and the set of all possible azimuth pre-coding vectors without azimuth co-phasing to determine the WB basis selection 715, then the SB co-phasing selection 716, then the SB coefficient selection 717, and then the SB azimuth pre-coder 718. The azimuth domain channel may be obtained by averaging the full channel across the elevation domain. Alternatively, the UE may perform search for the azimuth basis using the full channel, the set of all possible azimuth pre-coding vectors without azimuth co-phasing, and a set of fixed elevation pre-coders and azimuth co-phasing to obtain the Kronecker product. In this method, the elevation pre-coder and azimuth co-phasing are SB.

In another method, the UE may be configured with one basis 702, where the basis is an elevation basis 719. In this case, the UE may select the basis of configured size using the elevation domain channel and the set of all possible elevation pre-coding vectors to determine the WB basis selection 720, then the SB coefficient selection 721, and then the SB azimuth pre-coder and co-phasing 722. The elevation domain channel may be obtained by averaging the full channel across the azimuth domain. Alternatively, the UE may perform search for the elevation basis using the full channel, the set of all possible elevation pre-coding vectors, and a set of fixed azimuth pre-coders to obtain the Kronecker product. In this method, at least one of the azimuth pre-coder and azimuth co-phasing is SB.

In another method for CSI configuration 701, the UE may be configured with two bases 723, one for the azimuth and the other for the elevation, and with azimuth co-phasing for x-pol 724. In this case, the UE selects the two bases of configured sizes by considering Kronecker products between two candidate pre-coding matrices $A_h$ and $A_v$ to determine either the WB basis selection 725 and then the SB coefficient selection 726 or the WB basis selection 728 and then the SB azimuth and elevation coefficients selection 729. $A_h$ and $A_v$ respectively have number of columns equal to the size of the azimuth and elevation bases, and all possible candidates for $A_h$ and $A_v$ are considered in the basis selection. Depending on the configuration, in this method, the SB coefficient may be joint or separate for the two dimensions.

In another method, the UE may be configured with two bases 723, one for the azimuth and the other for the elevation, and without azimuth co-phasing for x-pol 730. In this case, the UE selects the two bases of configured sizes by considering Kronecker products between two candidate pre-coding matrices $A_h$ and $A_v$ to determine either: the WB basis selection 725, then the SB co-phasing selection 732, and then the SB coefficient selection 733; or the WB basis selection 734, then the SB co-phasing selection 735, and then the SB azimuth and elevation coefficients selection 736. $A_h$ and $A_v$ respectively have number of columns equal to the size of the azimuth and elevation bases, and all possible candidates for $A_h$ and $A_v$ are considered in the basis selection. Depending on the configuration, in this method, the SB coefficient may be joint or separate for the two dimensions.

Embodiment when x-Pol is Considered in Elevation Domain:

In some embodiments, when the basis vector $a_l$ can be decomposed as $$a_l = h_l \otimes \begin{bmatrix} v_l \\ e^{j\phi_l} v_l \end{bmatrix}$$

for a x-pol 2D antenna array at the eNB, there may be multiple options for the possible basis depending on consider the azimuth and elevation dimensions are considered, as well as the co-phasing for x-pol in elevation domain. Basis options similar to the azimuth case described above may also be applied in this case.

Embodiment on Basis Selection Methods:

The basis vector set $\{a_l\}_{l=1}^{L}$ may be determined by considering the power of measurements corresponding to candidate basis vector sets from the master basis vector set comprising $\bar{L} \geq L$ basis vectors. Let $P(F, a_l) = \Sigma_{f \in F} |H_f a_l|^2$ be the power measurement for the candidate basis vector $a_l$, where $H_f$ is an $N_R \times N_P$ 2D channel corresponding to the subcarrier f ($N_R$ is number of Rx antennas at each UE) and F is the set of considered subcarriers. For example, F is the WB subcarrier set if we are interested in WB power measurement, and it is the SB subcarrier set if we are interested in SB power measurement. Similarly, let us denote by $$P(F,\{a_l\}_{l=1}^L,\{c_l\}_{l=1}^L) = \Sigma_{f \in F}|H_f c_l a_l|^2$$

the total power for a chosen candidate basis set $\{a_l\}_{l=1}^L$, comprising L basis vectors selected from the master set and coefficients $\{c_l\}_{l=1}^L$.

In one method, $\{a_l\}_{l=1}^L$ is determined by selecting the L basis vectors with the largest sum power, i.e., L basis vectors with the largest summation of $P(F,a_l)$ values, where F is WB. In another method, $\{a_l\}_{l=1}^L$ is determined jointly by considering all possible candidate basis vector sets of size L, i.e., $$\text{argmax}_{\{a_l\}_{l=1}^L} \left( \max_{\{c_l\}_{l=1}^L} P(F, \{a_l\}_{l=1}^L, \{c_l\}_{l=1}^L) \right),$$

where the optimization is over the set of all possible basis sets of size L, $\{a_l\}_{l=1}^L$, that are selected from a master basis set of size larger than L.

In another method, $\{a_l\}_{l=1}^L$ is determined iteratively where, in each iteration, a subset of basis vectors are fixed and the rest of the basis vectors are searched for. For example, in the case when L=4, in iteration 1, we may fix 3 basis vectors and search for the fourth basis vector, then fix the basis vector that is already searched and search for another basis vector, and continue in this manner until all 4 basis vectors are searched for. The method may either stop or continue iterating depending on a stopping rule.

In one method, the subset of basis vectors that are fixed and those that are searched for in each iteration may be the same.

In another method, the subset of basis vectors that are fixed and those that are searched for may change from iteration to iteration. For example, in iteration 1, we search for one basis vector and fix the remaining, while in iteration 2 we search for 2 basis vectors and fix the remaining, and continue in this manner.

In another method, the set of candidate basis vectors may reduce with iteration. For example, after iteration 1, a subset of basis vectors that are expected to have least powers may not be included in iteration 2.

In another method, the basis search may be constrained. For example,

L basis vectors must have a fixed rank r≤L, or they must have a maximum correlation, or they must have a certain maximum condition number, i.e., the ratio of largest and smallest eigenvalues of A*A, where $A=[a_1, a_2, \ldots, a_L]$ is a basis matrix in which columns are basis vectors.

For the joint and iterative basis selection methods, in order to calculate power of considered basis, we need coefficients $\{c_l\}_{l=1}^L$ to linearly combine the basis vectors. In one method, the coefficients may be chosen from a set. For example, the coefficient may be chosen from the singleton set $$\{c_l\}_{l=1}^L = \left\{ \frac{1, 1, \ldots, 1}{\sqrt{L}} \right\}.$$

In another method, the coefficients correspond to the dominant eigenvector (with the largest eigenvalue) of the WB channel projected on the candidate set of basis vectors, i.e., $c_l = a_l^* e_1$, l=1, ..., L, where the dominant eigenvector corresponds to the largest eigenvalue of average channel $$\bar{H} = \frac{1}{F} \Sigma_{f \in F} H_f^* H_f.$$

In another method, the coefficients correspond to the vector obtained by pre-multiplying the dominant eigenvector of the WB channel with the pseudo-inverse of the basis vector set, i.e., $\{c_l\}_{l=1}^L = (A^*A)^{-1}A^*e_1$, where $A=[a_1, a_2, \ldots, a_L]$ is a basis matrix in which columns are basis vectors. It is noted that the coefficients in this solution is the least-square (LS) solution to minimize the squared error:

$$\{c_l\}_{l=1}^L = \arg\min_{\{c_l\}_{l=1}^L} \left\| e_1 - \sum_{l=1}^L c_l a_l \right\|^2.$$

Embodiment on Coefficient Selection Methods:

After basis selection, the SB coefficients $\{c_l\}_{l=1}^L$ may be determined by considering the power after linear combination utilizing one of the following exemplary methods.

In one method, the coefficients may be chosen from a coefficient codebook by performing the full codebook search. For example, the coefficients that maximizes the power after linear combination with the basis vector set may be selected, i.e., $$\{c_l\}_{l=1}^L = \arg\max_{\{c_l\}_{l=1}^L \in C} (P(F, \{a_l\}_{l=1}^L, \{c_l\}_{l=1}^L)),$$

where C is the coefficient codebook, and F is SB.

In another method, the coefficients may be chosen from a coefficient codebook by performing the partial codebook search. In one variant, the partial codebook search is based on the power measurements. For example, we may obtain a subset of the coefficient codebook C by considering only those coefficient vectors in the codebook that have large power. We then perform the coefficient selection from this subset. In another variant, if the codebook to quantize each coefficient is a quadrature phase shift keying (QPSK) codebook {1 j −1 −j}, then we may apply the following method to perform partial coefficient codebook search:

We first find the unquantized coefficients using the least squares (LS) solution, for example.

Figure 9:
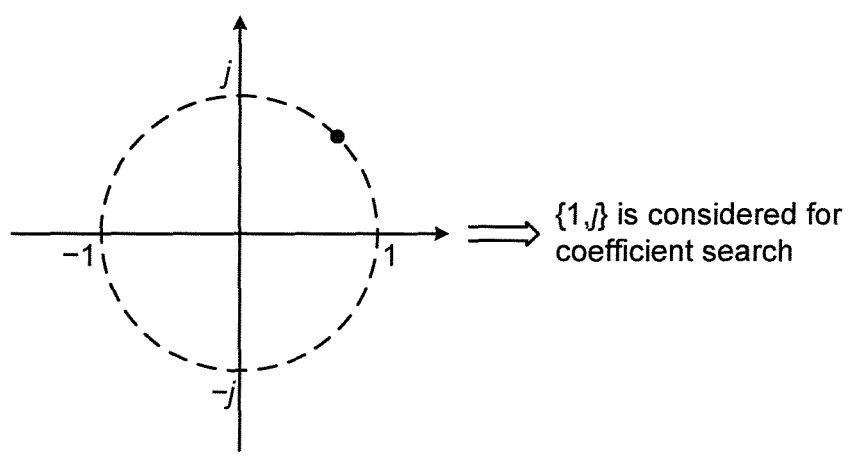
FIG. 9 is an illustration of mapping an unquantized coefficient to two nearest coefficients from the codebook.

Then, for each unquantized coefficient, we determine the quadrant to which it belongs. FIG. 9 shows an example in which the unquantized coefficient falls in the first quadrant.

Using the quadrant information, we obtain a subset of the coefficient codebook for the quantization of that particular coefficient. For example, we consider the two nearest coefficient values from the coefficient codebook to form the subset. In FIG. 9, the two nearest coefficients from the codebook are {1 j}.

We then construct a partial coefficient codebook by considering all possible combinations of coefficient vectors such that their components belong to the corresponding subsets of coefficients that are obtained the previous step.

Finally, we perform the coefficient selection from the constructed partial coefficient codebook.

In another method, the unquantized coefficients are computed first, and then they are quantized to a coefficient vector from the coefficient codebook. In one variant, the unquantized coefficients correspond to the dominant eigenvector of the average SB channel covariance matrix projected on the basis vector set, i.e., $c_l = e_1^* a_l$, $l = 1, \ldots, L$, where $e_1$ is the dominant eigenvector (corresponding to the largest eigenvalue) of the average SB (F) channel covariance matrix $$\bar{H} = \frac{1}{F}\Sigma_{f \in F} H_f^* H_f.$$

Another variant to improve the quantization accuracy is as follows: The unquantized coefficients correspond to the dominant eigenvector of $A^H \bar{H} A$, where $A = [a_1, a_2, \ldots, a_L]$ an is the basis matrix in which columns are basis vectors and $\bar{H}$ is defined as before. It is noted that if $N_R = 1$, this method reduces to the first variant of the preceding method.

In another method, the coefficients correspond to the vector obtained by pre-multiplying the dominant eigenvector ($e_1$) of the average SB channel covariance matrix ($\bar{H}$) with the pseudo-inverse of the basis vector set, i.e., $\{c_l\}_{l=1}^L = (A^*A)^{-1} A^* e_1$, where $A = [a_1, a_2, \ldots, a_L]$ an is basis matrix in which columns are basis vectors. It is noted that the coefficients in this solution is the least-square (LS) solution to minimize the squared error:

$$\{c_l\}_{l=1}^L = \arg\min_{\{c_l\}_{l=1}^L} \left\| e_1 - \sum_{l=1}^L c_l a_l \right\|^2.$$

To quantize the coefficients, we may use metric such as one or both of the following: The maximum absolute value of the inner product between the unquantized and quantized coefficients, i.e., $$\{c_l\}_{l=1}^L = \arg\max_{a = \{c_l\}_{l=1}^L \in C} |a^* b|^2,$$

where b is the unquantized coefficients. The minimum absolute value of the difference between the unquantized and quantized coefficients, i.e., $$\{c_l\}_{l=1}^L = \arg\min_{a = \{c_l\}_{l=1}^L \in C} |a - b|^2,$$

where b is the unquantized coefficients.

Embodiment on Co-Phasing Selection Methods:

In the case of an x-pol antenna array, UE may select the SB or WB co-phase utilizing the power of pre-coded channels obtained with applying candidate linear combination pre-coders constructed with a candidate co-phase, utilizing one of the following example methods.

In one method, the co-phasing factors may be chosen from a co-phasing codebook. For example, the co-phasing that maximizes the power of the pre-coded channel may be selected. In one variant, the co-phasing for L basis vectors are selected separately according to the following:

$$\alpha_1 = \arg\max_{\alpha_1 \in \Phi} \frac{1}{|F|} \sum_{f \in F} \left| H_f \begin{bmatrix} a_l \\ \alpha_1 a_l \end{bmatrix} \right|^2,$$

where $\Phi$ is the co-phasing codebook and F is WB or SB. An example of a unit-magnitude co-phasing codebook of size T is $$\Phi = \left\{ e^{\frac{i 2\pi t}{T}} : t = 0, 1, \ldots, T-1 \right\}.$$

Note that $a_l = h_l \otimes v_l$ in case of a Kronecker product pre-coder.

In another variant, the co-phasing for L basis vectors are jointly selected according to the following:

$$\alpha_1 = \arg\max_{\alpha_1 \in \Phi^L} \frac{1}{|F|} \sum_{f \in F} \left| H_f \sum_{l=1}^L c_l \begin{bmatrix} a_l \\ \alpha_1 a_l \end{bmatrix} \right|^2,$$

where $\Phi^L$ is the set of all co-phasing combinations of size L from $\Phi$.

In another variant, they are selected iteratively where, in each iteration, co-phasings for a subset of basis vectors are fixed and that for the rest of the basis vectors are searched for. There may be many different iterative methods similar to the ones mentioned above in the embodiment on basis selection methods.

In another method, the co-phase values may be chosen from a co-phase codebook by performing the partial codebook search. Two examples of the partial codebook search are explained above in the coefficient selection methods.

In another method, the unquantized co-phasing is computed first, and then it is quantized to a co-phasing value from the co-phasing codebook $\Phi$. This method is much more computationally efficient than the first method, and it maintains the optimality in terms of performance.

For each $a_l$, the unquantized unit-magnitude co-phasing is computed separately as $$\alpha_1 = \frac{a_l^* C^* a_l}{|a_l^* C a_l|},$$

which can be derived according to:

$$\alpha_1 = \arg\max_\alpha \frac{1}{|F|} \sum_{f \in F} \left| H_f \begin{bmatrix} a_l \\ \alpha_1 a_l \end{bmatrix} \right|^2 = \max_\alpha 2\mathrm{Re}(\alpha(a_l^* C^* a_l)),$$

$$\text{where } \bar{H} = \frac{1}{F} \sum_{f \in F} H_f^* H_f = \begin{bmatrix} D & C \\ C^* & E \end{bmatrix}.$$

In an alternative, for all $a_l$, the unquantized co-phasing are computed jointly:

$$\{\alpha_1\}_{l=1}^L = \arg\max_{\{\alpha_1\}_{l=1}^L} \frac{1}{|F|} \sum_{f \in F} \left| H_f \sum_{l=1}^L c_l \begin{bmatrix} a_l \\ \alpha_1 a_l \end{bmatrix} \right|^2.$$

In another alternative, the unquantized co-phasing is computed iteratively where, in each iteration, co-phasings for a subset of basis vectors are fixed and those for the rest of the basis vectors are searched for, similar to methods mentioned earlier in this disclosure.

To quantize the co-phasing, we may use one or both of the following metrics: The maximum absolute value of the inner product between the unquantized and quantized co-phasing, i.e., $$\{\alpha_l\}_{l=1}^L = \operatorname{argmax}_{a=\{\alpha_l\}_{l=1}^L \in \Phi^L} |a * b|^2,$$

where b is the unquantized co-phasing. The minimum absolute value of the difference between the unquantized and quantized coefficients, i.e., $$\{\alpha_l\}_{l=1}^L = \operatorname{argmax}_{a=\{\alpha_l\}_{l=1}^L \in \Phi^L} |a - b|^2,$$

where b is the unquantized coefficients.

In some methods, we may have the same co-phasing for all vectors, and in some other method they may different.

Linear Combination PMI Codebooks for MIMO Wireless Communication Systems

In this disclosure, the details of linear combination PMI codebooks and PMI calculation methods are described.

In some embodiments, the PMI calculation according to proposed linear combination framework can be summarized as follows:

First, for each subband in which the UE is configured to report the PMI, the UE derives the PMI corresponding to the pre-coding vector:

$$w = \sum_{l=1}^L c_l a_l = A_I c_I = [A_J, A_{I \setminus J}] \begin{bmatrix} c_J \\ 0 \end{bmatrix},$$

where $I = \{1, 2, \ldots, L\}$ is the index set of WB basis vectors, and $A_I = [a_1, a_2, \ldots, a_L]$ is the WB basis matrix whose columns are WB basis vectors that are selected from a master set of basis vectors using the channel measurements across the system BW. $J \subseteq L$ is the index set of selected basis vectors for linear combination, and $A_J$ is the corresponding beam selection matrix with $|J|$ columns selected from the columns of $A_I$ corresponding to the index set J. The notation $A_{I \setminus J}$ corresponds to the columns of $A_I$ that are not selected in the linear combination. $|J| \in S \subseteq \{1, 2, \ldots, L\}$, where S is a set of number of selected beams. For example: If $S = \{1\}$, then only one beam is selected, i.e., $J \in \{\{1\}, \{2\}, \ldots, \{L\}\}$; If $S = \{L\}$, then all L beams are selected, i.e., $J \in I$; If $S = \{1, 2\}$ then at most 2 beams are selected from I, i.e., J is selected from the set of $$\binom{L}{1} + \binom{L}{2}$$

candidate beam selections.

For x-pol antenna arrays in which the basis vector $a_l$ can be decomposed as $$a_l = \begin{bmatrix} b_l \\ e^{j\phi_l} b_l \end{bmatrix},$$

the co-phasings $\{\phi_l\}_{l \in J}$ corresponding to the index set J are also selected. In one method, the co-phasings are selected from a co-phasing codebook. In another method, the unquantized co-phasings are calculated, and then quantized to co-phasing values from the co-phasing codebook. An example of the co-phasing codebook is $\{1\ -1\ j\ -j\}$.

$c_J$ is the selected complex coefficient vector to linearly combine the columns of the beam selection matrix $A_J$. In one method, the magnitude and phase of the complex coefficients $c_J$ are reported separately using a magnitude codebook and a phase codebook:

Magnitude codebook: In one method, the magnitude codebook is constant-modulus. For example, the $$\text{magnitude vector} = \frac{1}{\sqrt{|J|}} \begin{bmatrix} 1 \\ 1 \\ 1 \\ 1 \end{bmatrix}.$$

In another method, the magnitude vector is non-constant-modulus. For example, the magnitude vector may be selected from $$\left\{ \sqrt{\frac{1}{\sum_{i=1}^{|J|} m_i}} \begin{bmatrix} m_1 \\ m_2 \\ \vdots \\ m_{|J|} \end{bmatrix} : m_i \in \{1, 2, \ldots, K\} \right\},$$

where $K \geq 2$ is an integer.

Phase codebook: In one method, the phase codebook is agnostic to the number of selected beams $|J|$. For example, the phase vector may be selected from $$\left\{ \begin{bmatrix} \alpha_1 \\ \alpha_2 \\ \vdots \\ \alpha_{|J|} \end{bmatrix} : \forall i \in \{2, \ldots, |J|\}, \alpha_i \in \{1, -1, j, -j\} \right\}.$$

In another method, the phase codebook is specific to the number of selected beams $|J|$. For example: the phase vector may be selected from the $|J|$-Tx DFT phase codebook with oversampling factor $$F: \left\{ \begin{bmatrix} 1 \\ e^{\frac{i 2 \pi m}{|J|F}} \\ \vdots \\ e^{\frac{i 2 \pi (|J|-1) m}{|J|F}} \end{bmatrix} : \forall m \in \{0, 1, 2, \ldots, |J|F - 1\} \right\}.$$

In another method, the magnitude and phase of the complex coefficients $c_J$ are reported together using a complex coefficient codebook.

The coefficient vector $c_J$ may or may not be normalized to a fixed value, for example 1.

Depending on the configuration, a few of or all of the beam selection matrix, the co-phasings of the selected beams, the magnitudes and the phases of the coefficients are either WB or SB. In one method, all of them are SB. In another method, all of them are WB. In another method, a subset of them are SB, and the rest are WB. For instance, the beam selection matrix, the co-phasings of the selected beams, and the phases of the coefficients are SB, and the magnitudes of the coefficients are WB.

The set (S) of number of selected beams in a SB, i.e., number of columns of $A_J$ (or $|J|$), may be determined according to configuration. In one method, the configuration about S may be WB and hence remains the same for all configured SBs. For example: if S={L}, then J=I for all SBs, and if S={1}, then J∈{{1},{2}, ..., {L}}. In another method, the configuration about the number of selected beams is such that it may change from one SB to another SB. For example: if S={1,2}, then in one SB, $|J|$ may be 1, and in another SB, it may be of 2.

For a given number of selected beams ($|J|$) in S, there may be additional constraints to select the beam combinations. In one method, the select beams may be consecutive, for example: {i, i+1, ..., i+|J|−1}, where i is the first beam index. In another method, the select beams may be uniformly spaced, for example: {i,i+k+1, ..., i+k+|J|−1}, where i is the first beam index, and k≥0 is the spacing between the beams. In another method, the select beams may be either consecutive or uniformly spaced. In another method, the select beams may be unconstrained.

The information about the beam selection matrix S and any constraints to select the beam combinations needs to be available at the eNB. In one method, they may be reported by the UE to the eNB based on the measurements. In another method, the information may be included in the CSI configuration. For example, in case of L=4, a 4-bit field can be included in the CSI configuration to indicate unconstrained beam selection of any number of selected beams. In another method, they may be indicated using the higher-layer RRC signaling.

When the basis vector $a_l$ can be decomposed as $a_l = h_l \otimes v_l$ for a co-pol 2D antenna array, and $$a_l = \begin{bmatrix} h_l \\ e^{j\phi_l} h_l \end{bmatrix} \otimes v_l$$

or $$a_l = h_l \otimes \begin{bmatrix} v_l \\ e^{j\phi_l} v_l \end{bmatrix}$$

for a x-pol 2D antenna array, and the UE is configured with two WB basis sets, one for azimuth and the other for elevation, then depending on the configuration, in a subband, the UE may perform beam selection using one or both basis sets. Let $L_h$ and $L_v$ respectively denote the total number of beams in azimuth and elevation basis sets, and let $l_h$ and $l_v$ respectively denote the number of beams selected from the azimuth and elevation basis sets in a subband. In one method, the UE may be configured with one beam selection set for either azimuth or elevation. In another method, the UE may be configured with two beam selection sets: a set $S_h$ for the beam selection from the azimuth basis set, and another set $S_v$ for the beam selection from the elevation basis set. In another method, the UE may be configured with one beam selection set $S=\{(l_h,l_v)\}$ of pairs $(l_h,l_v)$ for the joint beam selection from azimuth and elevation basis sets.

Figure 8:
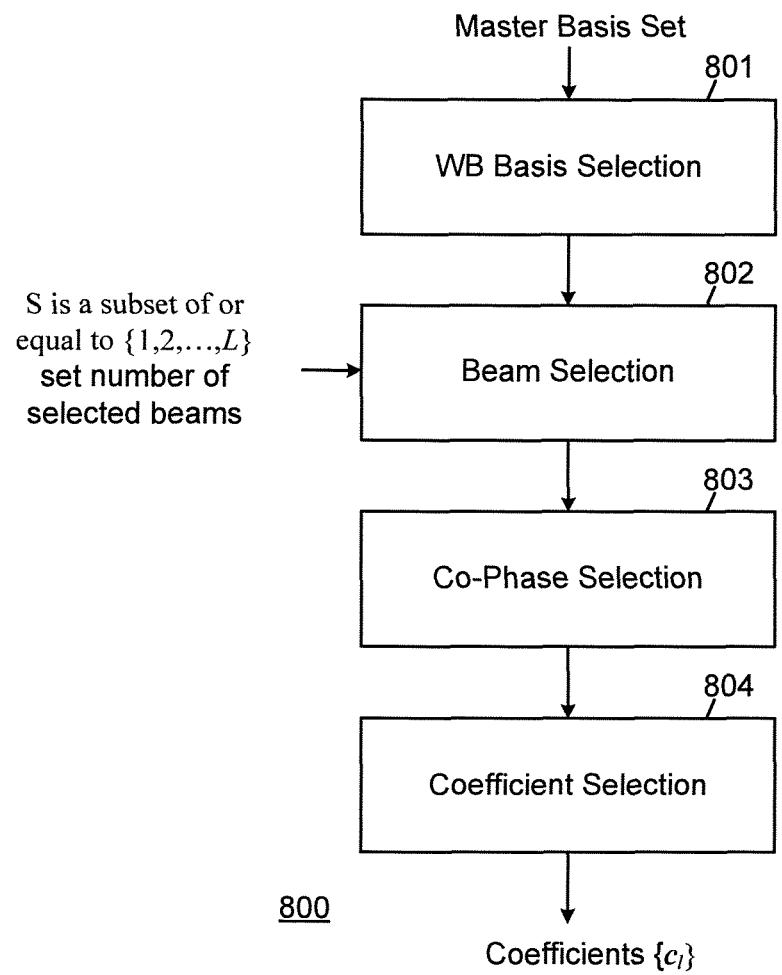
FIG. 8 is a high level diagram illustrating UE implementation of linear combination pre-coder calculation according to embodiments of the present disclosure.

Embodiment on UE Implementation:

FIG. 8 is a high level diagram illustrating UE implementation of linear combination pre-coder calculation according to embodiments of the present disclosure. In some embodiments, as illustrated in FIG. 8, a UE configured with linear combination codebook comes up with a PMI pre-coder to be reported and to be used for CQI calculation in the following steps:

Step 801: The UE selects WB basis consisting of L basis vectors from a master set, with the channel estimates across the system BW. The channel estimates can be obtained with taking into account multiple channel observations obtained with CSI-RS or CRS or a combination of them, across multiple subframes in the past. Alternatively, the UE retrieves L basis vectors from memory, of which information has recently fed back to the eNB.

Step 802: Consider a subband, for which the UE is configured to report a pair of PMI and CQI. For the subband, the UE selects a subset of the WB basis vectors, with the channel estimates across the subband. The selected beams or basis vector index set J may be chosen from a set of subsets of the WB basis index set I={1, 2, ..., L}. The size of subsets may be determined by configuring the set (S) of number of selected beams. For example: for L=4, J may be selected from the set of all subsets of at most size 2, i.e., J∈{{1},{2},{3},{4},{1,2},{1,3},{1,4},{2,3},{2,4},{3,4}}.

Step 803: For a x-pol antenna array, the UE may select co-phases for the $|J|$ selected beams with the channel estimates across the subband. Alternatively, the UE uses the WB co-phasings of the selected beams that were calculated together with the WB basis.

Step 804: The UE selects $|J|$ corresponding coefficients for the $|J|$ selected basis vectors (and co-phases) with the channel estimates across the subband. The UE may select at least one of the magnitude and the phase of the complex coefficients separately. Alternatively, the UE selects both of them jointly.

Per transmission layer of the subband, the UE constructs a pre-coding vector, by taking a linear combination of the selected basis vectors with the selected co-phases and coefficients.

In some embodiments, in which the UE is configured to select: (a) all L=4 basis vectors (i.e., S={4}), (b) co-phases for the 4 beams from the (QPSK) co-phase codebook $C_{co-ph}=\{1\ -1\ j\ -j\}$, and (c) constant-modulus coefficients from the (cross-polarized phase shift keying or "x-PSK") phase codebook $C_{ph}$. For example, if a co-phase value is selected for each basis vector from $C_{co-ph}=\{1\ -1\ j\ -j\}$, then we have $4^4=256$ possible co-phase combinations for the 4 basis vectors, and if a phase value is selected for each coefficient from the (BPSK) phase codebook $C_{ph}=\{1\ -a\}$, then we have $2^3=8$ phase combinations for the 4 coefficients. So, in total, 8+3=11 bits will be spent for the co-phase and coefficient quantization.

In some embodiments, in which the UE is configured to select: (a) basis vectors comprising any number of consecutive beams out of L=4 basis vectors (i.e., S={1,2,3,4}), which may be 1 set with 4 selected basis {1,2,3,4},
2 sets with 3 selected vectors {1,2,3},{2,3,4},
3 sets with 2 selected vectors {1,2},{2,3},{3,4}, or
4 sets with 1 selected vectors {1},{2},{3},{4}, (b) co-phases for the 4 beams from the (QPSK) co-phase codebook $C_{co-ph}=\{1\ -1\ j\ -j\}$, and (c) constant-modulus coefficients from the (x-PSK) phase codebook $C_{ph}$. For example, if a co-phase value is selected for each basis vector from $C_{co-ph}=\{1\ -1\ j\ -j\}$ and a phase value is selected for each coefficient from the (BPSK) phase codebook $C_{ph}=\{1\ -1\}$, then we have $\Sigma_{i=1}^{4}\ 4^i \times 2^{i-1} \times (4-i+1)=2672$, which corresponds to $\lceil \log_2 2672 \rceil=12$ bits for the co-phase and coefficient quantization.

In some embodiments, in which the UE is configured to select (a) basis vectors comprising any number of beams out of L=4 basis vectors (i.e., S={1,2,3,4}),
  1 set with 4 selected basis {1,2,3,4},
  4 sets with 3 selected vectors {1,2,3},{2,3,4},{1,2,4},{1,3,4},
  6 sets with 2 selected vectors {1,2},{2,3},{3,4},{1,3},{1,4},{2,4}, or
  4 sets with 1 selected vectors {1},{2},{3},{4},
(b) co-phases for the 4 beams from the (QPSK) co-phase codebook $C_{co-ph}=\{1\ -1\ j\ -j\}$, and (a) constant-modulus coefficients from the (x-PSK) phase codebook $C_{ph}$. For example, if a co-phase value is selected for each basis vector from $C_{co-ph}=\{1\ -1\ j\ -j\}$ and a phase value is selected for each coefficient from the (BPSK) phase codebook $C_{ph}=\{1\ -1\}$, then we have $$\sum_{i=1}^{4} 4^i \times 2^{i-1} \times \binom{4}{i} = 3280,$$

which corresponds to $\lceil \log_e 3280 \rceil=12$ bits for the co-phase and coefficient quantization.

Details on PMI Codebooks:

Embodiments on PMI Codebooks (Separate Magnitude and Phase Selection):

Let $C_{co-ph}$ be the co-phase codebook to select the co-phase values for the selected beams, and let $C_m$ and $C_{ph}$ respectively be the scalar magnitude and phase codebooks when the magnitude and phase of the coefficients are selected separately.

In some embodiment, the UE determines L WB basis m (beams) according to some embodiments of this invention, and then for each subband in which the UE is configured to report PMI and CQI, it determines
  Number of selected beams |J| from the beam selection set S,
  Index set of the selected beams J,
  Co-phase of the selected beams $\{\phi_l\}_{l \in J}$ from $C_{co-ph}$,
  Magnitude of the complex coefficients $$\begin{bmatrix} m_1 \\ m_2 \\ \vdots \\ m_{|J|} \end{bmatrix}$$

from $C_m$, and
  Phase of the complex coefficients $$\begin{bmatrix} 1 \\ \alpha_2 \\ \vdots \\ \alpha_{|J|} \end{bmatrix}$$

from $C_{ph}$.

The UE then feeds back the PMI index of the corresponding linear combination pre-coder from the PMI index table. The PMI index corresponds to an integer in [0,T(S)−1], where T(S) is the total number of possible linear combination pre-coders corresponding to the beam selection set S:

$$T(S) = \sum_{|J| \in S} t_{|J|},$$

where $$t_{|J|} \stackrel{def}{=} \binom{L}{|J|} |C_{co-ph}|^{|J|} |C_{ph}|^{|J|-1} |C_m|^{|J|-1}.$$

The number of bits to report the PMI index depends on the beam selection set S. For a given S, the number of bits to indicate the PMI index is given by $\lceil b_{PMI}=\log_2 T(S) \rceil$.

For brevity, let us use the notation $T_0=0$, and $T_n=T\{1, 2, \ldots, n\}$. An example of the full PMI codebook (i.e., S={1, 2, …, L}) is illustrated in TABLES 5A through 5D, which collectively illustrate a PMI codebook for a WB basis of size L (separate magnitude and phase selection):

TABLE 5A

| PMI index | Number of selected beams | Offset | Beam selection index |
|---|---|---|---|
| i | \|J\| | x | $i_1 = \left\lfloor \dfrac{1-x}{\|C_{co-ph}\|^{\|J\|} \|C_{ph}\|^{\|J\|-1} \|C_m\|^{\|J\|-1}} \right\rfloor$ |
| $(T_0, \ldots, T_1 - 1)$ | 1 | 0 | {1} |
|  |  |  | {2} |
|  |  |  | … |
|  |  |  | {L} |
| $(T_1, \ldots, T_2 - 1)$ | 2 | $T_1$ | {1, 2} |
|  |  |  | {1, 3} |
|  |  |  | {1, 4} |
|  |  |  | … |
|  |  |  | {L−1, L} |
| . | . | . | . |
| . | . | . | . |
| . | . | . | . |
| $(T_{L-1}, \ldots, T_L - 1)$ | L | $T_{L-1}$ | {1, 2, …, L} |

TABLE 5B

| PMI index | Number of selected beams | Offset | Co-phase index |
|---|---|---|---|
| i | \|J\| | x | $i_2 = \left\lfloor \dfrac{(1-x) \bmod (\|C_{co-ph}\|^{\|J\|} \|C_{ph}\|^{\|J\|-1} \|C_m\|^{\|J\|-1})}{\|C_{ph}\|^{\|J\|-1} \|C_m\|^{\|J\|-1}} \right\rfloor$ |
| $(T_0, \ldots, T_1 - 1)$ | 1 | 0 | $0, 1, 2, \ldots, \|C_{co-ph}\| - 1$ |
| $(T_1, \ldots, T_2 - 1)$ | 2 | $T_1$ | $0, 1, 2, \ldots, \|C_{co-ph}\|^2 - 1$ |
| . | . | . | . |
| . | . | . | . |
| . | . | . | . |
| $(T_{L-1}, \ldots, T_L - 1)$ | L | $T_{L-1}$ | $0, 1, 2, \ldots, \|C_{co-ph}\|^L - 1$ |

TABLE 5C

| PMI index | Number of selected beams | Offset | Coefficient phase index |
|---|---|---|---|
| i | \|J\| | x | $i_3 = \left\lfloor \dfrac{\left(\begin{array}{c}(1-x) \\ \mathrm{mod}(\|C_{co-ph}\|^{\|J\|}\|C_{ph}\|^{\|J\|-1}\|C_m\|^{\|J\|-1}) \\ \mathrm{mod}\|C_{ph}\|^{\|J\|-1}\|C_m\|^{\|J\|-1} \end{array}\right)}{\|C_m\|^{\|J\|-1}} \right\rfloor$ |
| $(T_0, \ldots, T_1 - 1)$ | 1 | 0 | — |
| $(T_1, \ldots, T_2 - 1)$ | 2 | $T_1$ | $0, 1, 2, \ldots, \|C_{ph}\| - 1$ |
| . | . | . | . |
| . | . | . | . |
| . | . | . | . |
| $(T_{L-1}, \ldots, T_L - 1)$ | L | $T_{L-1}$ | $0, 1, 2, \ldots, \|C_{ph}\|^{L-1} - 1$ |

TABLE 5D

| PMI index | Number of selected beams | Offset | Coefficient magnitude index |
|---|---|---|---|
| i | \|J\| | x | $i_4 = (1-x)$ $\mathrm{mod}\|C_{co-ph}\|^{\|J\|}\|C_{ph}\|^{\|J\|-1}\|C_m\|^{\|J\|-1}$ $\mathrm{mod}\|C_{ph}\|^{\|J\|-1}\|C_m\|^{\|J\|-1}$ $\mathrm{mod}\|C_m\|^{\|J\|-1}$ |
| $(T_0, \ldots, T_1 - 1)$ | 1 | 0 | — |
| $(T_1, \ldots, T_2 - 1)$ | 2 | $T_1$ | $0, 1, 2, \ldots, \|C_m\| - 1$ |
| . | . | . | . |
| . | . | . | . |
| . | . | . | . |
| $(T_{L-1}, \ldots, T_L - 1)$ | L | $T_{L-1}$ | $0, 1, 2, \ldots, \|C_m\|^{L-1} - 1$ |

In some embodiments, when the beam selections set S is a strict subset of $\{1, 2, \ldots, L\}$, then only a subset of rows of TABLES 5A through 5D that correspond to the set S are considered in PMI calculation, which may help reduce the number of bits to report the PMI index. For example, when $S=\{1\}$, then first row of the table is considered. Similarly, when $S=\{L\}$, then the last row is considered.

In some embodiments, when some or all of number of selected beams, selected beams, co-phasings of the selected beams, coefficient magnitudes and coefficient phases are pre-determined or pre-configured as WB/SB, then the PMI calculation may be restricted to only relevant PMI indices (rows). In one method, the number of selected beams is configured to remain the same across all SBs, for example $\|J\|=1$. In another method, the selected beams is configured to remain the same across all SBs, for example $J=\{1, 2, \ldots, L\}$. In another method, the UE may be configured to report the WB co-phase of L basis vectors, which may be determined based on WB channel measurements while determining the WB basis vectors. In another method, the coefficients may be configured to be constant-modulus. In another method, the UE may be configured to report the WB magnitude and SB phase of the coefficients. In that case, the UE calculates the WB magnitude of the coefficients corresponding to all possible beam combinations according to the configured beam selection set S.

In another method, the UE may be configured to report the SB magnitude and WB phase of the coefficients. In that case, the UE calculates the WB phase of the coefficients corresponding to all possible beam combinations according to the configured beam selection set S.

In some embodiments, the beam selection set S may be chosen based on a table of allocated number of PMI feedback bits per SB, for different options for S. For example, the chosen S may be the one with the maximum size |S| for a given number of bits for PMI index reporting. An example of one such table is shown in TABLE 6, corresponding to the PMI codebook in TABLES 5A through 5D.

TABLE 6

Number of PMI feedback bits for PMI codebook in TABLES 5A-5D

| Beam selection set S | Number of PMI feedback bits $b_{PMI}$ |
|---|---|
| {1} | $b_1$ |
| {2} | $b_2$ |
| . | . |
| . | . |
| . | . |
| {L} | $b_L$ |
| {1, 2} | $b_{1,2}$ |
| {1, 3} | $b_{1,3}$ |
| {1, 4} | $b_{1,4}$ |
| . | . |
| . | . |
| . | . |
| {L − 1, L} | $b_{L-1, L}$ |
| . | . |
| . | . |
| . | . |
| {1, 2, . . . , L} | $b_{1, 2, \ldots, L}$ |

In some embodiment, the UE may be configured with specific codebooks $C_m$ and $C_{ph}$ for different values of number of selected beams (|J|). The UE may then derive the PMI index from a PMI table similar to the PMI tables in some of the embodiments of this disclosure. Later in this disclosure, we use the notation $C_{m,|J|}$ and $C_{ph,|J|}$ to show the dependency of the two codebooks on |j|.

Embodiments on PMI Codebooks for L=4:
Embodiments on Constant-Modulus Coefficients:
In some embodiments, in which the UE is configured with L=4,
the SB beam selection set S,
the constant-modulus coefficients,
the SB co-phase codebook $C_{co-ph}=\{1\ -1\ j\ -j\}$, and
the SB coefficient phase codebook $C_{ph}=\{1\ -1\}$,
then the UE may calculate the PMI index according to the PMI codebook in TABLES 7A through 7C, which collectively illustrate a PMI Codebook for L=4, constant-modulus coefficient codebook.

TABLE 7A

| PMI index i | Number of selected beams $|J|$ | Offset x | Beam selection index $i_1 = \left\lfloor \dfrac{1-x}{|C_{co-ph}|^{|J|}|C_{ph}|^{|J|-1}} \right\rfloor$ |
|---|---|---|---|
| 0-15 | 1 | 0 | {1} |
|  |  |  | {2} |
|  |  |  | {3} |
|  |  |  | {4} |
| 16-207 | 2 | 16 | {1, 2} |
|  |  |  | {1, 3} |
|  |  |  | {1, 4} |
|  |  |  | {2, 3} |
|  |  |  | {2, 4} |
|  |  |  | {3, 4} |
| 208-1231 | 3 | 208 | {1, 2, 3} |
|  |  |  | {1, 2, 4} |
|  |  |  | {1, 3, 4} |
|  |  |  | {2, 3, 4} |
| 1232-3280 | 4 | 1232 | {1, 2, 3, 4} |

TABLE 7B

| PMI index i | Number of selected beams $|J|$ | Offset x | Co-phase index $i_2 = \left\lfloor \dfrac{(1-x)\bmod(|C_{co-ph}|^{|J|}|C_{ph}|^{|J|-1})}{|C_{ph}|^{|J|-1}} \right\rfloor$ |
|---|---|---|---|
| 0-15 | 1 | 0 | 0, 1, 2, ... , 3 |
| 16-207 | 2 | 16 | 0, 1, 2, ... , 15 |
| 208-1231 | 3 | 208 | 0, 1, 2, ... , 63 |
| 1232-3280 | 4 | 1232 | 0, 1, 2, ... , 255 |

TABLE 7C

| PMI index i | Number of selected beams $|J|$ | Offset x | Coefficient phase index $i_3 = (1-x) \bmod |C_{co-ph}|^{|J|}|C_{ph}|^{|J|-1} \bmod |C_{ph}|^{|J|-1}$ |
|---|---|---|---|
| 0-15 | 1 | 0 | — |
| 16-207 | 2 | 16 | 0, 1 |
| 208-1231 | 3 | 208 | 0, 1, 2, 3 |
| 1232-3280 | 4 | 1232 | 0, 1, 2, ... , 7 |

The configured beam selection set S may be chosen based on the table of allocated number of PMI feedback bits per SB. An example of one such table is shown in TABLE 8, corresponding to the PMI codebook in TABLES 7A-7C.

TABLE 8

Number of PMI feedback bits for PMI codebook in TABLES 7A-7C

| Beam selection set S | $\sum_{|J| \in S} \binom{4}{|J|}$ | Co-phase index $|C_{co-ph}|^{|J|}$ | Coefficient phase index $|C_{ph}|^{|J|-1}$ | Total ($t_{\cup J}$) | Number of bits $b_{PMI}$ |
|---|---|---|---|---|---|
| {1} | 4 | 4 | 1 | 16 | 4 |
| {2} | 6 | 16 | 2 | 192 | 8 |
| {3} | 4 | 64 | 4 | 1024 | 10 |
| {4} | 1 | 256 | 8 | 2048 | 11 |
| {1, 2} | 10 |  |  | 16 + 192 | 8 |
| {1, 3} | 8 |  |  | 16 + 1024 | 11 |
| {1, 4} | 5 |  |  | 16 + 2048 | 12 |
| ... |  |  |  | ... | ... |
| {1, 2, 3, 4} | 15 |  |  | 16 + 192 + 0124 + 2048 | 12 |

In some embodiments, to reduce the PMI feedback overhead, the UE may be configured with the WB co-phasings of the selected beams. The UE may then derive the PMI according to the following PMI codebook TABLE 9. The corresponding table of PMI feedback bits is tabulated in TABLE 10.

TABLE 9

PMI Codebook for L = 4, constant-modulus coefficient codebook, and WB co-phase

| PMI index | Number of selected beams $|J|$ | Offset x | Beam selection index $i_1 = \left\lfloor \dfrac{1-x}{|C_{ph}|^{|J|-1}} \right\rfloor$ | Coefficient phase index $i_2 = (1-x) \bmod |C_{ph}|^{|J|-1}$ |
|---|---|---|---|---|
| 0-3 | 1 | 0 | {1} | — |
|  |  |  | {2} |  |
|  |  |  | {3} |  |
|  |  |  | {4} |  |

TABLE 9-continued

PMI Codebook for L = 4, constant-modulus coefficient codebook, and WB co-phase

| PMI index | Number of selected beams | Offset | Beam selection index | Coefficient phase index |
|---|---|---|---|---|
| 4-15 | 2 | 4 | {1, 2}<br>{1, 3}<br>{1, 4}<br>{2, 3}<br>{2, 4}<br>{3, 4} | 0, 1 |
| 16-31 | 3 | 16 | {1, 2, 3}<br>{1, 2, 4}<br>{1, 3, 4}<br>{2, 3, 4} | 0, 1, 2, 3 |
| 32-39 | 4 | 32 | {1, 2, . . . ,7} | 0, 1, . . . , 7 |

TABLE 10

Number of PMI feedback bits for PMI codebook in TABLE 9

| Beam selection set S | $\sum_{|J|\in S}\binom{4}{|J|}$ | Coefficient phase index $|C_{ph}|^{|J|-1}$ | Total ($t_{\cup J}$) | Number of bits $b_{PMI}$ |
|---|---|---|---|---|
| {1} | 4 | 1 | 4 | 2 |
| {2} | 6 | 2 | 12 | 4 |
| {3} | 4 | 4 | 16 | 4 |
| {4} | 1 | 8 | 8 | 3 |
| {1, 2} | 10 | | 4 + 12 | 4 |
| {1, 3} | 8 | | 4 + 16 | 5 |
| {1, 4} | 5 | | 4 + 8 | 6 |
| . . . | | | . . . | . . . |
| {1, 2, 3, 4} | 15 | | 4 + 12 + 16 + 8 | 6 |

Embodiments on Constant-Modulus Coefficients with DFT Phase:

In some embodiments, in which the UE is configured with L=4,
the SB beam selection set S,
the constant-modulus coefficients,
the SB or WB co-phase codebook $C_{co-ph}=\{1\ -1\ j\ -j\}$, and
the SB DFT coefficient phase codebook $$C_{ph,|J|} = \left\{ \begin{bmatrix} 1 \\ e^{\frac{i2\pi m}{|J|F}} \\ \vdots \\ e^{\frac{i2\pi(|J|-1)m}{|J|F}} \end{bmatrix} : \forall m \in \{0, 1, 2, \ldots, |J|F - 1\} \right\} \text{ for } |J| \in S.$$

The DFT coefficient phase codebook for the oversampling factor F=1 is tabulated in TABLE 11.

TABLE 11

DFT coefficient phase codebooks (oversampling factor F = 1)

| |J| | DFT phase codebook Coop |
|---|---|
| 1 | {1} |
| 2 | $\left\{ \begin{bmatrix} 1 \\ 1 \end{bmatrix}, \begin{bmatrix} 1 \\ -1 \end{bmatrix} \right\}$ |

TABLE 11-continued

DFT coefficient phase codebooks (oversampling factor F = 1)

| |J| | DFT phase codebook Coop |
|---|---|
| 3 | $\left\{ \begin{bmatrix} 1 \\ 1 \\ 1 \end{bmatrix}, \begin{bmatrix} 1 \\ -\frac{1}{2}+\frac{\sqrt{3}}{2}j \\ -\frac{1}{2}-\frac{\sqrt{3}}{2}j \end{bmatrix}, \begin{bmatrix} 1 \\ -\frac{1}{2}-\frac{\sqrt{3}}{2}j \\ -\frac{1}{2}+\frac{\sqrt{3}}{2}j \end{bmatrix} \right\}$ |
| 4 | $\left\{ \begin{bmatrix} 1 \\ 1 \\ 1 \\ 1 \end{bmatrix}, \begin{bmatrix} 1 \\ j \\ -1 \\ -j \end{bmatrix}, \begin{bmatrix} 1 \\ -1 \\ 1 \\ -1 \end{bmatrix}, \begin{bmatrix} 1 \\ -j \\ -1 \\ j \end{bmatrix} \right\}$ |

If the DFT coefficient phase codebook is configured to be according to TABLE 11, then the UE may calculate the PMI index according to the PMI codebook in TABLES 12A through 12C, which collectively illustrate a PMI Codebook for L=4, constant-modulus and DFT phase coefficients. The corresponding table of PMI feedback bits for both WB and SB co-phasing of the selected beams is tabulated in TABLE 13.

TABLE 12A

| PMI index | Number of selected beams | Offset | Beam selection index |
|---|---|---|---|
| i | |J| | x | $i_1 = \left\lfloor \frac{1-x}{|C_{co-ph}|^{|J|}|C_{ph,|J|}|} \right\rfloor$ |
| 0-15 | 1 | 0 | {1}<br>{2}<br>{3}<br>{4} |
| 16-207 | 2 | 16 | {1, 2}<br>{1, 3}<br>{1, 4}<br>{2, 3}<br>{2, 4}<br>{3, 4} |
| 208-975 | 3 | 208 | {1, 2, 3}<br>{1, 2, 4}<br>{1, 3, 4}<br>{2, 3, 4} |
| 976-1999 | 4 | 976 | {1, 2, 3, 4} |

TABLE 12B

| PMI index i | Number of selected beams \|J\| | Offset x | Co-phase index $i_2 = \left\lfloor \frac{(1-x)\bmod(\|C_{co-ph}\|^{\|J\|}\|C_{ph,\|J\|}\|)}{\|C_{ph,\|J\|}\|} \right\rfloor$ |
|---|---|---|---|
| 0-15 | 1 | 0 | 0, 1, 2, ..., 3 |
| 16-207 | 2 | 16 | 0, 1, 2, ..., 15 |
| 208-975 | 3 | 208 | 0, 1, 2, ..., 63 |
| 975-1999 | 4 | 976 | 0, 1, 2, ..., 255 |

TABLE 12C

| PMI index i | Number of selected beams \|J\| | Offset x | Coefficient phase index $i_3 = (1-x)$ $\bmod\|C_{co-ph}\|^{\|J\|}\|C_{ph,\|J\|}\|\bmod\|C_{ph,\|J\|}\|$ |
|---|---|---|---|
| 0-15 | 1 | 0 | — |
| 16-207 | 2 | 16 | 0, 1 |
| 208-975 | 3 | 208 | 0, 1, 2 |
| 975-1999 | 4 | 976 | 0, 1, 2, 3 |

TABLE 13

Number of PMI feedback bits for PMI codebook in TABLE 12A-12C

| Beam selection set S | $\sum_{\|J\|\in S} \binom{4}{\|J\|}$ | Co-phase index $\|C_{co-ph}\|^{\|J\|}$ | Coefficient phase index $\|C_{ph,\|J\|}\|$ | Number of bits $b_{PMI}$ SB co-phase | WB co-phase |
|---|---|---|---|---|---|
| {1} | 4 | 4 | 1 | 4 | 2 |
| {2} | 6 | 16 | 2 | 8 | 4 |
| {3} | 4 | 64 | 4 | 10 | 4 |
| {4} | 1 | 256 | 8 | 10 | 2 |
| {1, 2} | 10 | | | 8 | 4 |
| {1, 3} | 8 | | | 10 | 4 |
| {1, 4} | 5 | | | 11 | 3 |
| ... | | | | ... | ... |
| {1, 2, 3, 4} | 15 | | | 11 | 5 |

Embodiments on Non-Constant-Modulus Coefficients:

In Some Embodiments, in which the UE is Configured with

L=4, the SB beam selection set S, the SB or WB co-phase codebook $C_{co-ph}=\{1\ -1\ j\ -j\}$, the SB DFT coefficient phase codebook $C_{ph,\|j\|}$ as in TABLE 11, and the SB coefficient magnitude codebook $$C_{m,\|J\|} = \left\{ \frac{1}{\sqrt{\sum_{i=}^{\|J\|} m_i}} \begin{bmatrix} m_1 \\ m_2 \\ \vdots \\ m_{\|J\|} \end{bmatrix} : m_i \in \{1, 2, \ldots, K\} \right\},$$

where K≥2 is an integer. The coefficient magnitude codebook with K=2 is tabulated in TABLE 14.

TABLE 14

Coefficient magnitude codebooks (K = 1)

| \|J\| | DFT phase codebook $C_{ph,\ \|J\|}$ |
|---|---|
| 1 | {1} |
| 2 | $\left\{ \frac{1}{\sqrt{2}}\begin{bmatrix}1\\1\end{bmatrix}, \frac{1}{\sqrt{3}}\begin{bmatrix}1\\\sqrt{2}\end{bmatrix}, \frac{1}{\sqrt{3}}\begin{bmatrix}\sqrt{2}\\1\end{bmatrix} \right\}$ |
| 3 | $\left\{ \frac{1}{\sqrt{3}}\begin{bmatrix}1\\1\\1\end{bmatrix}, \frac{1}{2}\begin{bmatrix}1\\1\\\sqrt{2}\end{bmatrix}, \frac{1}{2}\begin{bmatrix}1\\\sqrt{2}\\1\end{bmatrix}, \frac{1}{2}\begin{bmatrix}\sqrt{2}\\1\\1\end{bmatrix}, \frac{1}{\sqrt{5}}\begin{bmatrix}\sqrt{2}\\1\\\sqrt{2}\end{bmatrix}, \frac{1}{\sqrt{5}}\begin{bmatrix}\sqrt{2}\\\sqrt{2}\\1\end{bmatrix}, \frac{1}{\sqrt{5}}\begin{bmatrix}1\\\sqrt{2}\\\sqrt{2}\end{bmatrix} \right\}$ |
| 4 | $\left\{ \frac{1}{2}\begin{bmatrix}1\\1\\1\\1\end{bmatrix}, \frac{1}{\sqrt{5}}\begin{bmatrix}1\\1\\1\\\sqrt{2}\end{bmatrix}, \frac{1}{\sqrt{5}}\begin{bmatrix}1\\1\\\sqrt{2}\\1\end{bmatrix}, \frac{1}{\sqrt{5}}\begin{bmatrix}1\\\sqrt{2}\\1\\1\end{bmatrix}, \frac{1}{\sqrt{5}}\begin{bmatrix}\sqrt{2}\\1\\1\\1\end{bmatrix}, \frac{1}{\sqrt{6}}\begin{bmatrix}1\\1\\\sqrt{2}\\\sqrt{2}\end{bmatrix}, \frac{1}{\sqrt{6}}\begin{bmatrix}1\\\sqrt{2}\\1\\\sqrt{2}\end{bmatrix}, \frac{1}{\sqrt{6}}\begin{bmatrix}1\\\sqrt{2}\\\sqrt{2}\\1\end{bmatrix}, \frac{1}{\sqrt{6}}\begin{bmatrix}\sqrt{2}\\1\\1\\\sqrt{2}\end{bmatrix}, \frac{1}{\sqrt{6}}\begin{bmatrix}\sqrt{2}\\1\\\sqrt{2}\\1\end{bmatrix}, \frac{1}{\sqrt{6}}\begin{bmatrix}\sqrt{2}\\\sqrt{2}\\1\\1\end{bmatrix}, \frac{1}{\sqrt{7}}\begin{bmatrix}1\\\sqrt{2}\\\sqrt{2}\\\sqrt{2}\end{bmatrix}, \frac{1}{\sqrt{7}}\begin{bmatrix}\sqrt{2}\\1\\\sqrt{2}\\\sqrt{2}\end{bmatrix}, \frac{1}{\sqrt{7}}\begin{bmatrix}\sqrt{2}\\\sqrt{2}\\1\\\sqrt{2}\end{bmatrix}, \frac{1}{\sqrt{7}}\begin{bmatrix}\sqrt{2}\\\sqrt{2}\\\sqrt{2}\\1\end{bmatrix} \right\}$ |

If the coefficient magnitude codebook is configured to be according to TABLE 14, then the UE may calculate the PMI index according to the PMI codebook in TABLES 15A through 15D, which collectively illustrate a PMI codebook for L=4, non-constant-modulus coefficients with DFT phase. The corresponding table of PMI feedback bits for both WB and SB co-phasing of the selected beams is tabulated in TABLE 16.

TABLE 15A

| PMI index | Number of selected beams | Offset | Beam selection index |
|---|---|---|---|
| i | $|J|$ | x | $i_1 = \left\lfloor \frac{1-x}{|C_{co-ph}|^{|J|}|C_{ph,|J|}||C_{m,|J|}|} \right\rfloor$ |
| 0-15 | 1 | 0 | {1} |
|  |  |  | {2} |
|  |  |  | {3} |
|  |  |  | {4} |
| 16-591 | 2 | 16 | {1, 2} |
|  |  |  | {1, 3} |
|  |  |  | {1, 4} |
|  |  |  | {2, 3} |
|  |  |  | {2, 4} |
|  |  |  | {3, 4} |
| 592-5967 | 3 | 592 | {1, 2, 3} |
|  |  |  | {1, 2, 4} |
|  |  |  | {1, 3, 4} |
|  |  |  | {2, 3, 4} |
| 5968-21327 | 4 | 5968 | {1, 2, 3, 4} |

TABLE 15B

| PMI index | Number of selected beams | Offset | Co-phase index |
|---|---|---|---|
| i | $|J|$ | x | $i_2 = \left\lfloor \frac{(1-x)\bmod(|C_{co-ph}|^{|J|}|C_{ph,|J|}||C_{m,|J|}|)}{|C_{ph}|^{|J|-1}|C_{m,|J|}|} \right\rfloor$ |
| 0-15 | 1 | 0 | 0, 1, . . . , 3 |
| 16-591 | 2 | 16 | 0, 1, . . . , 15 |
| 592-5967 | 3 | 592 | 0, 1, . . . , 63 |
| 5968-21327 | 4 | 5968 | 0, 1, . . . , 255 |

TABLE 15C

| PMI index | Number of selected beams | Offset | Coefficient phase index |
|---|---|---|---|
| i | $|J|$ | x | $i_3 = \left\lfloor \frac{\bmod\left|C_{co-ph}|^{|J|}|C_{ph,|J|}||C_{m,|J|}|\right.}{|C_{m,|J|}|} \right\rfloor$ |
| 0-15 | 1 | 0 | — |
| 16-591 | 2 | 16 | 0, 1 |
| 592-5967 | 3 | 592 | 0, 1, 2 |
| 5968-21327 | 4 | 5968 | 0, 1, 2, 3 |

TABLE 15D

| PMI index | Number of selected beams | Offset | Coefficient magnitude index |
|---|---|---|---|
| i | $|J|$ | x | $i_4 = (1-x)$ |
|  |  |  | $\bmod|C_{co-ph}|^{|J|}|C_{ph}|^{|J|-1}|C_m|^{|J|-1}$ |
|  |  |  | $\bmod|C_{ph}|^{|J|-1}|C_m|^{|J|-1}$ |
|  |  |  | $\bmod|C_m|^{|J|-1}$ |
| 0-15 | 1 | 0 | — |
| 16-591 | 2 | 16 | 0, 1, 2 |
| 592-5967 | 3 | 592 | 0, 1, . . . , 6 |
| 5968-21327 | 4 | 5967 | 0, 1, 2, . . . , 14 |

TABLE 16

Number of PMI feedback bits for PMI codebook in TABLES 15A-15D

| Beam selection set S | $\sum_{|J|\in S}\binom{4}{|J|}$ | Co-phase index $|C_{co-ph}|^{|J|}$ | Coefficient phase index $|C_{ph,|J|}|$ | Coefficient magnitude index $|C_{m,|J|}|$ | SB co-phase | Number of bits $b_{PMI}$ WB co-phase |
|---|---|---|---|---|---|---|
| {1} | 4 | 4 | 1 | 1 | 4 | 2 |
| {2} | 6 | 16 | 2 | 3 | 10 | 6 |
| {3} | 4 | 64 | 4 | 7 | 13 | 7 |
| {4} | 1 | 256 | 8 | 15 | 14 | 6 |
| {1, 2} | 10 |  |  |  | 10 | 7 |
| {1, 3} | 8 |  |  |  | 13 | 6 |
| {1, 4} | 5 |  |  |  | 14 |  |
| . . . |  |  |  |  | . . . |  |
| {1, 2, 3, 4} | 15 |  |  |  | 15 | 8 |

Embodiments on PMI Codebooks (Joint Magnitude and Phase Selection):

Let $C_{coeff}$ be the complex coefficient codebook to select the coefficient values when the magnitude and phase of the coefficients are selected jointly.

In some embodiment, the UE determines L WB basis vectors (beams) according to some embodiments of this disclosure, and then for each subband in which the UE is configured to report PMI and CQI, it determines Number of selected beams $|J|$ from the beam selection set S, Index set of the selected beams J, Co-phase of the selected beams $\{\phi_l\}_{l\in J}$, and Complex coefficients $$\begin{bmatrix} c_1 \\ c_2 \\ \vdots \\ c_{|J|} \end{bmatrix}.$$

The UE then feeds back the PMI index of the corresponding linear combination pre-coder from the PMI index table. The PMI index corresponds to an integer in [0,T(S)−1], where T(S) is the total number of possible linear combination pre-coders corresponding to the beam selection set S: $T(S)=\Sigma_{|J|\in S} t_{|J|}$, where $$t_{|J|} \stackrel{\text{def}}{=} \binom{L}{|J|} |C_{co-ph}|^{|J|} |C_{coeff}|^{|J|-1}.$$

The number of bits to report the PMI index depends on the beam selection set S. For a given S, the number of bits to indicate the PMI index is given by $b_{PMI}(S)=\lceil \log_2 T(S) \rceil$. An example of the full PMI codebook (i.e., $S=\{1, 2, \ldots, L\}$) is illustrated in TABLES 17A through 17C, which collectively illustrate a PMI codebook for a WB basis of size L (joint magnitude and phase selection).

TABLE 17A

| PMI index | Number of selected beams | Offset | Beam selection index |
|---|---|---|---|
| i | \|J\| | x | $i_1 = \left\lfloor \frac{1-x}{\|C_{co-ph}\|^{\|J\|}\|C_{coeff}\|^{\|J\|-1}} \right\rfloor$ |
| $(T_0, \ldots, T_1 - 1)$ | 1 | 0 | {1}<br>{2}<br>...<br>{L} |
| $(T_1, \ldots, T_2 - 1)$ | 2 | $T_1$ | {1, 2}<br>{1, 3}<br>{1, 4}<br>...<br>...<br>{L − 1, L} |
| ... | ... | ... | ... |
| $(T_{L-1}, \ldots, T_L - 1)$ | L | $T_{L-1}$ | {1, 2, ..., L} |

TABLE 17B

| PMI index | Number of selected beams | Offset | Co-phase index |
|---|---|---|---|
| i | \|J\| | x | $i_2 = \left\lfloor \frac{(1-x) \bmod (\|C_{co-ph}\|^{\|J\|}\|C_{coeff}\|^{\|J\|-1})}{\|C_{coeff}\|^{\|J\|-1}} \right\rfloor$ |
| $(T_0, \ldots, T_1 - 1)$ | 1 | 0 | $0, 1, 2, \ldots, \|C_{co-ph}\| - 1$ |
| $(T_1, \ldots, T_2 - 1)$ | 2 | $T_1$ | $0, 1, 2, \ldots, \|C_{co-ph}\|^2 - 1$ |
| ... | ... | ... | ... |
| $(T_{L-1}, \ldots, T_L - 1)$ | L | $T_{L-1}$ | $0, 1, 2, \ldots, \|C_{co-ph}\|^L - 1$ |

TABLE 17C

| PMI index | No. of selected beams | Offset | Coefficient index<br>$i_3 = (1-x) \bmod \|C_{co-ph}\|^{\|J\|}$<br>$\|C_{coeff}\|^{\|J\|-1} \bmod \|C_{coeff}\|^{\|J\|-1}$ |
|---|---|---|---|
| i | \|J\| | x | |
| $(T_0, \ldots, T_1 - 1)$ | 1 | 0 | — |
| $(T_1, \ldots, T_2 - 1)$ | 2 | $T_1$ | $0, 1, 2, \ldots, \|C_{coeff}\| - 1$ |
| . | . | . | . |
| . | . | . | . |
| . | . | . | . |
| $(T_{L-1}, \ldots, T_L - 1)$ | L | $T_{L-1}$ | $0, 1, 2, \ldots, \|C_{coeff}\|^{L-1} - 1$ |

In some embodiments, for each subband in which the UE is configured to report the PMI, the UE derives the PMI corresponding to the pre-coding vector:

$$w = \sum_{l=1}^{L} e_l c_l \begin{bmatrix} a_l \\ \phi_l a_l \end{bmatrix},$$

where $\{a_l\}_{l=1}^{L}$ are L basis vectors selected from a basis codebook $C_{basis}$. In one method, the basis codebook is a Kronecker-product codebook, i.e., $C_{basis}=\{h_l \otimes v_l : h_l \in C_H$ and $v_l \in C_V\}$, where $C_H$ and $C_V$ are the azimuth and elevation codebooks, respectively. In one method, $C_H$ and $C_V$ are DFT codebooks of vectors of sizes M×1 and N×1, respectively. For example, for (M,N)=(4,2), we have $$C_H = \left\{ \left[1 \; e^{\frac{i2\pi m}{4P}} \; e^{\frac{i4\pi m}{4P}} \; e^{\frac{i6\pi m}{4P}}\right]^T : m \in \{0, 1, \ldots, 4P-1\} \right\},$$

where P is an azimuth oversampling factor (Note: P=8 in 8Tx codebook), and $$C_V = \left\{ \left[1 \; e^{\frac{i2\pi m}{2Q}}\right]^T : n \in \{0, 1, \ldots, 2Q-1\} \right\},$$

where Q is an elevation oversampling factor (Note: Q=2 in 2Tx codebook).

$\{e_l\}_{l=1}^{L}$ are beam (or basis vector) combination indicators taking values in $\{0,1\}$. If $e_l=1$, then the basis vector 1 is considered in linear combination calculation, and if $e_l=0$, then it is not. Note that this allows the UE to select any combination of 1, 2, . . . , L beams for linear combination calculation.

$\{\phi_l\}_{l=1}^{L}$ are corresponding x-pol co-phase values selected from a co-phase codebook $C_{co-ph}$. In one method, $C_{co-ph}$ is a unit-magnitude (S-PSK) codebook, $$C_{co-ph} = \left\{ e^{\frac{i2\pi k}{S}} : k \in \{0, 1, \ldots, S-1\} \right\},$$

where S is the size of the codebook. For example: S=4, i.e., $C_{co-ph}=\{1, j, -1, -j\}$.

$\{c_l\}_{l=1}^{L}$ are coefficients to linearly combine the basis vectors and are selected from a coefficient codebook $C_{coeff}$. In one method, $C_{coeff}$ is a unit-magnitude (T-PSK) codebook, $$C_{coeff} = \left\{ e^{\frac{j2\pi k}{T}} : k \in \{0, 1, \ldots, T-1\} \right\},$$

where T is the size of the coefficient codebook. For example: T=4, i.e., $C_{coeff}=\{1, j, -1, -j\}$.

In some embodiments, the UE may be configured with L=4,
$C_{co\text{-}ph} \in \{1,j,-1,-j\}$, and
$C_{coeff} \in \{1,j,-1,-j\}$ UE Behavior:

The UE derives a PMI index i per subband, as a function of at least one of the following indices: the number of selected beams $l \in \{1, 2, \ldots, L\}$, which may include a number of subband selected basis vectors out of L wideband basis vectors; the index offset o, the smallest PMI index related to l beam selection; a beam combination indicator $i_1$, which indicates a combination of l beams (for example, if l=1, and L=4, all the possible combinations are [1 0 0 0], [0 1 0 0], [0 0 1 0], and [0 0 0 1], and these four combinations are indexed with four distinct indices); a co-phase vector indicator $i_2$, which indicates a co-phase vector of size l (for example, if l=1, and L=4, all the possible co-phase vectors with QPSK alphabet are [1], [j], [−1], [−j], and these four vectors are indexed with four distinct indices); and a coefficient vector indicator $i_3$, which indicates a coefficient vector of size l (for example, if l=2, and L=4, all the possible coefficient vectors with QPSK alphabet are [1 1], [1 j], [1 −1], [1 −j], and these four vectors are indexed with four distinct indices). It is noted that the first element of all the coefficient vectors in the codebook is 1.

An illustration of the PMI index table at the UE is shown in TABLE 18, wherein the PMI index i is derived out of the number of selected beams l, index offset o, beam combination index $i_1$, co-phase combination index $i_2$, and coefficient combination index $i_3$.

eNB Behavior:

Processing PMI index i received from the UE, the eNB derives at least one of number of selected beams l, index offset o, beam combination index $i_1$, co-phase combination index $i_2$, and coefficient combination index $i_3$. An illustration of the PMI index table at the UE is shown in TABLES 19A through 19C, which collectively illustrate a PMI index table at eNB, wherein the number of selected beams l, index offset o, beam combination index $i_1$, co-phase combination index $i_2$, and coefficient combination index $i_3$ are derived out of PMI index i.

TABLE 19A

| PMI index i | Number of selected beams l | Index offset $o = \left\lfloor \sum_{k=0}^{l-1} \binom{L}{K} \times 4^k \times 4^{k-1} \right\rfloor$ | Beam combination indicator $i_1$ |
|---|---|---|---|
| 0-15 | 1 | 0 | $\left\lfloor \frac{i-o}{4^l \times 4^{l-1}} \right\rfloor$ |
| 16-399 | 2 | 16 | |
| 400-4495 | 3 | 400 | |
| 4496-20879 | 4 | 4496 | |

TABLE 18

PMI index table at UE

| Beam combination indicator $i_1$ | Co-phase vector indicator $i_2$ | Coefficient vector indicator $i_3$ | Number of selected beams l | Index offset $o = \left\lfloor \sum_{k=0}^{l-1} \binom{L}{K} \times 4^k \times 4^{k-1} \right\rfloor$ | PMI index $i = o + 4^l \times 4^{l-1} \times i_1 + 4^{l-1} \times i_2 + i_3$ |
|---|---|---|---|---|---|
| 0-3 | 0-3 | — | 1 | 0 | 0-15 |
| 4-9 | 4-19 | 0-3 | 2 | 16 | 16-399 |
| 10-13 | 20-83 | 4-19 | 3 | 400 | 400-4495 |
| 14 | 84-339 | 20-83 | 4 | 4496 | 4496-20879 |

TABLE 19B

Index offset

| PMI index i | Number of selected beams l | $o = \left\lfloor \sum_{k=0}^{l-1} \binom{L}{K} \times 4^k \times 4^{k-1} \right\rfloor$ | Co-phase vector indicator $i_2$ |
|---|---|---|---|
| 0-15 | 1 | 0 | $\left\lfloor \dfrac{(i-o) \bmod (4^l \times 4^{l-1})}{4^{l-1}} \right\rfloor$ |
| 16-399 | 2 | 16 | |
| 400-4495 | 3 | 400 | |
| 4496-20879 | 4 | 4496 | |

TABLE 19C

Index offset

| PMI index i | Number of selected beams l | $o = \left\lfloor \sum_{k=0}^{l-1} \binom{L}{K} \times 4^k \times 4^{k-1} \right\rfloor$ | Coefficient vector indicator $i_3$ |
|---|---|---|---|
| 0-15 | 1 | 0 | — |
| 16-399 | 2 | 16 | $((i - o) \bmod (4^l \times 4^{l-1})) \bmod 4^{l-1}$ |
| 400-4495 | 3 | 400 | |
| 4496-20879 | 4 | 4496 | |

The beam combination index $i_1$, co-phase combination index $i_2$, and coefficient combination index $i_3$ are derived from the respective codebooks. TABLE 20, TABLE 21, and TABLE 22 respectively show examples of the beam combination codebook, the co-phase codebook, and the coefficient codebook, according to some embodiments of the current disclosure.

TABLE 20

Beam combination codebook

| Beam combination indicator $i_1$ | Beam combination |
|---|---|
| 0 | [1 0 0 0] |
| 1 | [0 1 0 0] |
| 2 | [0 0 1 0] |
| 3 | [0 0 0 1] |
| 4 | [1 1 0 0] |
| 5 | [1 0 1 0] |
| 6 | [1 0 0 1] |
| 7 | [0 1 1 0] |
| 8 | [0 1 0 1] |
| 9 | [0 0 1 1] |
| 10 | [1 1 1 0] |
| 11 | [1 1 0 1] |
| 12 | [1 0 1 1] |
| 13 | [0 1 1 1] |
| 14 | [1 1 1 1] |

TABLE 21

Co-phase codebook

| Co-phase vector indicator ($i_2$) | Offset (y) | $k_n, n = 1, \ldots, l$ | Co-phase vector |
|---|---|---|---|
| 0-3 | 0 | $\left\lfloor \dfrac{i_2 - y}{4^{l-n}} \bmod 4 \right\rfloor$ | $\left[ e^{\frac{j2\pi k_1}{4}} \right]$ |

TABLE 21-continued

Co-phase codebook

| Co-phase vector indicator ($i_2$) | Offset (y) | $k_n, n = 1, \ldots, l$ | Co-phase vector |
|---|---|---|---|
| 4-19 | 4 | | $\left[ e^{\frac{j2\pi k_1}{4}}, e^{\frac{j2\pi k_2}{4}} \right]$ |
| 20-83 | 20 | | $\left[ e^{\frac{j2\pi k_1}{4}}, e^{\frac{j2\pi k_2}{4}}, e^{\frac{j2\pi k_3}{4}} \right]$ |
| 84-339 | 84 | | $\left[ e^{\frac{j2\pi k_1}{4}}, e^{\frac{j2\pi k_2}{4}}, e^{\frac{j2\pi k_3}{4}}, e^{\frac{j2\pi k_4}{4}} \right]$ |

TABLE 22

Coefficient codebook

| Co-phase vector indicator ($i_2$) | Offset (y) | $k_n, n = 1, \ldots, l-1$ | Coefficient vector |
|---|---|---|---|
| 0-3 | 0 | $\left\lfloor \dfrac{i_3 - y}{4^{l-n-1}} \bmod 4 \right\rfloor$ | $\left[ 1, e^{\frac{j2\pi k_1}{4}} \right]$ |
| 4-19 | 4 | | $\left[ 1, e^{\frac{j2\pi k_1}{4}}, e^{\frac{j2\pi k_2}{4}} \right]$ |
| 20-83 | 20 | | $\left[ 1, e^{\frac{j2\pi k_1}{4}}, e^{\frac{j2\pi k_2}{4}}, e^{\frac{j2\pi k_3}{4}} \right]$ | l=1 Beam Selection: For each combination of l=1 beam selection (with l=1, there are total 4 (=4 choose 1) Such Combinations), and the Total Number of Distinct Co-Phase Vectors and coefficient vectors with QPSK alphabet is $4^1 \cdot 4^0 = 4$. Hence, total number of states for l=1 beam selection, co-phase vector and coefficient vector selection is $4 \cdot 4^1 \cdot 4^0 = 16$.

In TABLE 18 and TABLES 19A-19C, the PMI index $i \in \{0, 1, \ldots, 15\}$ is used to indicate these 16 states related to l=1 beam selection.

l=2 Beam Selection: For each combination of l=2 beam selection (with l=2, there are total 6 (=4 choose 2) such combinations), the total number of distinct co-phase vectors and coefficient vectors with QPSK alphabet is $4^1 \cdot 4^{l-1} = 4^2 \cdot 4^1 = 4^3$. Hence, total number of states for l=2 beam selection, co-phase vector and coefficient vector selection is $6 \cdot 4^2 \cdot 4^1 = 384$.

In TABLE 18 and TABLES 19A-19C, the PMI index $i \in \{16, 17, \ldots, 399\}$ is used to indicate these 384 states related to l=2 beam selection. The smallest PMI index related to l=2 beam selection is 16, and this number is called offset o. PMI index i is reduced by the offset o, and the reduced index $i^{(o)}=i-o$ is used to derive other parameters related to l=2 beam selection.

The beam combination indicator $i_1$ is defined as a function of $i^{(o)}=i-o$ and the number of distinct co-phase vectors and coefficient vectors with QPSK alphabet per combination is $4^l \cdot 4^{l-1} = 4^2 \cdot 4^1 = 4^3$. An illustration of $4^2=16$ different co-phase vectors corresponding to the co-phase vector indicator $i_2=0, 1, \ldots, 15$ for the beam combination indicator $i_1=0$ is shown in TABLE 23. The first row of the table is further expanded to show $4^1=4$ different coefficient vectors corresponding to the coefficient vector indicator $i_3=0,1,2,3$ in TABLE 24.

The beam selection for l=3 and above can be understood analogously.

TABLE 23

An illustration of co-phase vectors for a given beam combination indicator

| Beam combination indicator $i_1$ | Co-phase vector indicator $i_2$ | Co-phase vector 1 | 2 | 3 | 4 | Coefficient vector 1 | 2 | 3 | 4 |
|---|---|---|---|---|---|---|---|---|---|
| 0 | 0 | 1 | 1 | — | — | | | | |
|   | 1 | 1 | j | — | — | | | | |
|   | 2 | 1 | -1 | — | — | | | | |
|   | 3 | 1 | -j | — | — | | | | |
|   | . | | | | | | | | |
|   | . | | | | | | | | |
|   | . | | | | | | | | |
|   | 12 | -j | 1 | — | — | | | | |
|   | 13 | -j | j | — | — | | | | |
|   | 14 | -j | -1 | — | — | | | | |
|   | $15 = 4^l - 1$ | -j | -j | — | — | | | | |
| . | | | | | | | | | |
| . | | | | | | | | | |
| $5 = $ (L choose l) - 1 | | | | | | | | | |

TABLE 24

An illustration of coefficient vectors for a given beam combination indicator and coefficient vector indicator

| Co-phase vector indicator $i_2$ | Coefficient vector indicator $i_3$ | Co-phase vector 1 | 2 | 3 | 4 | Coefficient vector 1 | 2 | 3 | 4 |
|---|---|---|---|---|---|---|---|---|---|
| 0 | 0 | 1 | 1 | — | — | 1 | 1 | — | — |
|   | 1 | | | | | 1 | j | — | — |
|   | 2 | | | | | 1 | -1 | — | — |
|   | $3 = 4^{l-1} - 1$ | | | | | 1 | -j | — | — |
| . | | | | | | | | | |

The total number of linear combination pre-coders is $$\sum_{l=0}^{L} \binom{L}{l} \times 4^l \times 4^{l-1} = 20880,$$

which implies that we need $\lceil \log_2 (20880) \rceil = 15$ bits for PMI index feedback.

In some embodiments, to reduce the number of feedback bits corresponding to SB co-phase and coefficient feedback, l=1,2,3,4 selected beams are partitioned into groups such that beams in the same group have common SB co-phase and coefficient values.

In one method, the groups are formed according to TABLE 25, where curly brackets or parentheses show indices of beams belonging to the same group. Note that in this method, for l=4, the total number of SB co-phase and coefficient feedback bits reduces from 8+6=14 bits (TABLE 21 and TABLE 22) to 4+4=8 bits.

TABLE 25

Beam Grouping Table

| Number of selected beams, l | Beam combination |
|---|---|
| 1 | {1} |
| 2 | {1}, {2} |
| 3 | {1, 2}, {3} or {1}, {2, 3} |
| 4 | {1, 2}, {3, 4} or {1, 3}, {2, 4} |

Since there are more than one ways to construct groups out of l=3,4 beams, the UE may be configured with one of the following ways to construct the two groups:

eNB configures the beam group using CSI configuration or via RRC.

UE is configured to report a preferred beam group out of multiple beam groups. For example, if l=4 in a SB and UE is configured with the beam grouping TABLE 25, then UE sends a 1-bit information in the SB feedback report to indicate the beam group selected between {1,2},{3,4} and {1,3},{2,4}.

In order to select a common SB co-phase and a common SB coefficient for beams in the same group, the UE may first compute the unquantized SB co-phase and unquantized SB coefficient for all l beams. It then selects a common SB co-phase and a common SB coefficient for beams in the same group according to one of the following methods:

The unquantized SB co-phase values for beams in a group are used to select a common SB co-phase, and the unquantized SB coefficient values for beams in a group are used to select a common SB coefficient.

The beams in a group are compared based on the magnitude of their unquantized SB coefficients. The beam with the largest magnitude of the unquantized coefficient is selected, and its unquantized SB co-phase and coefficient are used to select a common SB co-phase and a common SB coefficient for all beams in the group.

Double PMI Codebook (with Reduced Number of PMI Feedback Bits):

In some embodiments, to reduce the number of bits for PMI index feedback, the phase codebook may have a double structure: $C_{co-ph} = C_{co-ph,WB} \, C_{co-ph,SB}$, where $C_{co-ph,wB}$ and $C_{co-ph,SB}$ respectively are the WB and SB co-phase codebooks in order to capture the WB and SB variations in the co-phase of the basis vectors.

The UE may feedback the WB co-phase for each basis vector from $C_{co-ph,wB}$ using the channel measurements across the wideband system bandwidth. For each basis vector, the UE may search for the best WB co-phase from $C_{co-ph,WB}$. Alternatively, it may first obtain the unquantized WB co-phase according to some embodiments of this invention, and then quantize it to a co-phase value from $C_{co-ph,WB}$. In one method, the calculated WB co-phase values for the basis vectors may be fed back together with the WB basis vectors. In another method, they may be reported separately.

The reporting may be periodic. In yet another method, they may be fed back depending on the configuration via RRC, for example.

In each subband in which the UE is configured to report PMI, it derives the PMI index according to some embodiments on this invention wherein the subband co-phase values for the selected beams (or selected basis vectors) are derived using the most recently reported respective WB co-phase values and the subband co-phase codebook $C_{co\text{-}ph,SB}$. For example, if $\phi_{l,WB}$ is the WB co-phase for the basis vector l that is selected for linear combination calculation in a subband, then the UE derives the subband co-phase for this basis vector by considering co-phase values that are obtained by multiplying $\phi_{l,WB}$ with all co-phase values in $C_{co\text{-}ph,SB}$.

In one method, the UE may be configured with the following phase codebooks:

$$C_{co\text{-}ph,WB} = \{e^{j\frac{\pi}{4}}, e^{j\frac{3\pi}{4}}, e^{j\frac{5\pi}{4}}, e^{j\frac{7\pi}{4}}\} \text{ and } C_{co\text{-}ph,SB} = \{e^{j\frac{\pi}{4}}, e^{-j\frac{\pi}{4}}\}.$$

Note that the product of the two codebooks is $\{1, j, -1, -j\}$. The co-phase codebook in this case may be as shown in TABLE 26.

TABLE 26

Double co-phase codebook

WB co-phase codebook $C_{co\text{-}ph,WB}$

| WB co-phase vector indicator ($i_{2,WB}$) | $k_n$, n = 1, ..., 4 | WB co-phase vector |
|---|---|---|
| 0-255 | $\left\lfloor \frac{i_{2,WB}}{4^{l-n}} \mod 4 \right\rfloor$ | $[e^{\frac{j2(k_1+1)\pi}{4}}, e^{\frac{j2(k_2+1)\pi}{4}}, e^{\frac{j2(k_3+1)\pi}{4}}, e^{\frac{j2(k_4+1)\pi}{4}}]$ |

SB co-phase codebook $C_{co\text{-}ph,SB}$

| Co-phase vector indicator | Offset | | |
|---|---|---|---|

TABLE 26-continued

Double co-phase codebook

| ($i_2$) | (y) | $k_n$, n = 1, ..., l | SB co-phase vector |
|---|---|---|---|
| 0-1 | 0 | $\left\lfloor \frac{i_2 - y}{4^{l-n}} \mod 2 \right\rfloor$ | $[e^{\frac{j2(k_1+1)\pi}{4}}]$ |
| 2-5 | 2 | | $[e^{\frac{j2(k_1-1)\pi}{4}}, e^{\frac{j2(k_2-1)\pi}{4}}]$ |
| 6-13 | 6 | | $[e^{\frac{j2(k_1-1)\pi}{4}}, e^{\frac{j2(k_2-1)\pi}{4}}, e^{\frac{j2(k_3-1)\pi}{4}}]$ |
| 14-29 | 14 | | $[e^{\frac{j2(k_1-1)\pi}{4}}, e^{\frac{j2(k_2-1)\pi}{4}},$ $e^{\frac{j2(k_3-1)\pi}{4}}, e^{\frac{j2(k_4-1)\pi}{4}}]$ |

If the rest of the configuration stays the same as in some embodiments of the current invention, then the UE may derive the PMI index according to TABLES 27A through 27C, which collectively illustrate a PMI index table at eNB for double co-phase codebook, where the beam combination indicator is derived from TABLE 20, the co-phase vector indicator is derived from SB co-phase codebook in TABLE 26 using the WB co-phase values that are fed back to the eNB most recently, and the coefficient vector indicator may be derived from a table similar to TABLE 22.

TABLE 27A

| PMI index i | Number of selected beams l | Index offset $o = \left\lfloor \sum_{k=0}^{l-1} \binom{L}{K} \times 2^k \times 4^{k-1} \right\rfloor$ | Beam combination indicator $i_1$ |
|---|---|---|---|
| 0-7 | 1 | 0 | $\left\lfloor \frac{i-o}{2^l \times 4^{l-1}} \right\rfloor$ |
| 8-103 | 2 | 8 | |
| 104-615 | 3 | 104 | |
| 616-1639 | 4 | 616 | |

TABLE 27B

| PMI index i | Number of selected beams l | Index offset $o = \left\lfloor \sum_{k=0}^{l-1} \binom{L}{K} \times 2^k \times 4^{k-1} \right\rfloor$ | Co-phase vector indicator $i_2$ |
|---|---|---|---|
| 0-7 | 1 | 0 | $\left\lfloor \frac{(i-o) \mod (2^l \times 4^{l-1})}{4^{l-1}} \right\rfloor$ |
| 8-103 | 2 | 8 | |
| 104-615 | 3 | 104 | |
| 616-1639 | 4 | 616 | |

TABLE 27C

Index offset

| PMI index i | Number of selected beams l | $o = \left\lfloor \sum_{k=0}^{l-1} \binom{L}{K} \times 2^k \times 4^{k-1} \right\rfloor$ | Coefficient vector indicator $i_3$ |
|---|---|---|---|
| 0-7 | 1 | 0 | — |
| 8-103 | 2 | 8 | $((i - o) \bmod (4^l \times 4^{l-1})) \bmod 4^{l-1}$ |
| 104-615 | 3 | 104 | |
| 616-1639 | 4 | 616 | |

The total number of linear combination pre-coders is $$\sum_{l=0}^{L} \binom{L}{l} \times 2^l \times 4^{l-1} = 1640,$$

which implies that we need $\lceil \log_e (1640) \rceil = 11$ bits for PMI index feedback.

In some embodiments, to reduce the number of bits for PMI index feedback further, both the co-phase and the coefficient codebooks may have a double structure, i.e., $C_{co-ph} = C_{co-ph,WB} C_{co-ph,SB}$ and $C_{coeff} = C_{coeff,WB} C_{coeff,SB}$, where $C_{co-ph,WB}$ and $C_{co-ph,SB}$ are defined as before, and $C_{coeff,WB}$ and $C_{coeff,SB}$ are defined analogous to $C_{co-ph,WB}$ and $C_{co-ph,SB}$, respectively.

The UE may feedback the WB co-phase and coefficient for each basis vector from $C_{co-ph,WB}$ and $C_{co-ph,SB}$, respectively, using the channel measurements across the wideband system bandwidth. As before, for each basis vector, the UE may search for the best WB co-phase from $C_{co-ph,WB}$ and the best WB coefficient from $C_{coeff,WB}$. Alternatively, it may first obtain the unquantized WB co-phase and coefficient according to some embodiments of this invention, and then quantize them to a co-phase and coefficient values from $C_{co-ph,WB}$ and $C_{coeff,WB}$, respectively. In one method, the calculated WB co-phase and coefficient values for the basis vectors may be fed back together with the WB basis vectors. In another method, they may be reported separately. The reporting may be periodic. In yet another method, they may be fed back depending on the configuration via RRC, for example.

In each subband in which the UE is configured to report PMI, it derives the PMI index according to some embodiments on this invention wherein the subband co-phase and coefficient values for the selected beams or basis vectors are derived using the most recently reported respective WB co-phase and coefficient values according to the procedure mentioned above.

In one method, the UE may be configured with the following phase and coefficient codebooks:

$C_{co-ph,WB} = C_{coeff,WB} = \{e^{j\frac{\pi}{4}}, e^{j\frac{3\pi}{4}}, e^{j\frac{5\pi}{4}}, e^{j\frac{7\pi}{4}}\}$ and $C_{co-ph,SB} = C_{coeff,SB} = \{e^{j\frac{\pi}{4}}, e^{-j\frac{\pi}{4}}\}$.

The co-phase codebook in this case is the same as in TABLE 26. The coefficient codebook on the other hand may be as shown in TABLE 28.

TABLE 28

Double coefficient codebook

WB coefficient codebook $C_{coeff,WB}$

| WB coefficient vector indicator ($i_{3,WB}$) | $k_n$, n = 1, ..., 3 | WB coefficient vector |
|---|---|---|
| 0-63 | $\left\lfloor \frac{i_{3,WB}}{4^{4-n-1}} \bmod 4 \right\rfloor$ | $[1, e^{\frac{j(2k_1+1)\pi}{4}}, e^{\frac{j(2k_2+1)\pi}{4}}, e^{\frac{j(2k_3+1)\pi}{4}}]$ |

SB coefficient codebook $C_{coeff,SB}$

| Coefficient vector indicator ($i_3$) | Offset (z) | $k_n$, n = 1, ..., l - 1 | Coefficient vector |
|---|---|---|---|
| 0-1 | 0 | $\left\lfloor \frac{i_3 - z}{2^{l-n-1}} \bmod 2 \right\rfloor$ | $[1, e^{\frac{j(2k_1-1)\pi}{4}}]$ |
| 2-5 | 2 | | $[1, e^{\frac{j(2k_1-1)\pi}{4}}, e^{\frac{j(2k_2-1)\pi}{4}}]$ |
| 6-13 | 6 | | $[1, e^{\frac{j(2k_1-1)\pi}{4}}, e^{\frac{j(2k_2-1)\pi}{4}}, e^{\frac{j(2k_3-1)\pi}{4}}]$ |

In another method, the coefficient codebook may be such that the first coefficient, instead of always being equal to 1 as in TABLE 28, is allowed to be selected like other coefficients. In this method, the coefficient codebook is exactly similar to TABLE 26.

If the rest of the configuration stays the same as in the previous embodiment, then the UE may derive the PMI index according to TABLES 29A through 29C, which collectively illustrate a PMI index table at eNB for double co-phase and coefficient codebooks, where the beam combination indicator is derived from TABLE 20, the co-phase vector indicator is derived from SB so-phase codebook in TABLE 26 using the WB co-phase values that were fed back to the eNB most recently, and the coefficient vector indicator may be derived from is derived from SB coefficient codebook in TABLE 28 using the WB coefficient values that were fed back to the eNB most recently.

TABLE 29A

Index offset

| PMI index i | Number of selected beams l | $o = \left\lfloor \sum_{k=0}^{l-1} \binom{L}{K} \times 2^k \times 2^{k-1} \right\rfloor$ | Beam combination indicator $i_1$ |
|---|---|---|---|
| 0-7 | 1 | 0 | $\left\lfloor \frac{i - o}{2^l \times 2^{l-1}} \right\rfloor$ |
| 8-55 | 2 | 8 | |
| 56-183 | 3 | 56 | |
| 184-311 | 4 | 184 | |

TABLE 29B

| PMI index i | Number of selected beams l | Index offset $o = \left\lfloor \sum_{k=0}^{l-1} \binom{L}{K} \times 2^k \times 2^{k-1} \right\rfloor$ | Co-phase vector indicator $i_2$ |
|---|---|---|---|
| 0-7 | 1 | 0 | $\left\lfloor \frac{(i-o) \bmod (2^l \times 2^{l-1})}{2^{l-1}} \right\rfloor$ |
| 8-55 | 2 | 8 | |
| 56-183 | 3 | 56 | |
| 184-311 | 4 | 184 | |

TABLE 29C

| PMI index i | Number of selected beams l | Index offset $o = \left\lfloor \sum_{k=0}^{l-1} \binom{L}{K} \times 2^k \times 2^{k-1} \right\rfloor$ | Coefficient vector indicator $i_3$ |
|---|---|---|---|
| 0-7 | 1 | 0 | — |
| 8-55 | 2 | 8 | $((i-o) \bmod (2^l \times 2^{l-1})) \bmod 4^{l-1}$ |
| 56-183 | 3 | 56 | |
| 184-311 | 4 | 184 | |

The total number of linear combination pre-coders is $$\sum_{l=0}^{L} \binom{L}{l} \times 2^l \times 2^{l-1} = 312,$$

which implies that we need $\lceil \log_e (312) \rceil = 9$ bits for PMI index feedback.

In some embodiments, to reduce the number of WB feedback bits corresponding to the WB co-phase and WB coefficient components, L beams are partitioned into groups such that beams in the same group have common WB co-phase and coefficient components.

In one method, L=4 beams are partitioned into two groups of two beams, for example, beam pairs (1,2) and (3,4). In this method, the WB co-phase and WB coefficient components are derived from TABLE 30. Note that in this method, the total number of WB co-phase and coefficient feedback bits reduces from 8+6=14 bits (TABLE 26 and TABLE 28) to 4+4=8 bits.

TABLE 30

Common WB co-phase coefficient codebook for group of 2 beams

WB co-phase codebook $C_{co\text{-}ph,WB}$

| WB co-phase vector indicator ($i_{2,WB}$) | $k_n$, n = 1, 2 | WB co-phase vector |
|---|---|---|
| 0-15 | $\left\lfloor \frac{i_{2,WB}}{4^{2-n}} \bmod 4 \right\rfloor$ | $[e^{\frac{j2(2k_1+1)\pi}{4}}, e^{\frac{j2(2k_1+1)\pi}{4}},$ $e^{\frac{j2(2k_2+1)\pi}{4}}, e^{\frac{j2(2k_2+1)\pi}{4}}]$ |

WB coefficient codebook $C_{coeff,WB}$

WB coefficient vector

TABLE 30-continued

Common WB co-phase coefficient codebook for group of 2 beams

| indicator ($i_3$) | $k_n$, n = 1, 2 | WB Coefficient vector |
|---|---|---|
| 0-15 | $\left\lfloor \frac{i_{3,WB}}{4^{2-n}} \bmod 4 \right\rfloor$ | $[e^{\frac{j2(2k_1+1)\pi}{4}}, e^{\frac{j2(2k_1+1)\pi}{4}},$ $e^{\frac{j2(2k_2+1)\pi}{4}}, e^{\frac{j2(2k_2+1)\pi}{4}}]$ |

Since there are more than one ways to construct two groups of two beams out of L=4 beams, the UE may be configured with one of the following ways to construct the two groups:

eNB configures the grouping method using CSI configuration or via RRC.

UE is configured to report a preferred grouping method out of multiple grouping methods. For example, UE sends a 1-bit information in the WB CSI report to indicate the grouping method selected from {(1,2),(3,4)} and {(1,3),(2,4)}.

In another method, L=4 beams are partitioned into one group (1,2,3,4). In this method, one common WB co-phase and one common WB coefficient are selected for all 4 beams. Note that in this method, the total number of WB co-phase and coefficient feedback bits reduces to 2+2=4 bits.

In order to select a common WB co-phase and a common WB coefficient for beams in the same group, the UE may first compute the unquantized WB co-phase and unquantized WB coefficient for all L=4 beams. It then selects a common WB co-phase and a common WB coefficient for beams in the same group according to one of the following methods:

The unquantized WB co-phase values for beams in a group are used to select a common WB co-phase, and the unquantized WB coefficient values for beams in a group are used to select a common WB coefficient.

The beams in a group are compared based on the magnitude of their unquantized WB coefficients. The beam with the largest magnitude of the unquantized coefficient is selected, and its unquantized WB co-phase and coefficient are used to select a common WB co-phase and a common WB coefficient for all beams in the group.

In some embodiments, to reduce the number of SB feedback bits corresponding to the SB co-phase and SB coefficient in this double co-phase and coefficient codebook structure, l=1,2,3,4 beams are partitioned into groups such that beams in the same group have common SB co-phase and coefficient components. This is analogous to the SB beam grouping in single co-phase and coefficient codebook case (see TABLE 25, for example).

Embodiments on Beam Combination Restriction:

In some embodiments, the eNB may impose a restriction on the beam combinations that need to be considered by the UE for PMI index calculation. This indication may be based on WB channel measurements or UL-DL reciprocity.

In one method, for L=4 and beam combinations in TABLE 20, the eNB may use a 15-bit indication to indicate the restriction on the beam combinations. An example of the beam combination restriction is shown in TABLE 31. Depending on the restriction, the UE may need to consider only a subset of the PMI indices that are in TABLE 18, for example. This may lead to further reduction in the number of bits for PMI index feedback.

In another method, the beam combination restriction is such that exactly one beam combination out of $$\sum_{l=1}^{L} \binom{L}{l}$$

beam combinations of TABLE 20 is configured. For example, for L=4, this corresponds to the rows of TABLE 31 that have exactly one 1 and rest all zeros. In this method, there is no subband beam combination selection needed. The beam combination is indicated explicitly by the eNB.

In another method, the beam combination restriction is such there is no linear combination, i.e., exactly l=1 basis vector is selected out of L basis vectors. In this method, the eNB may apply 1 beam selection out of
- L=1 basis vector by using the restriction given by row 0 of TABLE 31.
- L=2 basis vectors by using the restriction given by row 4 of TABLE 31.
- L=3 basis vectors by using the restriction given by row 10 of TABLE 31.
- L=4 basis vectors by using the restriction given by row 14 of TABLE 31.

TABLE 31

Beam combination restriction

| Row | Beam combination indicator from TABLE 20 $i_1$ | 15-bit restriction |
| --- | --- | --- |
| 0 | 0 | [0 0 0 0 0 0 0 0 0 0 0 0 0 0 1] |
| 1 | 1 | [0 0 0 0 0 0 0 0 0 0 0 0 0 1 0] |
| 2 | 2 | [0 0 0 0 0 0 0 0 0 0 0 0 1 0 0] |
| 3 | 3 | [0 0 0 0 0 0 0 0 0 0 0 1 0 0 0] |
| 4 | 0, 1 | [0 0 0 0 0 0 0 0 0 0 0 0 0 1 1] |
| 5 | 1, 2 | [0 0 0 0 0 0 0 0 0 0 0 0 1 1 0] |
| 6 | 2, 3 | [0 0 0 0 0 0 0 0 0 0 0 1 1 0 0] |
| 7 | 0, 2 | [0 0 0 0 0 0 0 0 0 0 0 0 1 0 1] |
| 8 | 1, 3 | [0 0 0 0 0 0 0 0 0 0 0 1 0 1 0] |
| 9 | 0, 3 | [0 0 0 0 0 0 0 0 0 0 0 1 0 0 1] |
| 10 | 0, 1, 2 | [0 0 0 0 0 0 0 0 0 0 0 0 1 1 1] |
| 11 | 1, 2, 3 | [0 0 0 0 0 0 0 0 0 0 0 1 1 1 0] |
| 12 | 0, 1, 3 | [0 0 0 0 0 0 0 0 0 0 0 1 0 1 1] |
| 13 | 0, 2, 3 | [0 0 0 0 0 0 0 0 0 0 0 1 1 0 1] |
| 14 | 0, 1, 2, 3 | [0 0 0 0 0 0 0 0 0 0 0 1 1 1 1] |
| . | . | . |
| . | . | . |
| . | . | . |
| 32767 | 0, 1, ..., 14 | [1 1 1 1 1 1 1 1 1 1 1 1 1 1 1] |

Embodiments on Rank 2 Codebook:

In some embodiments, the UE is configured with a rank-2 PMI codebook which consists of rank-2 pre-coding matrices derived from the rank-1 pre-coders from the rank-1 codebook as described in some of the embodiments of this disclosure.

In one method, the rank-2 PMI codebook is given by $$\left\{ P^{(2)} = \frac{1}{2} \begin{bmatrix} \frac{p_1}{\|p_1\|} & \frac{p_1}{\|p_1\|} \\ \frac{p_2}{\|p_2\|} & -\frac{p_2}{\|p_2\|} \end{bmatrix} \right\}, \text{ where } P^{(1)} = \begin{bmatrix} p_1 \\ p_2 \end{bmatrix}$$

is the rank 1 pre-coder. Note that in this method, the rank-2 feedback overhead is the same as rank-1 feedback overhead.

In another method, the rank-2 PMI codebook is given by $$\left\{ P^{(2)} = \frac{1}{2} \begin{bmatrix} \frac{p_1}{\|p_1\|} & \frac{p_1}{\|p_1\|} \\ \frac{p_2}{\|p_2\|} & -\frac{p_2}{\|p_2\|} \end{bmatrix} \text{ or } \frac{1}{2} \begin{bmatrix} \frac{p_1}{\|p_1\|} & \frac{p_1}{\|p_1\|} \\ j\frac{p_2}{\|p_2\|} & -j\frac{p_2}{\|p_2\|} \end{bmatrix} \right\},$$

$$\text{where } P^{(1)} = \begin{bmatrix} p_1 \\ p_2 \end{bmatrix}$$

is the rank 1 pre-coder. Note that in this method, the rank-2 feedback overhead is 1-bit more than the rank-1 feedback overhead. In an alternate method, to make the feedback the same for both rank-1 and rank-2, the rank-2 codebook may be constructed from a subset of rank-1 pre-coders in the rank-1 codebook. For example, if the rank-1 codebook is based on DFT codebook with an oversampling factor x≥2, then for the rank-2 codebook, we may consider DFT vectors with an oversampling factor x. This is the same as considering either even or odd numbered indices of rank-1 pre-coders from the rank-1 codebook for the rank-2 codebook construction.

In yet another method, the rank-2 PMI codebook is given by $$\left\{ P^{(2)} = \frac{1}{\sqrt{2}} \begin{bmatrix} p_1 & p_2^* \\ p_2 & -p_1^* \end{bmatrix} \right\}, \text{ where } P^{(1)} = \begin{bmatrix} p_1 \\ p_2 \end{bmatrix}$$

is the rank 1 pre-coder. Note that in this method, the rank-2 feedback overhead is the same as rank-1 feedback overhead.

In another method, the rank-2 PMI codebook is given by $$\left\{ P^{(2)} = \frac{1}{\sqrt{2}} \begin{bmatrix} p_1 & p_2^* \\ p_2 & -p_1^* \end{bmatrix} \text{ or } \frac{1}{\sqrt{2}} \begin{bmatrix} p_1 & p_2^* \\ jp_2 & -jp_1^* \end{bmatrix} \right\},$$

$$\text{where } P^{(1)} = \begin{bmatrix} p_1 \\ p_2 \end{bmatrix}$$

is the rank 1 pre-coder. Note that in this method, the rank-2 feedback overhead is 1-bit more than the rank-1 feedback overhead. In an alternate method, to make the feedback the same for both rank-1 and rank-2, in the rank-2 codebook may be constructed from a subset of rank-1 pre-coders in the rank-1 codebook. For example, if the rank-1 codebook is based on DFT codebook with an oversampling factor x≥2, then for the rank-2 codebook, we may consider DFT vectors with an oversampling factor x. This is the same as considering either even or odd numbered indices of rank-1 pre-coders from the rank-1 codebook for the rank-2 codebook construction.

Embodiments on Vector Codebooks:

In some embodiments, the UE may be configured with a vector codebook to quantize the complex coefficients where:

Length of the vectors: In one method, the length of the vectors may be a multiple of the number of the selected beams |J|. For example, it may be equal to |J|. In another method, the length of the vectors may not be a multiple of the number of the selected beams |J|.

Number of vector codebooks: In one method, we may have two separate vector codebooks for the magnitude and phase of the coefficients. In another method, we may have a single joint vector codebook for both magnitude and phase of the coefficients.

Embodiments on Codebook Adaptation:

In some embodiments, the UE may be configured with coefficient codebooks that may or may not be adapted with time. In one method, the coefficient codebooks may be non-adaptive and hence does not change with time. In another method, they may be adaptive and may change with time, for example, semi-statically using Lloyd-based algorithm. In another method, instead of the whole codebook, at least one parameter of the codebook is adapted. For example, the moments such as mean and covariance of the coefficients, the dynamic range of the coefficients, etc. may be considered as the codebook parameters.

If the UE is configured with separate magnitude and phase codebooks, then in one method, both magnitude and phase codebooks are adapted. In another method, only phase codebook is adapted. In another method, only magnitude codebook is adapted.

Channel Amplitude Feedback for Advanced MIMO Wireless Communication Systems

In some implementation of CSI feedback, the PMI matrix may be a constant modulus, i.e., the amplitudes of the components of the pre-coding matrix are constant. The purpose of such a PMI feedback is to capture directions or angles in which the channel states are strong or dominant. The strength of the channel in those directions are not communicated (although CQI is fed back, it is not SB). For the SU transmission, the feedback about the dominant directions is reasonable and works for eNB operations such as link adaptation, pre-coding, and scheduling. However, for the MU transmission, direction only feedback is often suboptimal. This suboptimal character is even more pronounced for the 2D FD-MIMO (massive MIMO) systems where the eNB has a 2D active antenna array to serve a large number of UEs in MU-MIMO mode. To improve the system performance for such systems, it is desired to provide the strength of the channel in the dominant directions to the eNB. In this disclosure, it is proposed to feedback the non-constant modulus type PMI feedback by introducing a new feedback component—namely, the amplitude matrix indicator (AMI)—to capture the amplitudes of the different components of the pre-coding matrix.

Figure 10:
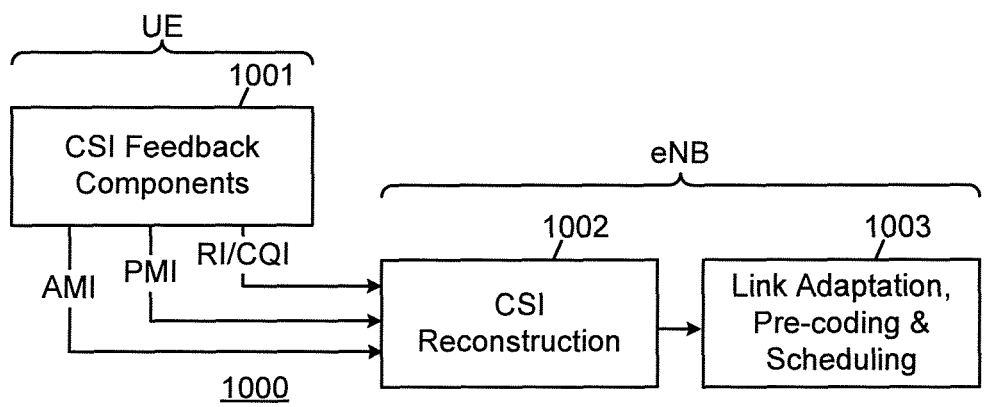
FIG. 10 illustrates the overall CSI feedback and reconstruction according to some embodiments of the current disclosure.

FIG. 10 illustrates the overall CSI feedback and reconstruction 1000 according to some embodiments of the current disclosure. A controller within the UE employs a CSI feedback block 1001 determines the values for the CSI components that are fed back from the UE, which comprise RI and/or CQI, and PMI, and the proposed component AMI. The controller within the eNB includes a CSI reconstruction block 1002 that employs the PMI and AMI feedback components to reconstruct the channel state between the eNB and the UE. The eNB controller also includes link adaptation, pre-coding and scheduling block(s) 1003 for employing the reconstructed channel state for the purposes indicated.

Embodiments on Channel Reconstruction from PMI and AMI Feedback:

In some embodiments, the eNB configures and L-port CSI-RS for a UE, and transmits the CSI-RS, wherein the CSI-RS are pre-coded. Then, the UE selects preferred PMI and AMI (that achieve the largest CQI) based upon the L-port pre-coded CSI-RS, assuming the following pre-coder construction model wherein L=4:

$$W = \begin{bmatrix} a_0 w_0 \\ a_1 w_1 \\ a_2 w_2 \\ a_3 w_3 \end{bmatrix}, \text{where } \begin{bmatrix} w_0 \\ w_1 \\ w_2 \\ w_3 \end{bmatrix}$$

corresponds to a rank-1 PMI, and $$\begin{bmatrix} a_0 \\ a_1 \\ a_2 \\ a_3 \end{bmatrix}$$

corresponds to a rank-1 AMI. Then, the UE feeds back the PMI, the AMI and corresponding CQI, either jointly or separately.

In one embodiment, the L-port pre-coded CSI-RS are pre-coded with L=4 basis vectors $b_0$, $b_1$, $b_2$, $b_3$. In this case, the effective pre-coding vector assumed at the UE with PMI pre-coder becomes:

$$[b_0 \; b_1 \; b_2 \; b_3]W = [b_0 \; b_1 \; b_2 \; b_3]\begin{bmatrix} a_0 w_0 \\ a_1 w_1 \\ a_2 w_2 \\ a_3 w_3 \end{bmatrix} = \sum_i a_i w_i b_i.$$

When the channel vector h is also approximated by a linear combination model of $$h = \sum_i a_i b_i,$$

where $\alpha_i$ is a complex number, this pre-coding vector can be regarded as a good approximation of a conjugate pre-coder for the channel vector.

Upon receiving the AMI and the PMI from the UE, eNB can reconstruct the pre-coding vector and corresponding channel vector based upon $$\sum_i a_i w_i b_i,$$

and can use the channel vector for the downlink SU and MU-MIMO pre-coding.

In one embodiment, a UE feeds back CQI/PMI/RI according to the feedback procedure defined in the legacy specifications (up to R12 LTE), and the additional component of AMI is appended to the existing contents.

For example, in case of PUSCH feedback, AMI can be jointly coded with CQI/PMI and transmitted in the resource elements in which the legacy CQI/PMI is mapped.

If subband CQI/PMI is configured, corresponding AMI to the subband CQI/PMI is also a subband information.

If wideband CQI/PMI is configured, corresponding AMI to the wideband CQI/PMI is also wideband information.

In some embodiments, eNB configures N-port CSI-RS for a UE, and transmits the CSI-RS, where the CSI-RS are one-to-one mapped to N TXRUs. Then, the UE selects a preferred first PMI corresponding to L number of basis (or pre-coding) vectors (e.g., [$b_0$ $b_1$ $b_2$ $b_3$]), a second PMI corresponding to phase coefficients to the L basis vectors $$\left(\text{e.g.,} \begin{bmatrix} w_0 \\ w_1 \\ w_2 \\ w_3 \end{bmatrix}\right),$$

and AMI corresponding to amplitude coefficients to the L basis vectors $$\left(\text{e.g.,} \begin{bmatrix} a_0 \\ a_1 \\ a_2 \\ a_3 \end{bmatrix}\right)$$

that achieve the largest CQI based upon the N-port CSI-RS, assuming the following pre-coder construction model (for L=4):

$$W = [b_0 \ b_1 \ b_2 \ b_3] \begin{bmatrix} a_0 w_0 \\ a_1 w_1 \\ a_2 w_2 \\ a_3 w_3 \end{bmatrix},$$

where [$b_0$ $b_1$ $b_2$ $b_3$] corresponds to the first PMI, $$\begin{bmatrix} w_0 \\ w_1 \\ w_2 \\ w_3 \end{bmatrix}$$

corresponds to the second PMI, and $$\begin{bmatrix} a_0 \\ a_1 \\ a_2 \\ a_3 \end{bmatrix}$$

corresponds to the AMI. Then, the UE feeds back the first PMI, the second PMI, the AMI and corresponding CQI, either jointly or separately.

Case 1: $N_c$=N Horizontal Antenna Ports, $N_r$=1 Vertical Antenna Port

In one embodiment, the PMI feedback from the UE corresponds to the rank-1 DFT pre-coding matrix $$P = \begin{bmatrix} 1 \\ e^{j\theta} \\ \vdots \\ e^{j(N-1)\theta} \end{bmatrix}$$

and the AMI feedback from the UE corresponds to the AMI matrix $$A = \begin{bmatrix} a_0 \\ a_1 \\ \vdots \\ a_{N-1} \end{bmatrix}.$$

The channel state reconstruction, denoted by $H_{recons}$, at the eNB then corresponds to the element-wise product of the two matrices, $$\text{i.e., } H_{recons} = P \circ A = \begin{bmatrix} a_0 \\ a_1 e^{j\theta} \\ \vdots \\ a_{N-1} e^{j(N-1)\theta} \end{bmatrix},$$

where the notation $\circ$ is used to denote the Hadamard or element-wise product of the two matrices. Note that in the traditional CSI feedback $$A = \frac{1}{\sqrt{N}} \begin{bmatrix} 1 \\ 1 \\ \vdots \\ 1 \end{bmatrix}.$$

In one embodiment, the PMI feedback from the UE corresponds to the rank-r DFT PMI matrix $$\begin{bmatrix} 1 & \cdots & 1 \\ e^{j\theta_1} & \cdots & e^{j\theta_r} \\ \vdots & \ddots & \vdots \\ e^{j(N-1)\theta_1} & \cdots & e^{j(N-1)\theta_r} \end{bmatrix}$$

and the AMI feedback from the UE corresponds to the AMI matrix $$A = \begin{bmatrix} a_0^1 & \cdots & a_0^r \\ a_1^1 & \cdots & a_1^r \\ \vdots & \ddots & \vdots \\ a_{N-1}^1 & \cdots & a_{N-1}^r \end{bmatrix}.$$

The channel state reconstruction at the eNB then corresponds to the element-wise product of the two matrices, i.e., $$H_{recons} = P \circ A = \begin{bmatrix} a_0^1 & \cdots & a_0^r \\ a_1^1 e^{j\theta_1} & \cdots & a_1^r e^{j\theta_r} \\ \vdots & \ddots & \vdots \\ a_{N-1}^1 e^{j(N-1)\theta_1} & \cdots & a_{N-1}^r e^{j(N-1)\theta_r} \end{bmatrix}.$$

Note that in the traditional CSI feedback $$A = \frac{1}{\sqrt{N}} \begin{bmatrix} 1 & \cdots & 1 \\ 1 & \cdots & 1 \\ \vdots & \ddots & \vdots \\ 1 & \cdots & 1 \end{bmatrix}.$$

Case 2: $N_c=N$ Horizontal Antenna Ports, $N_r=M$ Vertical Antenna Port (Kronecker Product)

In one embodiment, the PMI feedback from the UE corresponds to the rank-1 discrete Fourier transform (DFT) horizontal PMI (H-PMI) matrix $$P_H = \begin{bmatrix} 1 \\ e^{j\theta} \\ \vdots \\ e^{j(N-1)\theta} \end{bmatrix}$$

and rank-1 DFT vertical PMI (V-PMI) matrix $$P_V = \begin{bmatrix} 1 \\ e^{j\alpha} \\ \vdots \\ e^{j(N-1)\alpha} \end{bmatrix},$$

and the AMI feedback from the UE corresponds to the horizontal AMI (H-AMI) matrix $$A_H = \begin{bmatrix} a_0 \\ a_1 \\ \vdots \\ a_{N-1} \end{bmatrix}$$

and vertical AMI (V-AMI) matrix $$A_V = \begin{bmatrix} b_0 \\ b_1 \\ \vdots \\ b_{N-1} \end{bmatrix}.$$

The channel state reconstruction at the eNB then corresponds to the element-wise product of the two matrices $P_H \otimes P_V$ and $A_H \otimes A_V$, i.e., $H_{recons}=(P_H \otimes P_V)\circ(A_H \otimes A_V)$, where the notation $\otimes$ is used to denote the Kronecker product of the two matrices.

In one embodiment, the PMI feedback from the UE corresponds to the rank-$r_H$ DFT H-PMI matrix $$P_H = \begin{bmatrix} 1 & \cdots & 1 \\ e^{j\theta_1} & \cdots & e^{j\theta_r} \\ \vdots & \ddots & \vdots \\ e^{j(N-1)\theta_1} & \cdots & e^{j(N-1)\theta_r} \end{bmatrix}$$

and rank-$r_V$ DFT V-PMI matrix $$P_V = \begin{bmatrix} 1 & \cdots & 1 \\ e^{j\alpha_1} & \cdots & e^{j\alpha_r} \\ \vdots & \ddots & \vdots \\ e^{j(N-1)\alpha_1} & \cdots & e^{j(N-1)\alpha_r} \end{bmatrix},$$

and the AMI feedback from the UE corresponds to the H-AMI matrix $$A_H = \begin{bmatrix} a_0^1 & \cdots & a_0^r \\ a_1^1 & \cdots & a_1^r \\ \vdots & \ddots & \vdots \\ a_{N-1}^1 & \cdots & a_{N-1}^r \end{bmatrix}$$

and V-AMI $$\text{matrix } A_V = \begin{bmatrix} b_0^1 & \cdots & b_0^r \\ b_1^1 & \cdots & b_1^r \\ \vdots & \ddots & \vdots \\ b_{N-1}^1 & \cdots & b_{N-1}^r \end{bmatrix}.$$

The channel state reconstruction at the eNB then corresponds to the element-wise product of the two matrices $P_H \otimes P_V$ and $A_H \otimes A_V$, i.e., $H_{recons}=(P_H \otimes P_V)\circ(A_H \otimes A_V)$.

Embodiments on PMI

In one embodiment, the PMI feedback consists of two separate components, H-PMI and V-PMI, and the two PMIs are derived from
  Release 8 2-Tx codebook if $N_c$ and/or $N_r=2$, or
  Release 12 4-Tx alternative double codebook if $N_c$ and/or $N_r=4$, or
  Release 12 8-Tx codebook if $N_c$ and/or $N_r=8$, or
  Any other relevant codebook.

The PMI matrix is obtained by performing the Kronecker product of the corresponding two horizontal (H) and vertical (V) pre-coding matrices.

In one embodiment, the PMI feedback is a single joint PMI, i.e., two separate PMI feedbacks for the H and V dimensions are not fed back.

In one method, the H and V-PMIs are recovered from the single joint PMI. In another method, they are not recovered.

Embodiments on AMI:

In one embodiment, the AMI feedback consists of two separate components, H-AMI and V-AMI, where:
  H-AMI and V-AMI are derived separately: H-AMI is derived from the H component of the channel between the eNB and the UE together with the H-PMI, and V-AMI is derived from the V component of the channel between the eNB and the UE together with the V-PMI; or
  H-AMI and V-AMI are derived jointly: H-AMI and V-AMI are derived from the channel between the eNB and the UE together with the H and V-PMIs.

In one embodiment, the AMI feedback consists of a single joint AMI components, i.e., two separate AMI feedbacks for the H and V dimensions are not fed back.

In one method, the H and V-AMIs are recovered from the single joint AMI. In another method, they are not recovered.

In one embodiment, there a 1-bit field in the CSI configuration to configure AMI feedback. If the AMI feedback configuration bit is 0, then PMI feedback is constant modulus, and no AMI is fed back, and if it is 1, then the AMI is fed back.

In one embodiment, the AMI feedback is from a AMI codebook where

The codebook is universal and fixed.

The codebook is dynamic and configurable. The configuration about the AMI codebook is included either in CSI configuration, or it is sent by the UE in UL grant, or it is configured through the RRC.

In one embodiment, the AMI feedback is SB and is hence different for different (SB) PMI feedback.

In one embodiment, the AMI feedback is WB and is hence the same for different (SB) PMI feedback.

Embodiments on Example AMI Codebooks:

In one embodiment, the AMI codebook is uniform, i.e., the components of the AMI codewords are from a uniform codebook in [0,L], where L is a fixed upper bound on the amplitude components.

In one embodiment, the AMI codebook is non-uniform, i.e., the components of the AMI codewords are from a non-uniform codebook in [0,L], where L is a fixed upper bound on the amplitude components. In one example, the non-uniform codebook is a compander codebook (for example: log companding) in which one part of the quantization region is finely quantized and another part is coarsely quantized.

In one embodiment, the AMI codebook is a scalar codebook and is used to quantize each amplitude component separately.

In one embodiment, the AMI codebook is a vector codebook and is used to quantize multiple amplitude components jointly as vectors. The quantization of the amplitude components using vector AMI codebook is either In frequency domain across multiple adjacent subcarriers, or In time domain across multiple OFDM symbols, or In space domain across multiple antenna ports, or Any other combination of the above.

In one embodiment, the dimension AMI codebook may be smaller than that of the PMI codebook. In other words, not all amplitude components are fed back to the UE. Instead, only a subset of them is fed back. The remaining of the amplitude components are recovered with the help of the CSI feedback, for example, by interpolation.

In one method, the amplitude component subset is fixed and pre-determined. In another method, it is configured in the form a bit-map or from a set of possible subsets.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE), comprising:
a receiver configured to receive channel state information reference signals (CSI-RS) that have been transmitted using a plurality of antenna ports;
a controller configured to:
one of select from a master set or retrieve from a memory a set of a plurality of basis beam vectors, wherein each of a plurality of beams corresponding to the set of selected or retrieved basis beam vectors has a different pointing direction in three-dimensional space, and
select, from a codebook, at least one of a subset of L beams from among a plurality of beams from the set of the selected or retrieved basis beam vectors, co-phases for each selected beam, and coefficients for each selected beam, wherein the co-phases determine the co-phasing weights for each of the selected L beams in case of a cross-polarized antenna array, the coefficients determine a linear combination of the selected L beams according to the basis beam vectors, and L is at least one; and
a transmitter coupled to the controller and configured to transmit a feedback message containing an indication of channel state information for the set of selected or retrieved basis beam vectors, the selected L beams from the basis beam vectors, and the co-phases and the coefficients for the selected L beams.

2. The UE according to claim 1, wherein the channel state information includes at least linear combination pre-coding matrix information (PMI) corresponding to a pre-coding vector w:

$$w = \sum_{l=1}^{L} c_l \begin{bmatrix} a_l \\ \alpha_l a_l \end{bmatrix},$$

where $\{a_l\}_{l=1}^{L}$ is the selected L beams from the basis beam vectors and $\{\alpha_l\}_{l=1}^{L}$ and $\{c_l\}_{l=1}^{L}$ are respectively corresponding sets of the co-phases and the coefficients.

3. The UE according to claim 1, wherein:
the basis beam vectors correspond to wideband (WB) and long-term measurement for the channel state information and comprise WB and long-term indications, and
the selected L beams, the co-phases and the coefficients correspond to subband (SB) and short-term measurement for the channel state information and comprise per SB and short-term indications.

4. The UE according to claim 1, wherein bits selected for the feedback message based upon at least one of the co-phases and the coefficients are selected from double structure co-phase and coefficient codebooks each having a wideband (WB) component and a subband (SB) component.

5. The UE according to claim 1, wherein the selected L beams comprise one of all of or fewer than all of the plurality of beams in the basis beam vectors.

6. The UE according to claim 1, wherein dynamic selection of the selected L beams is configured, and wherein the channel state information corresponds to one of the same number of the selected L beams from the basis beam vectors for all subbands (SB) or any number of the selected L beams from the basis beam vectors for any of the subbands.

7. The UE according to claim 1, wherein the selected L beams, the co-phases, and the coefficients correspond to a restricted search over all or some of a master set of beams, a co-phase codebook, and a coefficient codebook.

8. The UE according to claim 1, wherein all of or some of the basis beam vectors, the selected L beams, the co-phases, and the coefficients are jointly selected.

9. The UE according to claim 1, wherein the basis beam vectors, the selected L beams, the co-phases and the coefficients are selected separately in sequence of the basis beam vectors, followed by the selected L beams, followed by the co-phases, and followed by the coefficients.

10. The UE according to claim 1, wherein at least one of the co-phases or the coefficients are selected by first obtaining unquantized or analog co-phases and coefficients, quantizing or mapping the obtained, unquantized or analog co-phases and coefficients using a subset of codebooks for the co-phases and coefficients.

11. The UE according to claim 10, wherein the subset of codebooks for the co-phases and coefficients comprise boundary points of a Euclidean partition in which the unquantized or analog co-phases and coefficients belong.

12. A base station (BS), comprising:
for an antenna array configured to transmit channel state information reference signals (CSI-RS) using a plurality of antenna ports, a receiver configured to receive a feedback message containing an indication of channel state information based on:
a set of one or more of a plurality of basis beam vectors that is one of selected from a master set or retrieved from a memory,
at least a subset of L beams from among a plurality of beams selected from a codebook for the set of the selected or retrieved basis beam vectors,
co-phases for each selected beam, wherein the co-phases determine co-phasing weights for each of the selected L beams in case of a cross-polarized antenna array, and
coefficients for each selected beam, wherein the coefficients determine a linear combination of the selected L beams according to the basis beam vectors and wherein L is at least one; and
a controller coupled to the receiver and configured to reconstruct a linear combination pre-coding matrix using the received basis beam vectors, the selected L beams, the co-phases and the coefficients.

13. The BS according to claim 12, wherein the channel state information includes at least linear combination pre-coding matrix information (PMI) corresponding to a pre-coding vector w:

$$w = \sum_{l=1}^{L} c_l \begin{bmatrix} a_l \\ \alpha_l a_l \end{bmatrix},$$

where $\{a_l\}_{l=1}^{L}$ is the selected L beams from the basis beam vectors and $\{\alpha_l\}_{l=1}^{L}$ and $\{c_l\}_{l=1}^{L}$ are respectively corresponding sets of the co-phases and the coefficients.

14. The BS according to claim 12, wherein:
the basis beam vectors correspond to wideband (WB) and long-term measurement for the channel state information and comprise WB and long-term indications, and
the selected L beams, the co-phases and the coefficients correspond to subband (SB) and short-term measurement for the channel state information and comprise per SB and short-term indications.

15. The BS according to claim 12, wherein bits selected for the feedback message based upon at least one of the co-phases and the coefficients correspond to bits within double structure co-phase and coefficient codebooks each having a wideband (WB) component and a subband (SB) component.

16. The BS according to claim 12, wherein the selected L beams comprise one of all of or fewer than all of the plurality of beams in the basis beam vectors.

17. The BS according to claim 12, wherein the selected L beams vary dynamically, and wherein the channel state information corresponds to one of the same number of the selected L beams from the basis beam vectors for all of the subbands (SB) or any number of the selected L beams from the basis beam vectors for any of the subbands (SB).

18. The BS according to claim 12, wherein the selected L beams, the co-phases, and the coefficients correspond to a restricted portion of all of or some of the master set of beams, the co-phase codebook, and the coefficient codebook.

19. The BS according to claim 12, wherein all of or some of the basis beam vectors, the selected L beams, the co-phases, and the coefficients are jointly selected.

20. The BS according to claim 12, wherein the basis beam vectors, the selected L beams, the co-phases and the coefficients are selected separately in sequence of the basis beam vectors, followed by the selected L beams, followed by the co-phases, and followed by the coefficients.

21. The BS according to claim 12, wherein at least one of the co-phases or the coefficients are selected based on unquantized or analog co-phases and coefficients for a subset of codebooks for the co-phases and coefficients.

22. The BS according to claim 21, wherein the subset of codebooks for the co-phases and coefficients comprise boundary points of a Euclidean partition in which the unquantized or analog co-phases and coefficients belong.

23. A method within a user equipment (UE), the method comprising:
for an antenna array configured to transmit channel state information reference signals (CSI-RS) using a plurality of antenna ports, within the user equipment, one of selecting, by the user equipment, from a master set or retrieving, from a memory within the user equipment, a set of one or more of a plurality of basis beam vectors, wherein each of a plurality of beams corresponding to the set of selected or retrieved basis beam vectors has a different direction in three-dimensional space;
selecting, from a codebook accessible to the user equipment, at least a subset of L beams from among a plurality of beams from the set of the selected or retrieved basis beam vectors, co-phases for each selected beam, and coefficients for each selected beam, wherein the co-phases determine the co-phasing weights for each of the selected L beams in case of a cross-polarized antenna array, the coefficients determine a linear combination of the selected L beams according to the basis beam vectors, and L is at least one; and
transmitting, from the user equipment, a feedback message containing an indication of channel state information for the set of selected or retrieved basis beam vectors, the selected L beams from the basis beam vectors, and the co-phases and the coefficients for the selected L beams.

24. The method according to claim 23, wherein the channel state information includes at least linear combination pre-coding matrix information (PMI) corresponding to a pre-coding vector w:

$$w = \sum_{l=1}^{L} c_l \begin{bmatrix} a_l \\ \alpha_l a_l \end{bmatrix},$$

where $\{a_l\}_{l=1}^{L}$ is the selected L beams from the basis beam vectors and $\{\alpha_l\}_{l=1}^{L}$ and $\{c_l\}_{l=1}^{L}$ are respectively corresponding sets of the co-phases and the coefficients.

25. The method according to claim 23, wherein:
the basis beam vectors correspond to wideband (WB) and long-term measurement for the channel state information and comprise WB and long-term indications,
the selected L beams, the co-phases and the coefficients correspond to subband (SB) and short-term measurement for the channel state information and comprise per SB and short-term indications.

26. The method according to claim 23, wherein bits selected for the feedback message based upon at least one of the co-phases and the coefficients are selected from double structure co-phase and coefficient codebooks each having a wideband (WB) component and a subband (SB) component.

* * * * *